United States Patent
Oba

(10) Patent No.: US 10,632,917 B2
(45) Date of Patent: Apr. 28, 2020

(54) SIGNAL PROCESSING DEVICE, SIGNAL PROCESSING METHOD, AND MONITORING SYSTEM

(71) Applicant: SONY CORPORATION, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 15/323,764

(22) PCT Filed: Jun. 23, 2015

(86) PCT No.: PCT/JP2015/068026
§ 371 (c)(1),
(2) Date: Jan. 4, 2017

(87) PCT Pub. No.: WO2016/024444
PCT Pub. Date: Feb. 18, 2016

(65) Prior Publication Data
US 2017/0166131 A1    Jun. 15, 2017

(30) Foreign Application Priority Data

Aug. 12, 2014   (JP) ................................. 2014-164180

(51) Int. Cl.
*B60R 1/00*    (2006.01)
*H04N 5/268*   (2006.01)
(Continued)

(52) U.S. Cl.
CPC ................ *B60R 1/002* (2013.01); *B60R 1/00* (2013.01); *H04N 5/23293* (2013.01);
(Continued)

(58) Field of Classification Search
None
See application file for complete search history.

(56) References Cited

U.S. PATENT DOCUMENTS

| 6,553,130 B1 * | 4/2003 | Lemelson | G01S 13/931 340/435 |
| 7,511,733 B2 * | 3/2009 | Takizawa | A61B 1/00105 348/65 |

(Continued)

FOREIGN PATENT DOCUMENTS

| DE | 20 2004 013 984 U1 | 2/2006 |
| DE | 10 2008 039 649 A1 | 4/2009 |

(Continued)

OTHER PUBLICATIONS

Machine translation of DE102010032411.*

(Continued)

*Primary Examiner* — Mohammad J Rahman
(74) *Attorney, Agent, or Firm* — Xsensus LLP

(57) ABSTRACT

In accordance with driving information that is obtained by a driving situation detecting sensor 13 and is related to the driving situation of a vehicle, a display control unit 20 sets the image area to be presented to the driver DR of the vehicle from an image obtained by a peripheral area imaging unit 11 imaging a peripheral area around the vehicle, and, in accordance with the driving situation, controls the visual recognition range in the peripheral area the driver DR can visually recognize from the image presented by a display unit 50 via a mirror 55. When the driving situation is such that the orientation of a cabin differs from the orientation of a trailer portion, for example, the image area to be presented is set so that the outer side of the trailer portion is included in the visual recognition range even though the orientation of the cabin differs from the orientation of the trailer portion. Thus, a desired peripheral area around the vehicle can be readily viewed.

18 Claims, 39 Drawing Sheets

(51) Int. Cl.
*H04N 5/232* (2006.01)
*H04N 7/18* (2006.01)

(52) U.S. Cl.
CPC ............... *H04N 5/268* (2013.01); *H04N 7/18* (2013.01); *H04N 7/181* (2013.01); *B60R 2300/70* (2013.01); *B60R 2300/802* (2013.01)

(56) References Cited

U.S. PATENT DOCUMENTS

| | | | | |
|---|---|---|---|---|
| 9,809,169 | B1* | 11/2017 | Naboulsi | B60R 1/025 |
| 2003/0074119 | A1* | 4/2003 | Arlinsky | B60K 35/00 |
| | | | | 701/36 |
| 2003/0090570 | A1 | 5/2003 | Takagi et al. | |
| 2005/0083405 | A1* | 4/2005 | Imoto | B60R 1/00 |
| | | | | 348/148 |
| 2005/0083427 | A1* | 4/2005 | Imoto | B60R 1/00 |
| | | | | 348/335 |
| 2006/0050149 | A1 | 3/2006 | Lang et al. | |
| 2006/0072011 | A1* | 4/2006 | Okada | B60R 1/00 |
| | | | | 348/148 |
| 2006/0187238 | A1* | 8/2006 | Yoneji | B60R 1/00 |
| | | | | 345/629 |
| 2007/0236563 | A1 | 10/2007 | Takagi et al. | |
| 2008/0044061 | A1 | 2/2008 | Hongo | |
| 2008/0143833 | A1 | 6/2008 | Yanai et al. | |
| 2008/0218435 | A1* | 9/2008 | Foxenland | G02B 27/017 |
| | | | | 345/8 |
| 2011/0148613 | A1* | 6/2011 | Koehler | B62D 15/0285 |
| | | | | 340/438 |
| 2011/0170023 | A1* | 7/2011 | Ishida | B60K 35/00 |
| | | | | 348/837 |
| 2012/0154441 | A1* | 6/2012 | Kim | G06K 9/00832 |
| | | | | 345/633 |
| 2013/0027426 | A1* | 1/2013 | Sasaki | B60K 35/00 |
| | | | | 345/629 |
| 2013/0113923 | A1* | 5/2013 | Chien | B60R 1/00 |
| | | | | 348/135 |
| 2013/0325205 | A1* | 12/2013 | Oba | B60R 1/00 |
| | | | | 701/1 |
| 2014/0071278 | A1* | 3/2014 | Assaf | B60R 1/12 |
| | | | | 348/148 |
| 2014/0297059 | A1* | 10/2014 | Mizutani | G08G 1/16 |
| | | | | 701/1 |
| 2014/0336876 | A1* | 11/2014 | Gieseke | G01C 21/365 |
| | | | | 701/36 |
| 2015/0191120 | A1* | 7/2015 | Honda | B60Q 1/00 |
| | | | | 348/148 |
| 2015/0226964 | A1* | 8/2015 | Sasaki | G02B 27/0149 |
| | | | | 359/631 |

FOREIGN PATENT DOCUMENTS

| | | |
|---|---|---|
| DE | 10 2010 032 411 A1 | 2/2012 |
| JP | 2002-46533 A | 2/2002 |
| JP | 2008-77628 A | 4/2008 |
| JP | 2010-30341 A | 2/2010 |
| JP | 2010-179850 A | 8/2010 |
| JP | 2012-105158 A | 5/2012 |
| JP | 2013-216286 A | 10/2013 |

OTHER PUBLICATIONS

IP.com search report.*
International Search Report dated Sep. 29, 2015 in PCT/JP2015/068026 filed Jun. 23, 2015.
Extended European Search Report dated Dec. 14, 2017 in Patent Application No. 15832125.7.
Office Action issued in European Application 15 832 125.7—1132 dated Sep. 3, 2018.

* cited by examiner

FIG. 21

|  | MODE 1 | MODE 2 | MODE 3 |
|---|---|---|---|
| STRAIGHT MOVEMENT (HIGH SPEED) | ○ | □ |  |
| TRAFFIC CIRCLE | ○ | □ |  |
| RIGHT/LEFT TURN AT OBTUSE ANGLE | ○ | □ | ☆ |
| RIGHT/LEFT TURN AT ACUTE ANGLE |  | ○ | □ |
| STRAIGHT BACKWARD MOVEMENT | ○ | □ |  |
| ACUTE-ANGLED BACKWARD MOVEMENT |  | ○ | □ |

FIG. 33
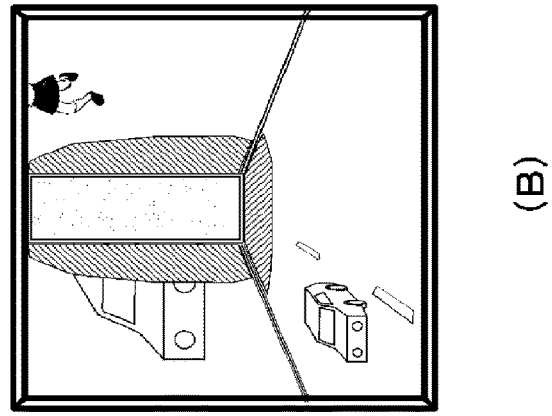
(B)
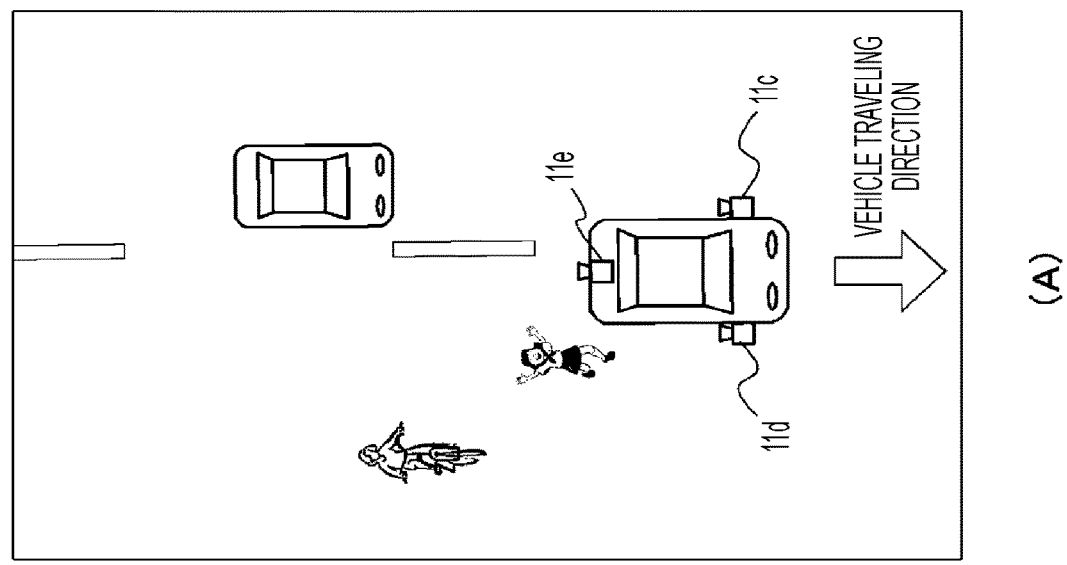
(A)

SIGNAL PROCESSING DEVICE, SIGNAL PROCESSING METHOD, AND MONITORING SYSTEM

TECHNICAL FIELD

This technology relates to a signal processing device, a signal processing method, and a monitoring system, and is to facilitate visual recognition of a peripheral area around a vehicle or the like.

BACKGROUND ART

These days, a function equivalent to that of a rearview mirror of a vehicle is achieved with a monitoring system formed with an imaging device and a display device. By a visual recognition method using a rearview mirror, the driver moves the position of his/her head or eyes (this position will be hereinafter referred to simply as the "head position") so that the range the driver can visually recognize (this range will be hereinafter referred to as the "visual recognition range") can be moved. In a monitoring system that causes a display device to simply display an image captured by an imaging device, however, the visual recognition range is fixed, and the driver cannot move the visual recognition range by moving the head position. To counter this, Patent Document 1 discloses detection of a change in the head position of the driver, cutting out of an image from a peripheral area image in accordance with the change in the head position, and display of the cutout image on a display device. According to Patent Document 1, the visual recognition range can be moved in accordance with changes in the head position.

CITATION LIST

Patent Document

Patent Document 1: Japanese Patent Application Laid-Open No. 2010-179850

SUMMARY OF THE INVENTION

Problems to be Solved by the Invention

In a case where a peripheral area around the vehicle is to be viewed, however, a large part of a trailer portion is reflected by a rearview mirror attached to the cabin in some vehicle driving situation or when the cabin and the trailer portion are in a certain positional relationship. Alternatively, the reflected peripheral area moves away from the trailer portion. In such cases, it is difficult to visually recognize the peripheral area around the trailer portion.

In view of this, this technology aims to provide a signal processing device, a signal processing method, and a monitoring system with which the peripheral area around a vehicle can be easily viewed.

Solutions to Problems

A first aspect of this technology lies in a signal processing device that includes a display control unit that sets the image area to be presented to the driver of a vehicle from an image obtained by imaging a peripheral area around the vehicle in accordance with driving information related to a driving situation of the vehicle, and controls a visual recognition range in the peripheral area in accordance with the driving situation, the driver being able to visually recognize the visual recognition range from the presented image.

According to this technology, the image obtained by imaging the peripheral area around the vehicle is an image of the peripheral area imaged by an imaging unit installed on the vehicle, or includes images of the peripheral area imaged by imaging units installed in positions that differ from each other in the traveling direction of the vehicle, for example. Also, the driving information related to the driving situation of the vehicle includes at least one piece of information among vehicle speed information about the vehicle, information indicating a steering state, gear position information, a direction indicator setting state, the bend angle of the trailer portion relative to the cabin in a case where the vehicle is formed by connecting the cabin to the trailer portion, information indicating the connection state of the trailer portion, and current position information, for example. The image area to be presented to the driver of the vehicle from an image obtained by imaging the peripheral area around the vehicle or one or more images obtained by imaging the peripheral area from different positions is set in accordance with the driving information, and the visual recognition range in the peripheral area the driver can visually recognize from the presented image is controlled in accordance with the driving situation. For example, the visual recognition range is moved to the outer side of the vehicle, in accordance with the driving information related to the traveling direction of the vehicle. Further, in a case where the vehicle is formed by connecting a trailer portion to a cabin, a peripheral area around the vehicle is imaged from respective positions of the cabin and the trailer portion, for example. When the driving situation is such that the orientation of the cabin differs from the orientation of the trailer portion in accordance with driving information, the image area to be presented from one or more images captured from different positions in accordance with the driving information is set so that the outer side of the trailer portion is included in the visual recognition range even though the orientation of the cabin differs from the orientation of the trailer portion.

A second aspect of this technology lies in a signal processing method that includes the step of setting the image area to be presented to the driver of a vehicle from an image obtained by an imaging unit imaging a peripheral area around the vehicle in accordance with driving information that is acquired by a driving situation detecting unit and is related to the driving situation of the vehicle, and controlling a visual recognition range in the peripheral area in accordance with the driving situation, the driver being able to visually recognize the visual recognition range from the presented image, the step being carried out by a display control unit.

A third aspect of this technology lies in a monitoring system that includes: an imaging unit that images a peripheral area around a vehicle; a driving situation detecting unit that acquires driving information about a driving situation of the vehicle; and a display control unit that sets the image area to be presented to the driver of the vehicle from an image obtained by the imaging unit in accordance with the driving information acquired by the driving situation detecting unit, and controls a visual recognition range in the peripheral area in accordance with the driving situation, the driver being able to visually recognize the visual recognition range from the presented image.

Effects of the Invention

According to this technology, the image area to be presented to the driver of a vehicle from an image obtained by imaging a peripheral area around the vehicle is set in accordance with driving information related to the driving situation of the vehicle, and the visual recognition range in the peripheral area the driver can visually recognize from the presented image is controlled in accordance with the driving situation. As the visual recognition range in the peripheral area the driver can visually recognize is controlled in accordance with the driving situation, the peripheral area around the vehicle can be easily viewed. It should be noted that the advantageous effects described in this specification are merely examples, and the advantageous effects of the present technology are not limited to them and may include additional effects.

BRIEF DESCRIPTION OF DRAWINGS

FIG. 21 is a table showing an example of the relationship between driving situation determination results and visual recognition range modes.
FIG. 33 is a diagram showing an example of arrangement of peripheral area imaging units and an example of peripheral images displayed on the display unit.

MODES FOR CARRYING OUT THE INVENTION

The following is a description of embodiments for carrying out the present technology. It should be noted that explanation will be made in the following order.
1. First Embodiment
1-1. Configuration of a First Embodiment
1-2. Operation of the First Embodiment
1-3. Another Configuration and Operation of the First Embodiment
2. Second Embodiment
2-1. Configuration of a Second Embodiment
2-2. Operation of the Second Embodiment
3. Third Embodiment
3-1. Configuration of a Third Embodiment
3-2. Operation of the Third Embodiment
4. Fourth Embodiment
4-1. Configuration of a Fourth Embodiment
4-2. Operation of the Fourth Embodiment
5. Other Embodiments

1. First Embodiment

[1-1. Configuration of a First Embodiment]

Figure 1:
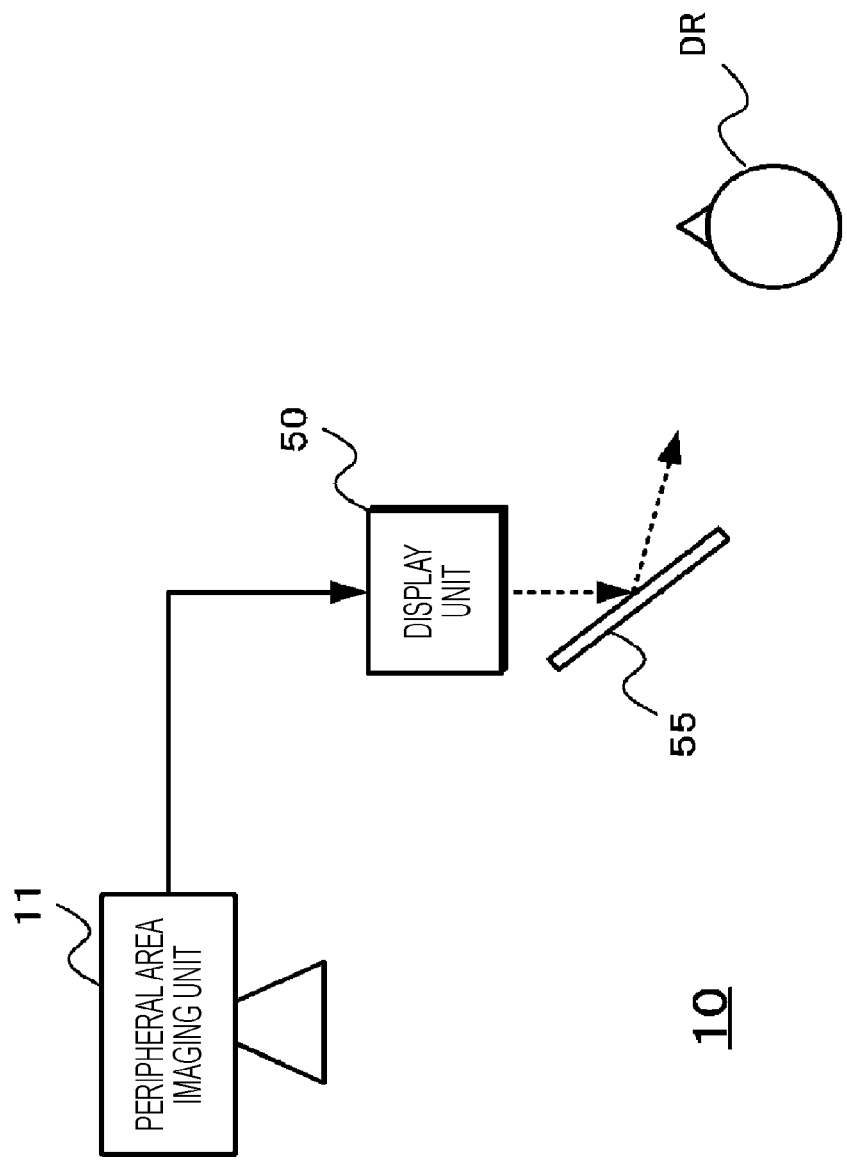
FIG. 1 is a diagram showing an example configuration of a first embodiment.
Figure 2:
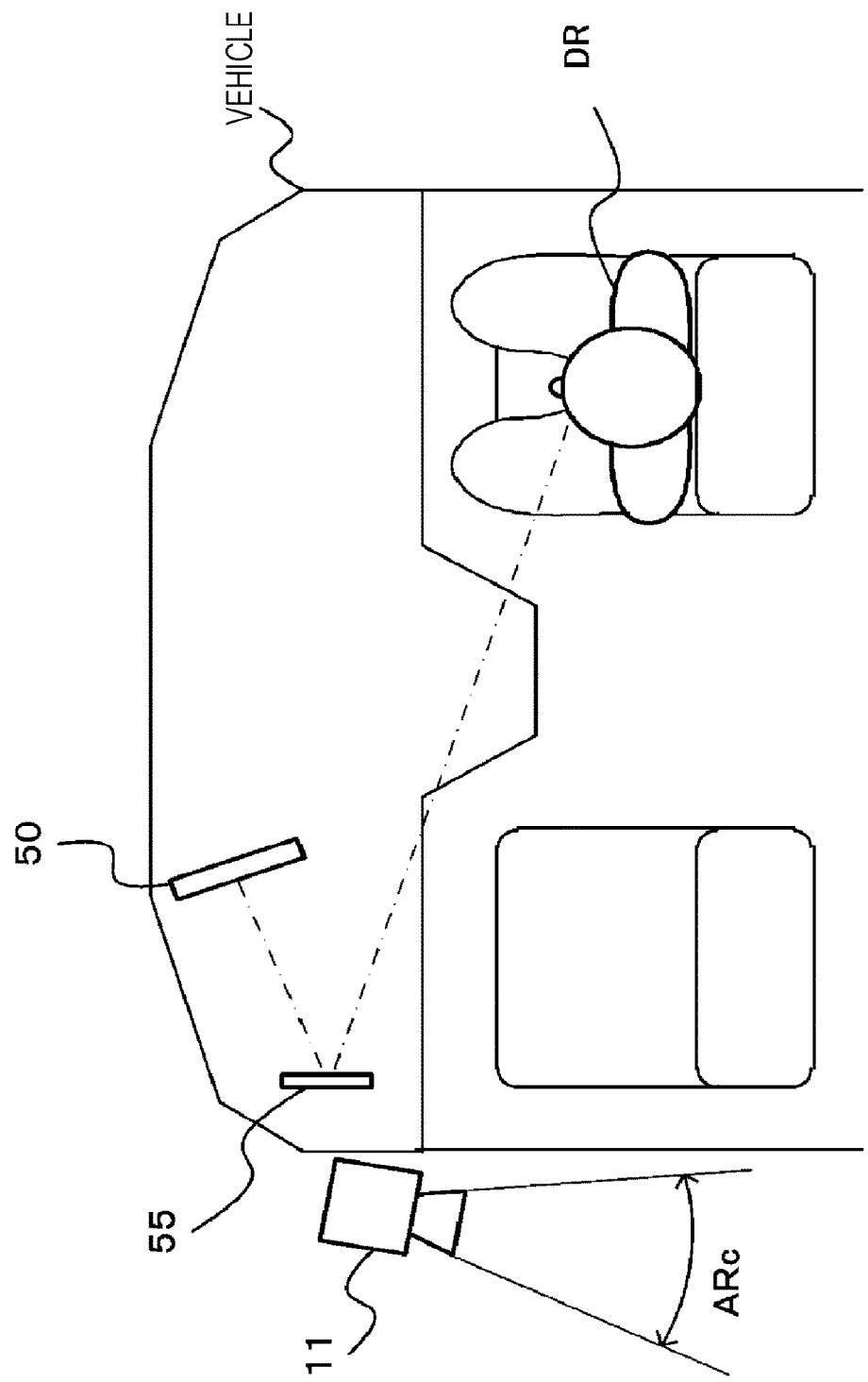
FIG. 2 is a diagram showing an example of the positional relationship among the driver, a display unit, and a mirror unit.

FIG. 1 shows an example configuration of a first embodiment. A display device 10 includes a peripheral area imaging unit 11, a display unit 50, and a mirror unit 55. Further, FIG. 2 is a diagram showing an example of the positional relationship among the driver, the display unit, and the mirror unit.

Figure 3:
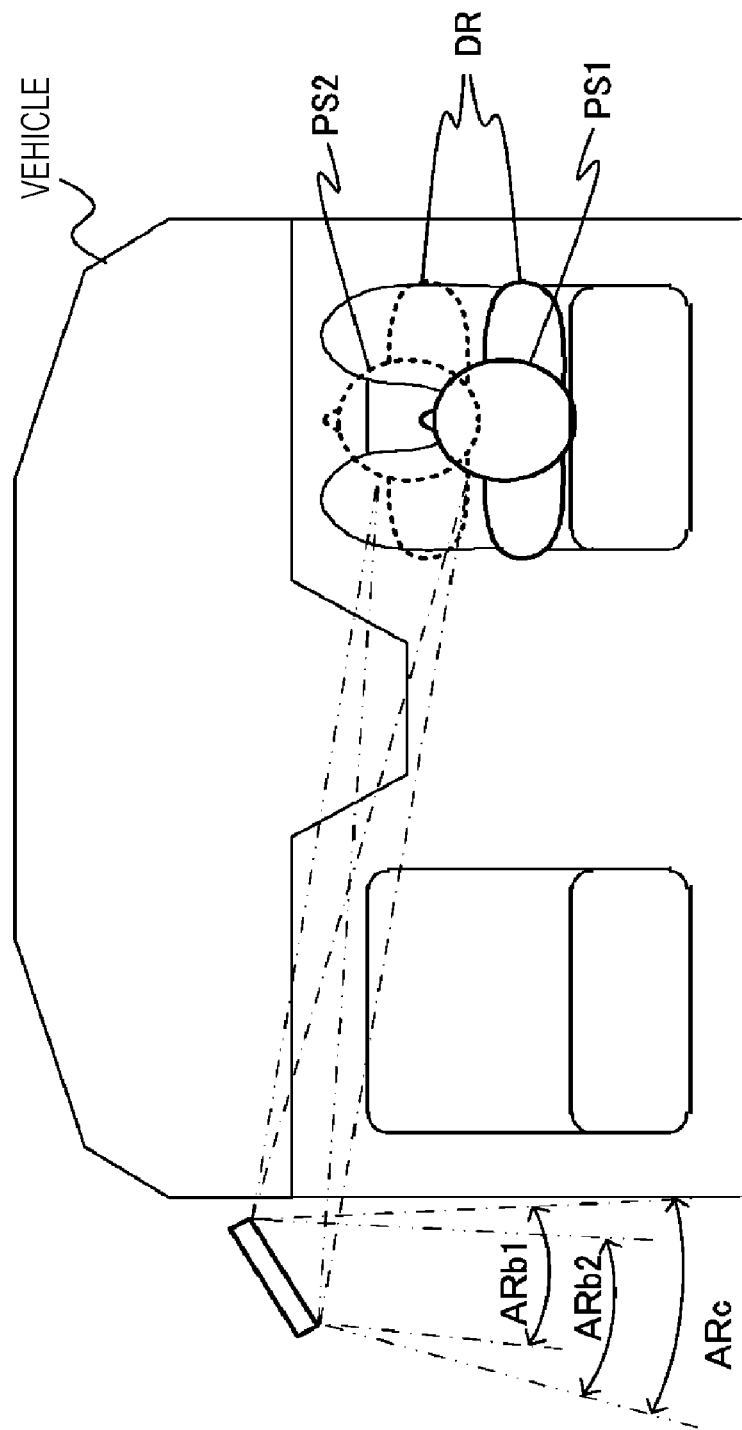
FIG. 3 is a diagram for explaining the imaging range of a peripheral area imaging unit.

The peripheral area imaging unit 11 images a peripheral area around the vehicle, and outputs an image signal to the display unit 50. FIG. 3 is a diagram for explaining the imaging range of the peripheral area imaging unit. For example, in a case where a rearview mirror 91 is used, the driver DR can visually recognize an area ARb1 in the peripheral area at the head position (eye position) PS1. It should be noted that, in the description below, the torso position and the eye position will be referred to simply as the head position.

The driver DR is supposed to be able to move the head position and visually recognize an area ARb2 in the peripheral area at a position PS2. The peripheral area imaging unit 11 images an area ARc including the area ARb1 and the area ARb2, and generates an image signal, for example. As the imaging range is set in the above manner, the peripheral area imaging unit 11 can generate an image signal by imaging the peripheral area that can be visually recognized in a case where the rearview mirror 91 is used. It should be noted that the imaging range of the peripheral area imaging unit 11 is not limited to the area ARc including the area ARb1 and the area ARb2, but may be a range with a wider angle of view than the area ARc, for example. Hereinafter, the area to be imaged by the peripheral area imaging unit 11 will be referred to as the current peripheral area to be imaged.

The display unit 50 is disposed so that the driver DR can visually recognize the display surface in an indirect manner via the mirror unit 55, and displays the image captured by the peripheral area imaging unit 11 (this image will be hereinafter referred to as the "peripheral area image") on the display surface. It should be noted that, in the image displayed on the display unit 50, the image area corresponding to the peripheral area the driver visually recognizes via the mirror unit 55 (this peripheral area will be hereinafter referred to as the "visual recognition range") is the monitor image area.

The mirror unit 55 is disposed so that the driver DR can visually recognize the display surface of the display unit 50 in an indirect manner. The mirror unit 55 is disposed near a pillar, for example, so that the driver DR can visually recognize the image reflected by the mirror unit 55 when taking an action similar to an action to look into a conventional rearview mirror in the vehicle, for example.

Also, in relation to the mirror unit 55, the display unit 50 is designed to have such a display size and is located at such a distance from the mirror unit 55 so that the peripheral area image on the display unit 50 reflected by the mirror unit 55 becomes similar to the peripheral area reflected by a conventional rearview mirror. Further, the display unit 50 and the mirror unit 55 are disposed so that the visual recognition range the driver can visually recognize from the image on the display unit 50 reflected by the mirror unit 55 in the peripheral area can be changed with movement of the position of visual recognition of the driver relative to the mirror unit 55.

Figure 4:
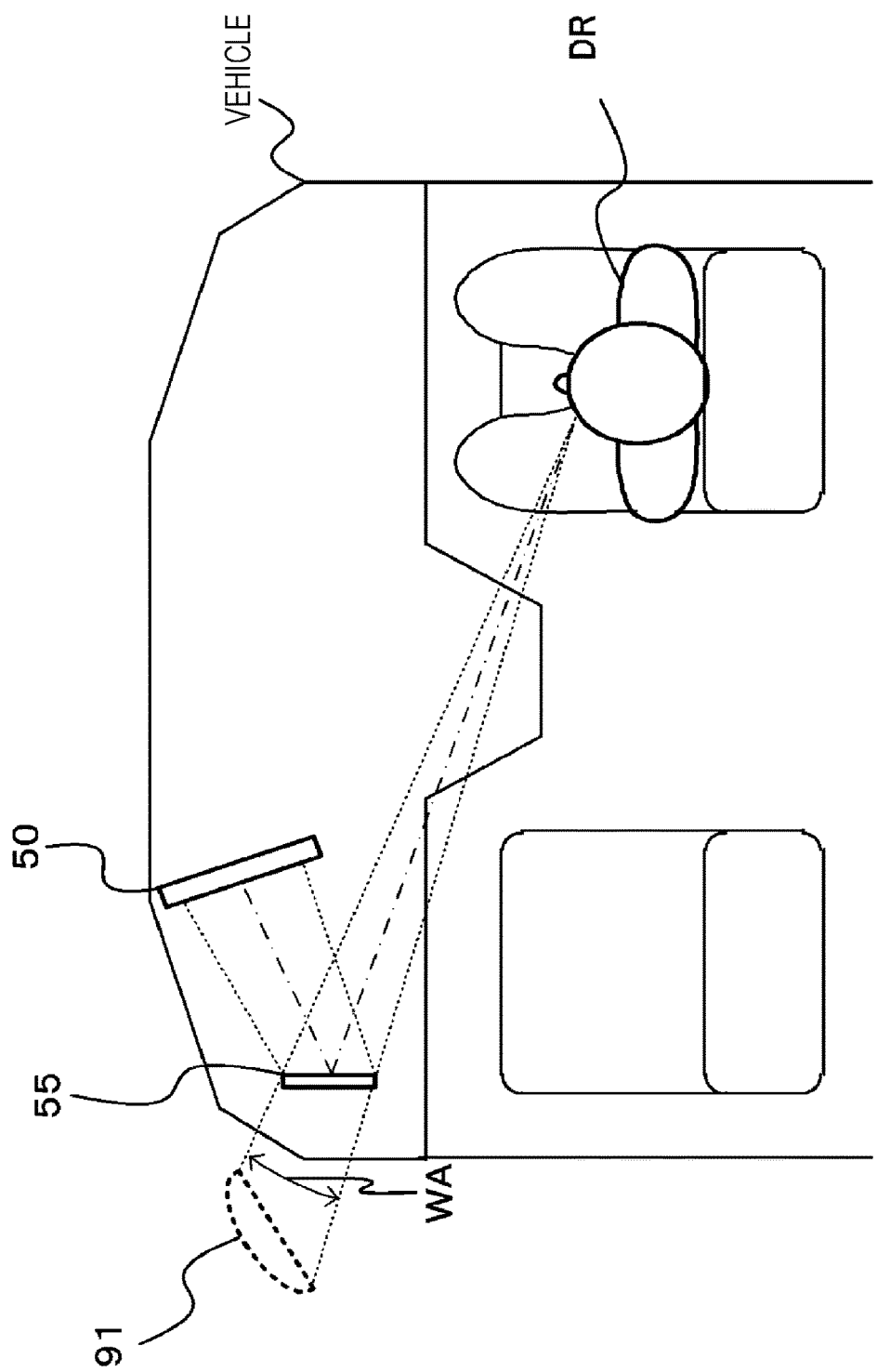
FIG. 4 is a diagram showing the relationship among a mirror unit, a display unit, and a conventional rearview mirror.

FIG. 4 shows the relationship among the mirror unit, the display unit, and a conventional rearview mirror. The mirror surface size and the position of the mirror unit 55 are set so as to substantially match the mirror surface range (the range indicated by an arrow WA) of the rearview mirror 91 when the driver DR looks into the rearview mirror 91. Also, the image of the peripheral area reflected by the mirror surface of the rearview mirror 91 is also displayed in the image area of the display unit 50 to be visually recognized via the mirror unit 55. In this manner, a function effect similar to that of the conventional rearview mirror 91 can be achieved with the display unit 50 and the mirror unit 55. In this embodiment, an example of a side (rearview) mirror (a rear mirror) disposed in the vicinity of a conventional A-pillar is described in terms of the positional relationship with the mirror unit 55 to be provided in a case where the direction of visual recognition is similar to that of the side mirror. However, the mirror unit 55 may be disposed in such a position that the direction of visual recognition extends in the center of the dashboard, like the direction of visual recognition of a fender mirror. With this arrangement, the driver has to move his/her head less frequently, and a great load reduction effect is expected.

The display device 10 enables the driver DR to visually recognize a peripheral area image in an indirect manner via the mirror unit 55, and increases the distance between the driver DR and the display surface of the display unit 50 to a longer distance than that in a case where the driver DR directly views the display surface of the display unit 50.

Figure 5:
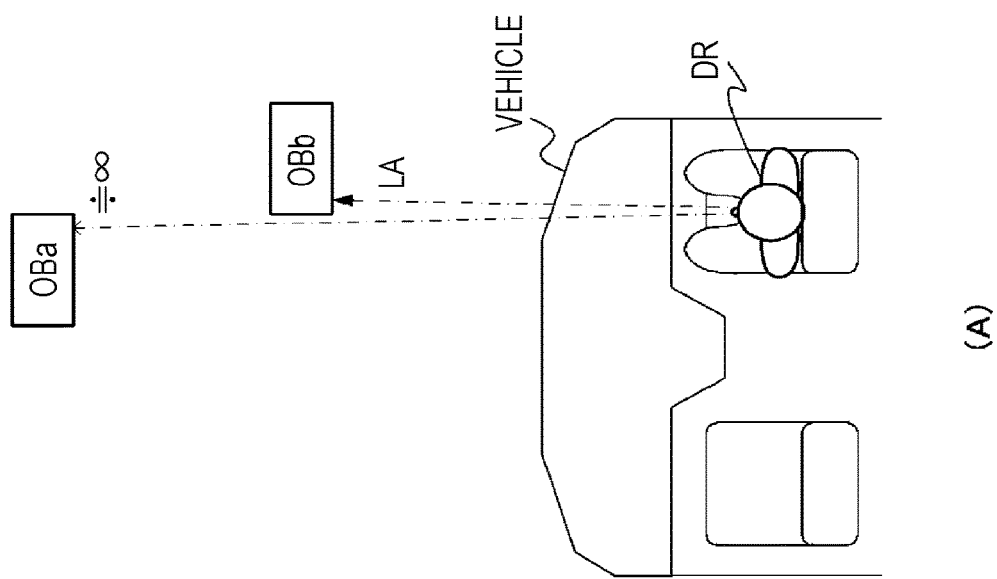
FIG. 5 is a diagram schematically showing the relationship between switching of the driver's eye focus and the response time.

FIG. 5 schematically shows the relationship between the switching of the driver's eye focus and the response time. As shown in (A) of FIG. 5, in a case where the eye focus is switched between the two points of an infinite visible object OBa and a near visible object OBb, the response time required for the eye focus is switched from one object to the other varies depending on the distance LA to the near visible object OBb. (B) of FIG. 5 shows the relationship between the distance LA to the near visible object OBb and the response time TR. Where the distance to the near visible object OBb becomes shorter than a certain distance, the response time TR tends to become longer as the distance to the visible object OBb becomes shorter. It should be noted that the solid line indicates the case of an elderly person, the dashed line indicates the case of a middle-aged person, and the dot-and-dash line indicates the case of a younger person. In view of this, the present technology enables the driver DR to visually recognize a peripheral area image in an indirect manner via the mirror unit 55, and increases the distance between the driver DR and the display surface of the display unit 50, to enable high-speed recognition. Specifically, the display unit 50 and the mirror unit 55 are positioned or optically designed so that the optical visual recognition distance from the driver DR to the display surface of the display unit 50 via the mirror unit 55 becomes 1.1 m or longer. Where the display unit 50 and the mirror unit 55 are positioned in such a manner, the time required for the driver to focus on the peripheral area image displayed on the display unit 50 in the display device 10 can be made closer to the time required for the driver to focus on an object via a rearview mirror.

Also, in the display device 10, the driver DR visually recognizes a peripheral area image in an indirect manner via the mirror unit 55, and therefore, the display unit 50 is positioned so that the driver DR cannot directly see the display surface and the light illuminating the display surface. Alternatively, a shield may be provided so that the driver DR cannot see the display surface of the display unit 50 and the illuminating light.

[1-2. Operation of the First Embodiment]

Figure 6:
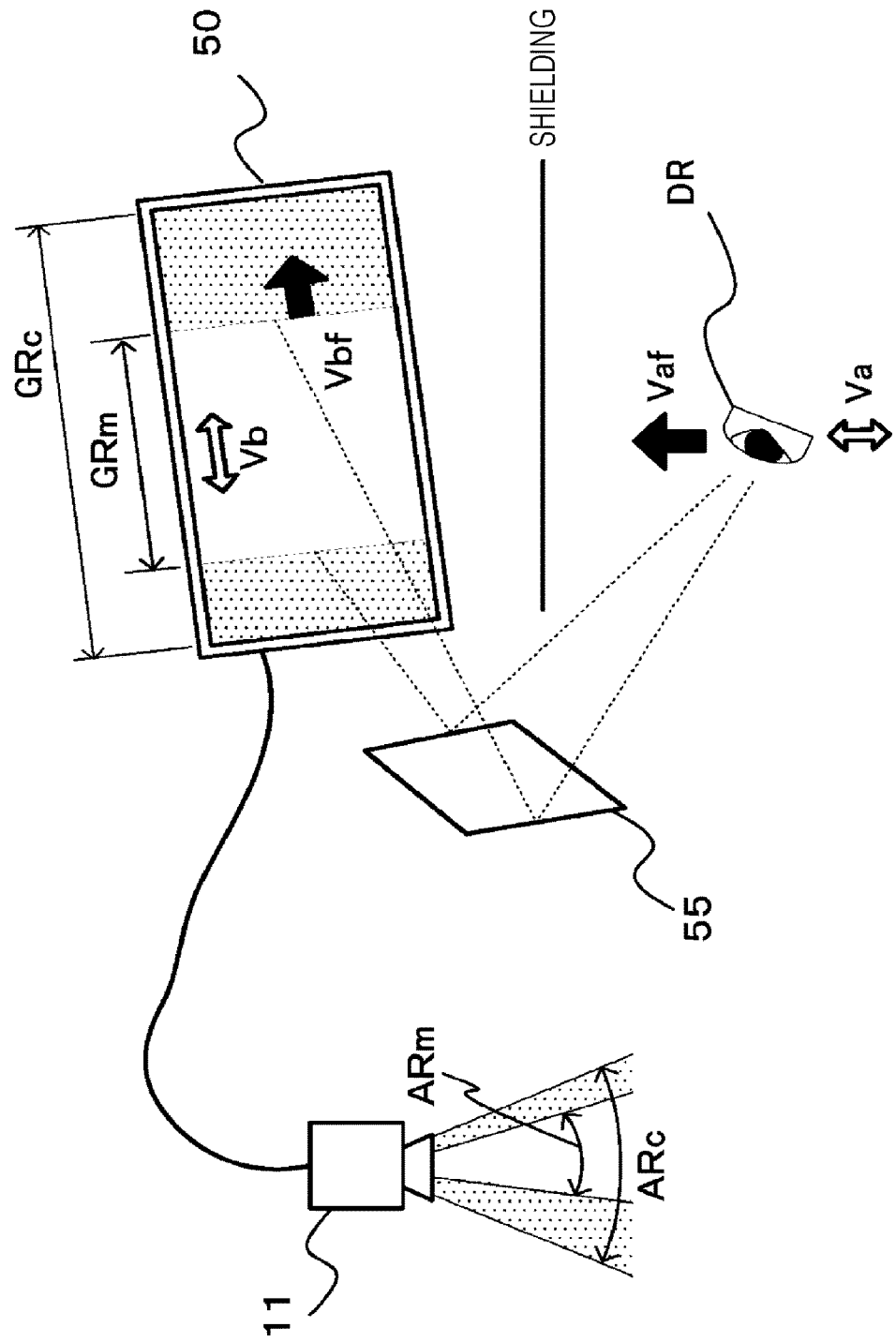
FIG. 6 is a diagram for explaining operation of the first embodiment.

FIG. 6 is a diagram for explaining operation of the first embodiment. The display unit 50 displays an image taken by the peripheral area imaging unit 11. The mirror unit 55 is formed with a flat mirror, for example, and has such a size that the driver DR can visually recognize an area GRm that is part of the display area GRc of the display unit 50 when viewing a peripheral area image in an indirect manner via the mirror unit 55. It should be noted that the area GRm is the monitor image area. Also, the display unit 50 displays an image of the area ARc imaged by the peripheral area imaging unit 11 in the display area GRc.

The display unit 50 and the mirror unit 55 are positioned so that the monitor image area GRm that can be visually recognized via the mirror unit 55 moves in the direction of an arrow Vb as in a case with a conventional rearview mirror, when the driver DR of the vehicle moves his/her head position in the direction of an arrow Va to alter the visual recognition range, for example. Specifically, the display unit 50 and the mirror unit 55 are positioned so that the moving direction of the monitor image area GRm in a case where the head position is moved is the longitudinal direction of the display area of the display unit 50.

If the head position of the driver DR looking in the direction of the mirror unit 55 is the position shown in the drawing in this case, the driver DR can check the circumstances of the visual recognition range ARm in the peripheral area by viewing the image of the monitor image area GRm via the mirror unit 55.

When the driver DR next moves the head position in the direction of an arrow Vaf, which is the forward direction of the vehicle, to check the area outside the visual recognition range ARm, the monitor image area GRm the driver DR can visually recognize via the mirror unit 55 moves in the direction of an arrow Vbf. That is, the driver DR can check the circumstances of the outside area in the peripheral area better than before the movement of the head position, by moving his/her head position in the forward direction of the vehicle and visually recognizing the image of the monitor image area via the mirror unit 55.

Further, when the driver DR moves the head position in the backward direction of the vehicle (the opposite direction of the arrow Vaf), the monitor image area GRm the driver DR can visually recognize via the mirror unit 55 moves in the opposite direction of the arrow Vbf. That is, the driver DR can check the circumstances of the inside area in the peripheral area better than before the movement of the head position, by moving his/her head position in the backward direction of the vehicle and visually recognizing the image of the monitor image area via the mirror unit 55.

Thus, as the driver is made to view an image of the display unit 50 via the mirror unit 55, the driver can check a desired area in the peripheral area as in a case where a rearview mirror is used. Also, the display unit 50 and the mirror unit 55 are installed inside a vehicle. Accordingly, it is possible to check the peripheral area, without any adverse influence of a side window as in a case where a rearview mirror is used. For example, it is possible to prevent the checking of the peripheral area from becoming difficult due to fogging of a side window or adherence of raindrops or the like to the side window.

[1-3. Another Configuration and Operation of the First Embodiment]

The above described mirror unit 55 of the first embodiment is formed with a flat mirror. However, the mirror unit 55 is not necessarily a flat mirror, and may have a curved portion. As the mirror unit 55 is partially curved, an effect equivalent to the effect of the convex mirror of a rearview mirror (a rear mirror) can be achieved.

Figure 7:
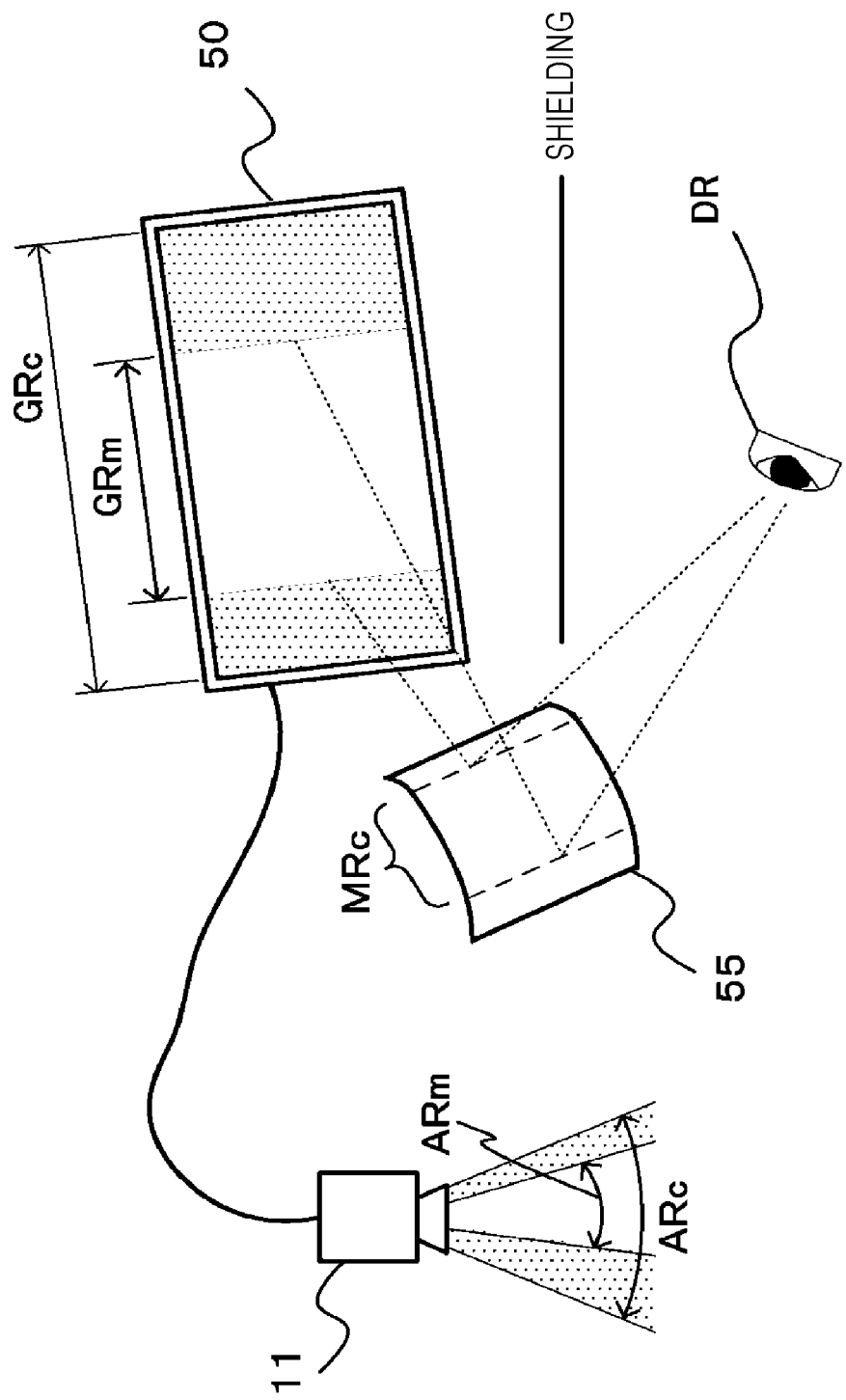
FIG. 7 is a diagram showing an example case where the mirror unit has a curved portion.

FIG. 7 shows an example case where the mirror unit has a curved portion. The shape of the mirror unit 55 in the moving direction of the visual recognition range, or in the moving direction of the monitor image area GRm depending on movement of the head position of the driver DR, is a curved shape that protrudes in the direction of the driver DR, for example. Meanwhile, the central portion MRc of the mirror unit 55 has a substantially flat shape, having a smaller curve than the curve of the edge portions in the moving direction of the visual recognition range.

As the edge portions are curved in this manner, the image is compressed in the moving direction of the visual recognition range at the curved portions. Accordingly, where the central portion MRc of the mirror unit 55 is the area corresponding to the monitor image area GRm, the outside and the inside of the visual recognition range ARm corresponding to the monitor image area GRm in the peripheral area can be checked in the compressed image at the edge portions of the mirror unit 55. Thus, the driver can check a larger peripheral area than in a case where a flat mirror is used.

2. Second Embodiment

[2-1. Configuration of a Second Embodiment]

Figure 8:
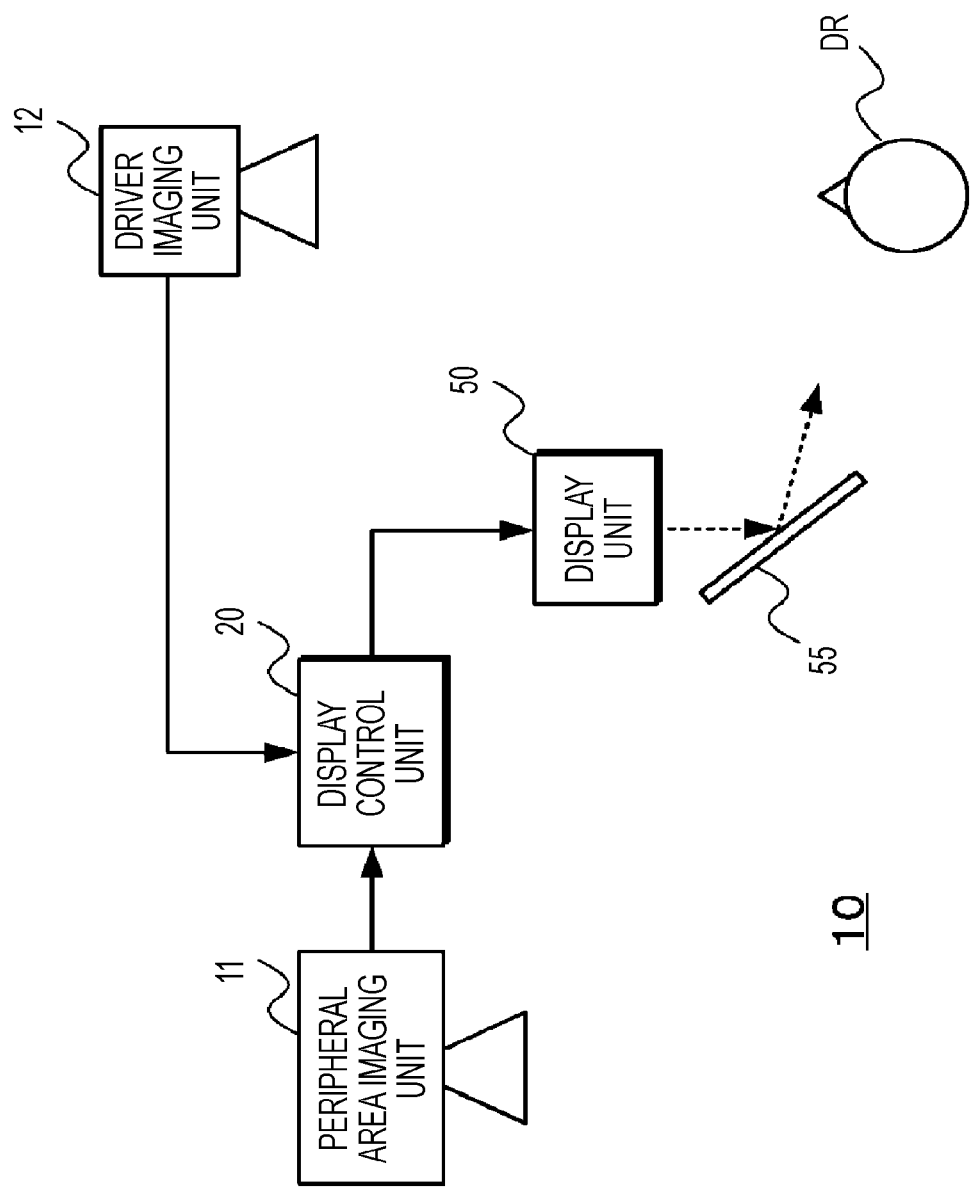
FIG. 8 is a diagram showing an example configuration of a second embodiment.
Figure 9:
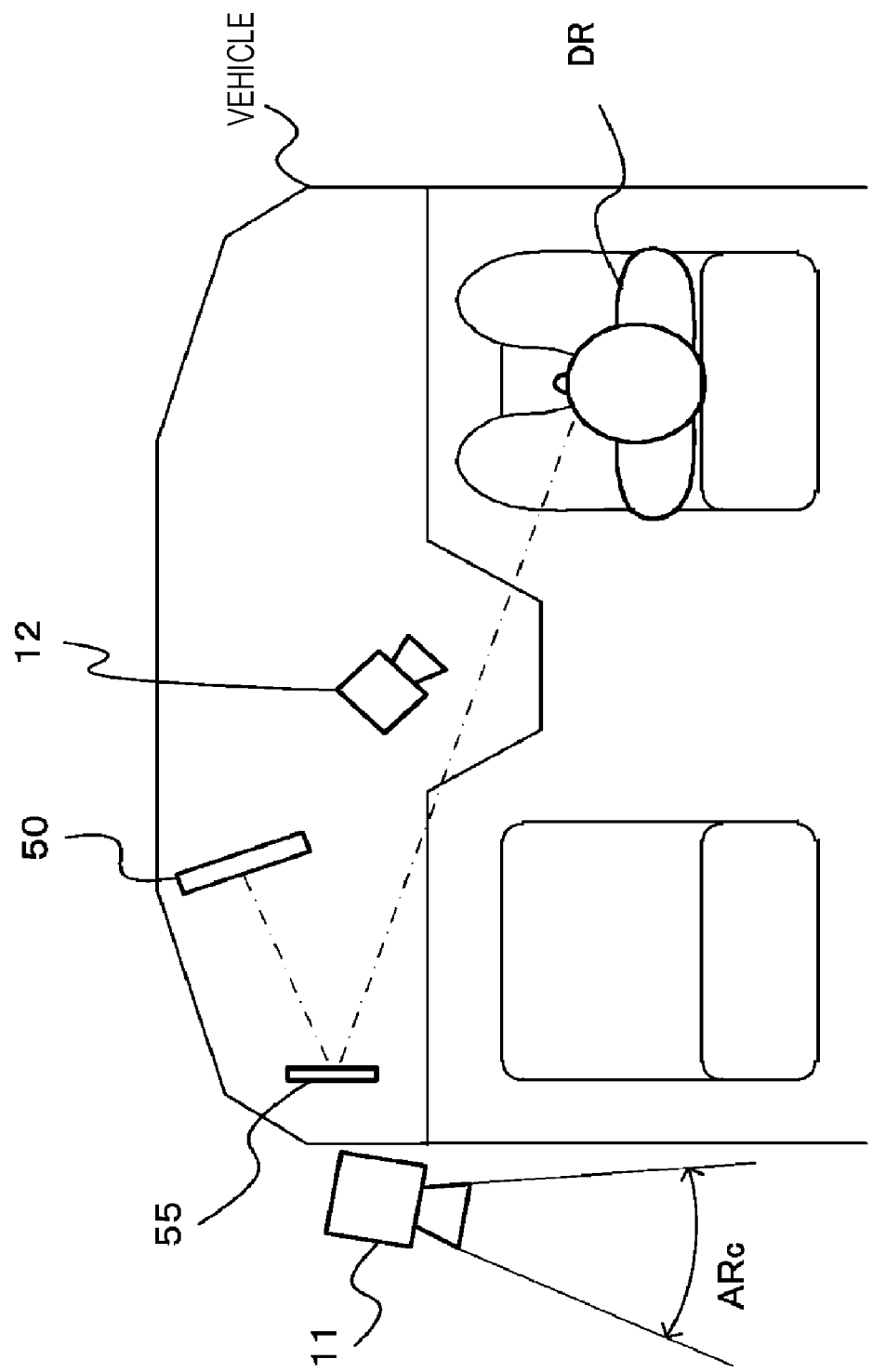
FIG. 9 is a diagram showing an example of the positional relationship among the driver, a display unit, and a mirror unit.

FIG. 8 shows an example configuration of a second embodiment. A display device 10 includes a peripheral area imaging unit 11, a driver imaging unit 12, a display control unit 20, a display unit 50, and a mirror unit 55. It should be noted that FIG. 9 is a diagram showing an example of the positional relationship among the driver, the display unit, the mirror unit, and the driver imaging unit.

The peripheral area imaging unit 11 images a peripheral area around the vehicle, and outputs an image signal to the display control unit 20. It should be noted that the area to be imaged by the peripheral area imaging unit 11 will be hereinafter referred to as the current peripheral area to be imaged.

The driver imaging unit 12 is disposed in front of the driver DR or in the direction of the mirror unit 55, for example, so that the head position of the driver DR, the orientation of the head (equivalent to the orientation of the face), the line of sight, and the like can be determined. The driver imaging unit 12 images the driver DR, and outputs an image signal to the display control unit 20.

The display control unit 20 causes the display unit 50 to display the peripheral area image taken by the peripheral area imaging unit 11. In accordance with the head position of the driver, the orientation of the head, the line of sight, movement of the position and the orientation, and the like, the display control unit 20 also controls display of the image to be displayed on the display unit 50 in compliance with a display change intention conveying operation that is set in advance.

The display unit 50 is disposed so that the driver can visually recognize the display surface of the display unit 50 in an indirect manner via the mirror unit 55. Also, the size of the display surface of the display unit 50 is set so that the driver DR can visually recognize the image displayed on the display unit 50 via the mirror unit 55 even when moving his/her head position to check a wide area on a rearview mirror while driving, for example. It should be noted that, in the image displayed on the display unit 50, the area corresponding to the visual recognition range in the peripheral area to be checked by the driver via the mirror unit 55 is the monitor image area.

The mirror unit 55 is disposed so that the driver DR can visually recognize the display surface of the display unit 50 in an indirect manner. The mirror unit 55 is disposed near a pillar, for example, so that the driver DR can visually recognize the image reflected by the mirror unit 55 when taking an action to look into a conventional rearview mirror in the vehicle, for example. Also, the positional relationship of the mirror unit 55 with the display unit 50 and the size of the mirror unit 55 are set so that the entire display area of the display unit 50 is reflected by the mirror unit 55 when the driver DR views a peripheral area image in an indirect manner via the mirror unit 55. Further, the display unit 50 and the mirror unit 55 are subjected to display control being performed by the display control unit 20 so that the visual recognition range the driver can visually recognize from the image on the display unit 50 reflected by the mirror unit 55 in the peripheral area is changed with movement of the position of visual recognition of the driver relative to the mirror unit 55. As shown in FIG. 4, the mirror surface size and the position of the mirror unit 55 are set so as to substantially match the mirror surface range (the range indicated by an arrow WA) of a rearview mirror 91 when the driver DR looks into the rearview mirror 91. With these settings, a function effect similar to that of the conventional rearview mirror 91 can be achieved with the display unit 50 and the mirror unit 55.

The display device 10 enables the driver DR to visually recognize a peripheral area image in an indirect manner via the mirror unit 55, and increases the distance between the driver DR and the display surface of the display unit 50 to a longer distance than that in a case where the driver DR directly views the display surface of the display unit 50.

Also, in the display device 10, the driver DR visually recognizes a peripheral area image in an indirect manner via the mirror unit 55, and therefore, the display unit 50 is positioned so that the driver DR cannot see the display surface and the light illuminating the display surface. Alternatively, a shield may be provided so that the driver DR cannot directly see the display surface of the display unit 50 and the illuminating light. Although the positional relationship with the mirror unit 55 to be provided in a case where the direction of visual recognition is similar to that of a rearview mirror disposed near a conventional A-pillar is described in this embodiment, the direction of visual recognition may be similar to that of a fender mirror so that the line of sight is drawn to the center of the dashboard.

Figure 10:
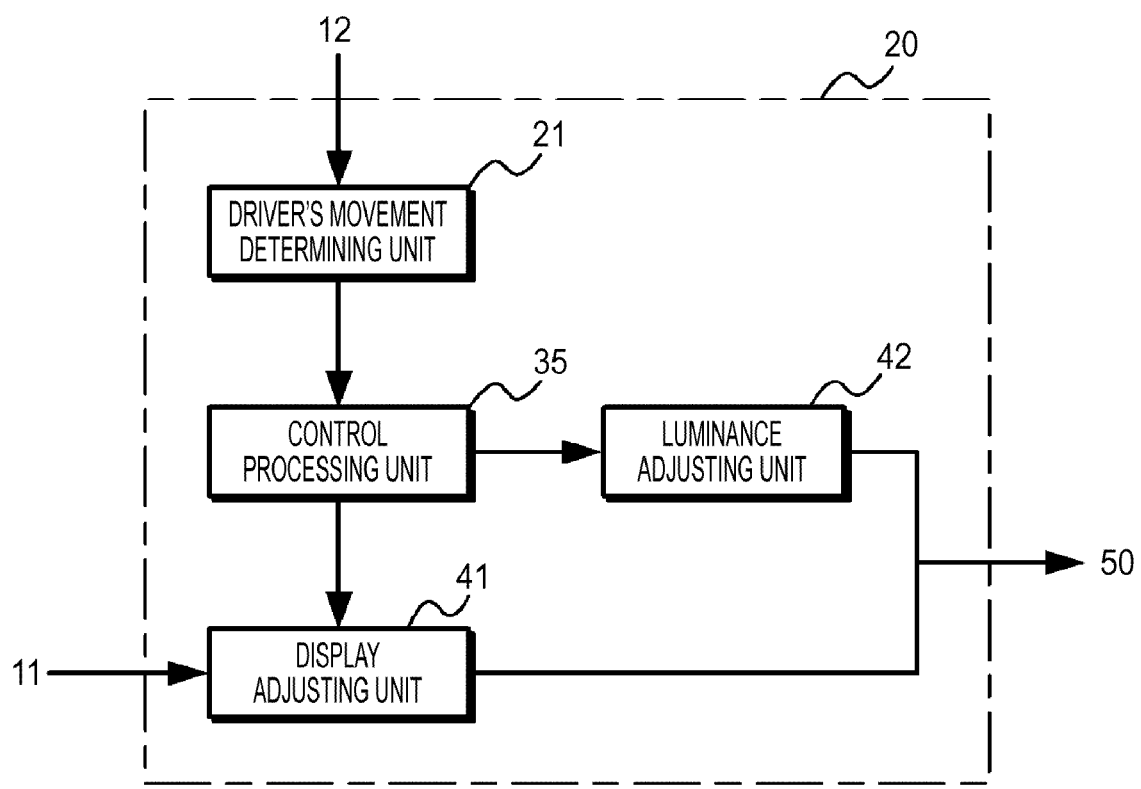
FIG. 10 is a diagram showing the configuration of a display control unit.

FIG. 10 is a diagram showing the configuration of the display control unit. The display control unit 20 includes a driver's movement determining unit 21, a control processing unit 35, a display adjusting unit 41, and a luminance adjusting unit 42.

In accordance with the image signal supplied from the driver imaging unit 12, the driver's movement determining unit 21 detects the head position of the driver, and determines the moving direction and the moving distance of the head position of the driver. In accordance with the image signal supplied from the driver imaging unit 12, for example, the driver's movement determining unit 21 recognizes the face of the driver, and determines the position of the recognized face, the orientation of the face (equivalent to the orientation of the head), and the line of sight. The driver's movement determining unit 21 further tracks the recognized face, and determines the moving direction and the moving distance of the head position. The driver's movement determining unit 21 then outputs determination results to the control processing unit 35.

In accordance with the determination results output from the driver's movement determining unit 21, the control processing unit 35 generates a control signal for performing different display control between the monitor image area and the other areas (hereinafter referred to as the "non-monitor image areas") in the display unit 50, and outputs the control signal to the display adjusting unit 41 and the luminance adjusting unit 42.

In accordance with the control signal from the control processing unit 35, the display adjusting unit 41 performs peripheral area image magnification adjustment on the image signal supplied from the peripheral area imaging unit 11, and performs image compression and the like on the non-monitor image areas, for example.

In accordance with the control signal from the control processing unit 35, the luminance adjusting unit 42 reduces the luminance of the non-monitor image areas in the display unit 50 to a lower luminance than that of the monitor image area. In a case where the display unit 50 is formed with a display element that requires illumination, such as a liquid crystal display element, the luminance adjusting unit 42 controls illumination, such as part of the backlight area of a liquid crystal panel, to reduce the luminance of the non-monitor image areas to a lower luminance than that of the monitor image area. Further, in a case where the display unit 50 is formed with a display element that requires illumination or a light-emitting element such as an organic EL display element, on the other hand, a process may be performed to lower the signal level of the luminance signal corresponding to the non-monitor image areas.

[2-2. Operation of the Second Embodiment]

Figure 11:
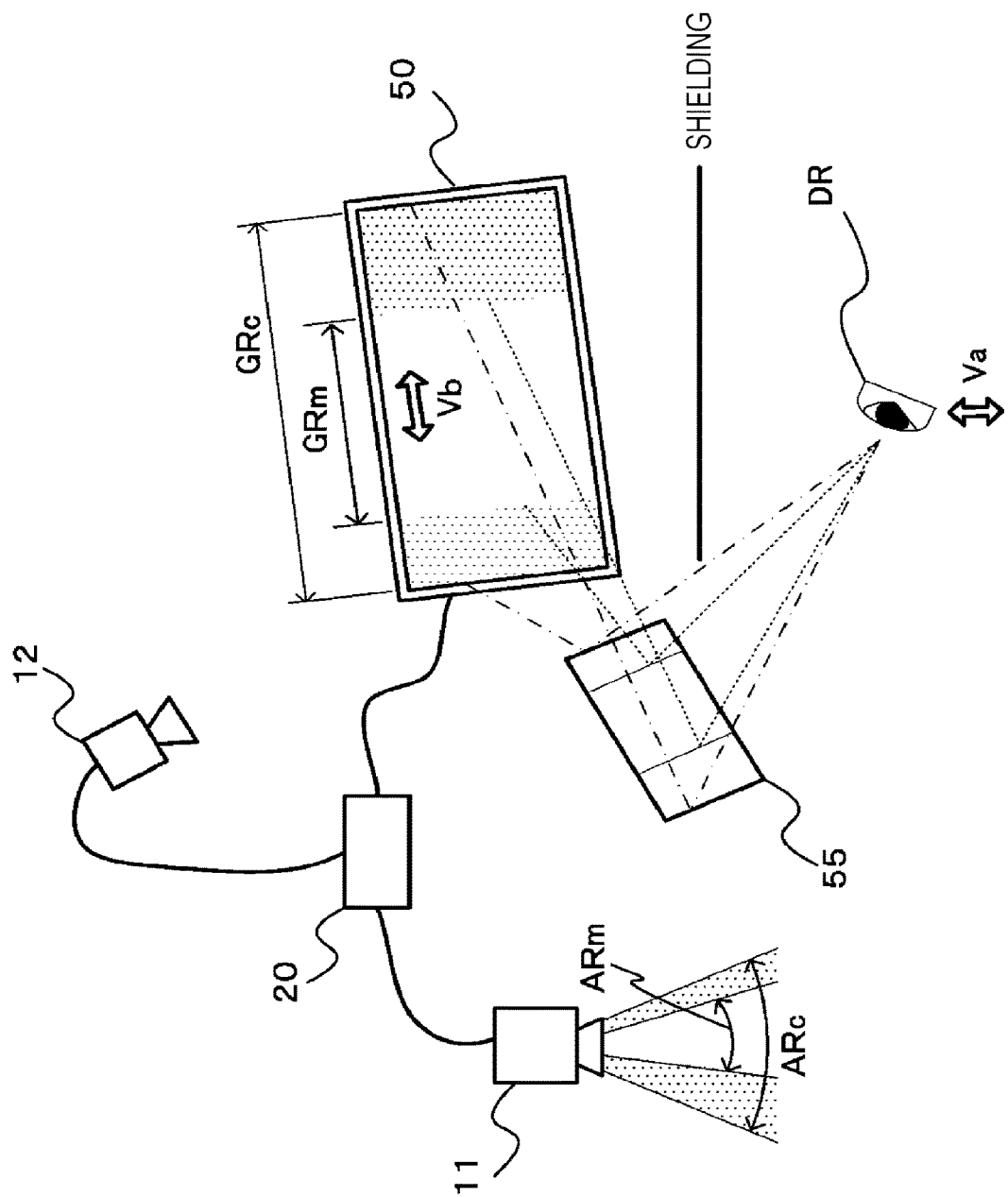
FIG. 11 is a diagram for explaining operation of the second embodiment.

FIG. 11 is a diagram for explaining operation of the second embodiment. The display control unit 20 causes the display unit 50 to display an image of an area ARc imaged by the peripheral area imaging unit 11 in the display area GRc of the display unit 50. The mirror unit 55 is formed with a flat mirror, for example, and has such a size that the driver DR can visually recognize the display area GRc of the display unit 50 when viewing a peripheral area image in an indirect manner via the mirror unit 55.

The display control unit 20 also performs luminance control, a compression process, and the like on the image displayed in the display area GR, and displays the display area GRc so that the image of the visual recognition range that is the peripheral area the driver is to visually recognize via the mirror unit 55 can be identified. It should be noted that the display area corresponding to the visual recognition range is the monitor image area GRm.

Further, the display control unit 20 moves the monitor image area GRm in the direction of an arrow Vb in accordance with the movement of the driver DR imaged by the driver imaging unit 12, or the forward or backward movement of the vehicle (the direction of an arrow Va). Alternatively, the display control unit 20 moves the visual recognition range ARm corresponding to the monitor image area GRm, instead of moving the monitor image area GRm, or expands the monitor image area GRm in the direction of the arrow Vb, for example.

The moving speed of an image may cause the driver to fail to grasp the situation, if a rapid change occurs in the displayed contents of the image while the driver takes a quick look at something other than the monitor image. Therefore, the screen is not quickly moved, and the parallel movement of the displayed image is 0.2 sec/total moving distance (total shift in the angle of view) at a maximum.

Here, the later described screen change response delay time accompanying the detection of the position of the head or the line of sight is restricted to 200 msec or less, so that degradation of the operational feeling can be prevented or reduced to a smaller amount than in a case where a conventional rearview mirror is used, and, at the same time, overlooking of a danger due to a delay in grasping the circumstances can be prevented.

During a very short period after a screen display area change instruction is issued, the driver might perform an operation to obtain direct view information through a window. The direct view information is different from rear peripheral information. In that case, after the driver looks in the direction of the window over the mirror unit 55 and stops paying attention to the screen for an instant, the operation returns to the step of checking the display screen through the mirror unit 55. Therefore, if the contents displayed on the screen are entirely changed, the driver might again fail to grasp the situation. In view of this, the display range in the case of such a screen change is a range of at least one fourth of the original displayed contents after the change, and is restricted to movement in such a range that the screen before the switching change is included in the screen after the change. For example, in a case where the driver returns his/her line of sight to the display unit 50 after switching his/her attention to some other visual information (a direct view over the mirror unit 55 and a window, for example) during screen changing movement, it is possible to lower the possibility of the driver failing to grasp the situation on the display unit for an instant in the continuity of the storage screen.

Figure 12:
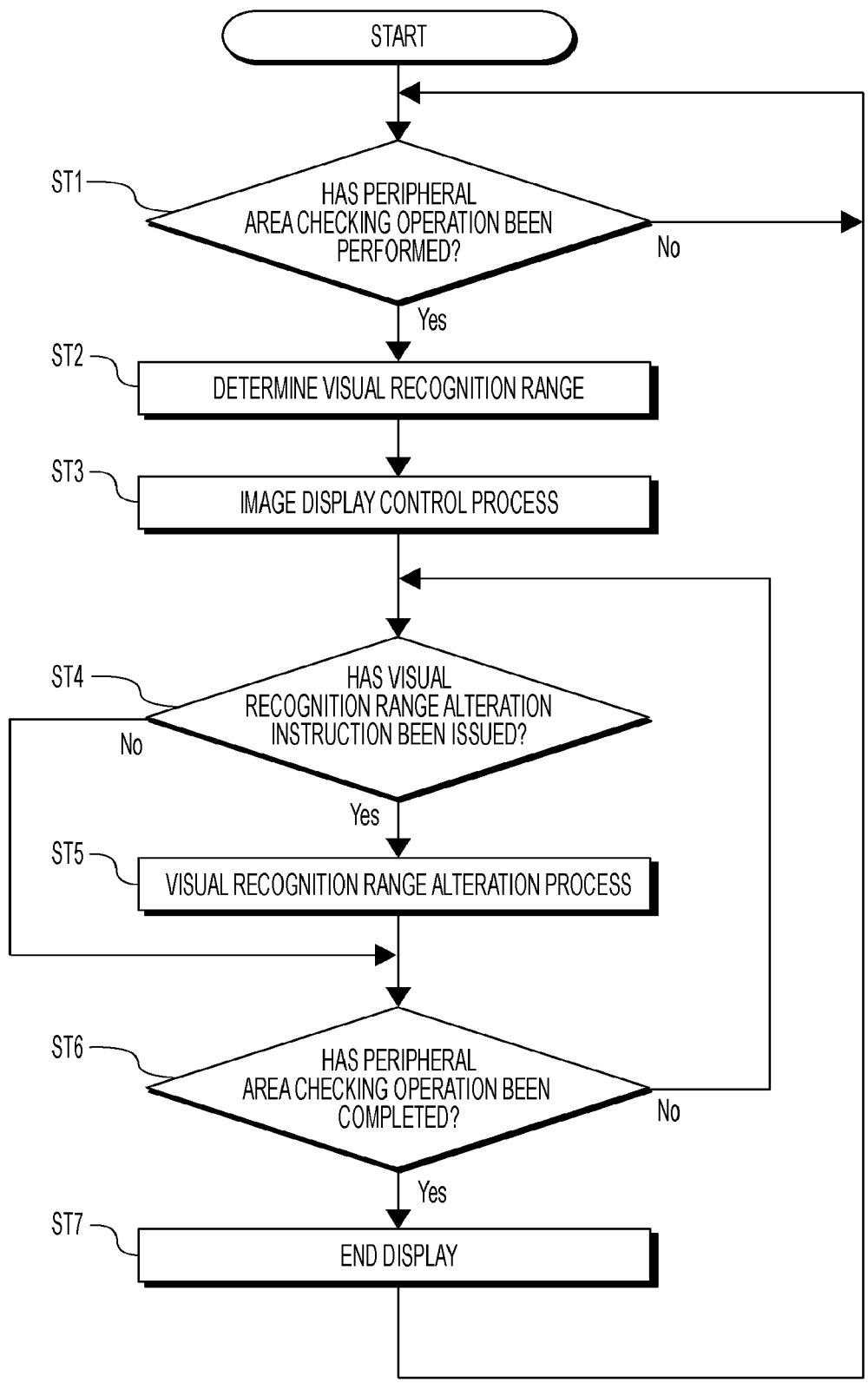
FIG. 12 is a flowchart showing an operation of the display control unit.

FIG. 12 is a flowchart showing an operation of the display control unit. In step ST1, the display control unit 20 determines whether a peripheral area checking operation has been performed. Here, a peripheral area checking operation is an entire operation to be conducted by the driver to view the screen of a display device via a monitoring system formed with an imaging device and the display device. In accordance with an image signal supplied from the driver imaging unit 12, the display control unit 20 determines whether the orientation of the head of the driver and the line of sight are in the direction of the mirror unit 55, for example. In a case where the orientation of the head of the driver and the line of sight are in the direction of the mirror unit 55, or where the driver turns his/her head to the mirror unit 55, for example, the display control unit 20 determines that a peripheral area checking operation has been performed, and moves on to step ST2. Further, in a case where the orientation of the head of the driver and the line of sight are not in the direction of the mirror unit 55, on the other hand, the display control unit 20 determines that any peripheral area checking operation has not been performed, and returns to step ST1.

In step ST2, the display control unit 20 determines a visual recognition range. In accordance with an image signal supplied from the driver imaging unit 12, the display control unit 20 detects the head position of the driver, for example, and, from the detected head position, determines the visual recognition range to be viewed via the mirror unit 55. The display control unit 20 then moves on to step ST3.

In step ST3, the display control unit 20 performs an image display control process. The display control unit 20 causes the display unit 50 to display an image of the visual recognition range as an image of the monitor image area. In a case where a high-luminance object is included in a non-monitor image area, the display control unit 20 also controls part of the backlight and the luminance level so that the contents of high-radiance display of the image do not interfere with the field of view of the driver. In a case where a predetermined area of the display unit 50 is set as the monitor image area, the display control unit 20 also performs a compression process or the like on the images of the peripheral area corresponding to the non-monitor image areas so that a desired visual recognition range can be checked from the image of the monitor image area. The display control unit 20 performs the image display control process, and then moves on to step ST4.

In step ST4, the display control unit 20 determines whether a visual recognition range alteration instruction has been issued. In accordance with an image signal supplied from the driver imaging unit 12, the display control unit 20 determines the head position of the driver, for example, and determines whether an instructing operation to alter the visual recognition range in the peripheral area has been performed. In a case where the head position of the driver has moved in a certain manner, the display control unit 20 determines that a visual recognition range alteration instruction has been issued, and moves on to step ST5. Further, in a case where the head position of the driver has not moved in a certain manner, on the other hand, the display control unit 20 determines that any visual recognition range alteration instruction has not been issued, and moves on to step ST6.

In step ST5, the display control unit 20 performs a visual recognition range alteration process. As the head position of the driver moves, the display control unit 20 moves the visual recognition range to be visually recognized by the driver. The display control unit 20 controls the backlight and the luminance level, for example, to move the area to be darkly displayed in synchronization with movement of the head position of the driver. In this manner, the display control unit 20 alters the monitor image area to be brightly displayed. The display control unit 20 also further compresses the image of the non-monitor image area provided on the opposite side of the moving direction of the monitor image area, for example, so that the visual recognition range having its image displayed in the monitor image area is moved in accordance with movement of the head position of the driver. Also, the peripheral area range to be displayed in the non-monitor image area provided in the moving direction of the monitor image area is small, and therefore, the compression rate in this non-monitor image area is lower. The display control unit 20 performs the visual recognition range alteration process, and then moves on to step ST6.

In step ST6, the display control unit 20 determines whether the peripheral area checking operation has been completed. In accordance with an image signal supplied from the driver imaging unit 12, the display control unit 20 determines whether the orientation of the head of the driver and the line of sight are no longer in the direction of the mirror unit 55, for example. In a case where the orientation of the head of the driver and the line of sight continue to be in the direction of the mirror unit 55, the display control unit 20 determines that the peripheral area checking operation has not been completed, and returns to step ST4. Further, in a case where the orientation of the head of the driver and the line of sight are no longer in the direction of the mirror unit 55, on the other hand, the display control unit 20 determines that the peripheral area checking operation has been completed, and moves on to step ST7.

In step ST7, the display control unit 20 ends the display. The display control unit 20 ends the display of the image of the peripheral area on the display unit 50 to let the driver concentrate on driving, and then returns to step ST1.

Figure 13:
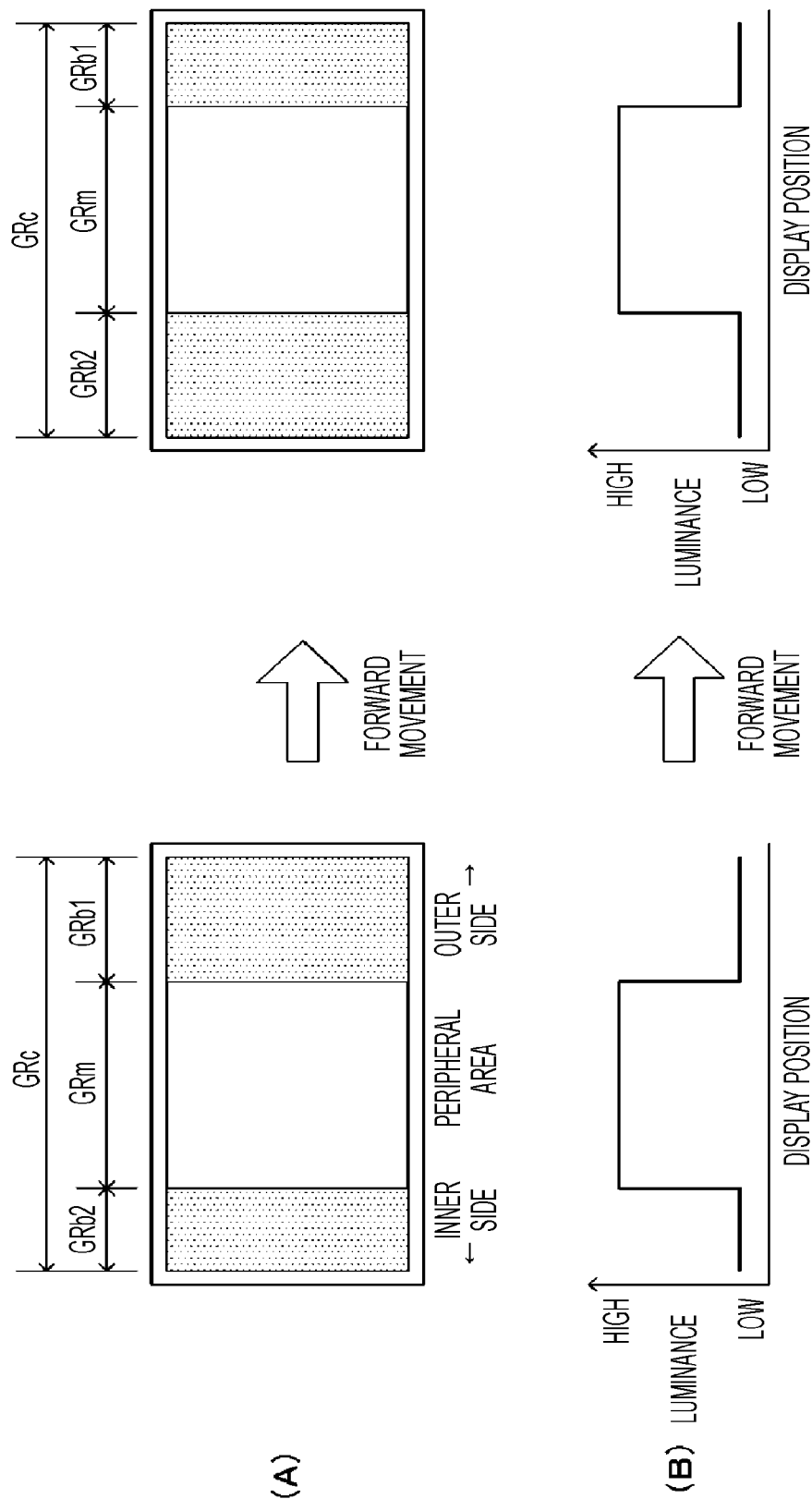
FIG. 13 is a diagram for explaining a first display control operation of the display control unit.

FIG. 13 is a diagram for explaining a first display control operation of the display control unit. In the first display control operation, when displaying an image of the peripheral area, the display control unit lowers the luminance of the entire or part of the images of the ranges other than the visual recognition range, to prevent the driver from seeing these ranges. In this manner, the driver can check a desired visual recognition range in the peripheral area by viewing the image via the mirror unit 55 as in a case where a rearview mirror is used. Also, this effectively eliminates unnecessary brightness of non-monitor image areas, which causes glare particularly at night-time.

(A) of FIG. 13 shows the display on the display unit 50, and (B) of FIG. 13 shows the relationship between the display position on the display unit 50 and luminance. The display control unit 20 reduces the luminance of non-monitor image areas GRb1 and GRb2 that are the image areas corresponding to the ranges other than the visual recognition range, to a lower luminance than that of the monitor image area GRm corresponding to the visual recognition range, so that the images of the non-monitor image areas GRb1 and GRb2 cannot be easily seen. For example, in a case where the display unit 50 is formed with a liquid crystal display element, light emission from the backlight is controlled so that the non-monitor image areas GRb1 and GRb2 are darkened. Further, in a case where the display unit 50 is formed with an organic EL display element, the signal level of the luminance signal is controlled so that the non-monitor image areas GRb1 and GRb2 are darkened. As the non-monitor image areas GRb1 and GRb2 are darkened in the image displayed on the display unit 50 in this manner, the driver DR can view only the image of the monitor image area GRm. Thus, the driver DR can check the situation in the visual recognition range ARm in the peripheral area by viewing the image displayed on the display unit 50 via the mirror unit 55.

Further, when the display control unit 20 determines that the head position of the driver DR has moved in the forward direction of the vehicle, for example, the display control unit 20 moves the monitor image area GRm in accordance with the movement of the head position, and moves the visual recognition range in the peripheral area to be visually recognized via the mirror unit 55 to the outer side. Specifically, the display control unit 20 controls the luminance of the image so that the width of the non-monitor image area GRb1 becomes smaller while the width of the non-monitor image area GRb2 becomes greater as the head position moves in the forward direction of the vehicle. Through such display control, the image of the monitor image area GRm moves to an outer range in the peripheral area, compared with the monitor image area GRm prior to the movement. When the display control unit 20 determines that the head position of the driver DR has moved in the backward direction of the vehicle, for example, the display control unit 20 controls the luminance of the image so that the width of the non-monitor image area GRb1 becomes greater while the width of the non-monitor image area GRb2 becomes smaller as the head position moves, though not shown in the drawing. Through such display control, the image of the monitor image area GRm moves to an inner range in the peripheral area, compared with the monitor image area GRm prior to the movement. Because of this, by moving his/her head position, the driver can check a desired visual recognition range in the peripheral area as in a case where a rearview mirror is used. Also, the display unit 50 and the mirror unit 55 are installed inside a vehicle. Accordingly, it is possible to check the peripheral area, without any adverse influence of a side window as in a case where a rearview mirror is used.

Figure 14:
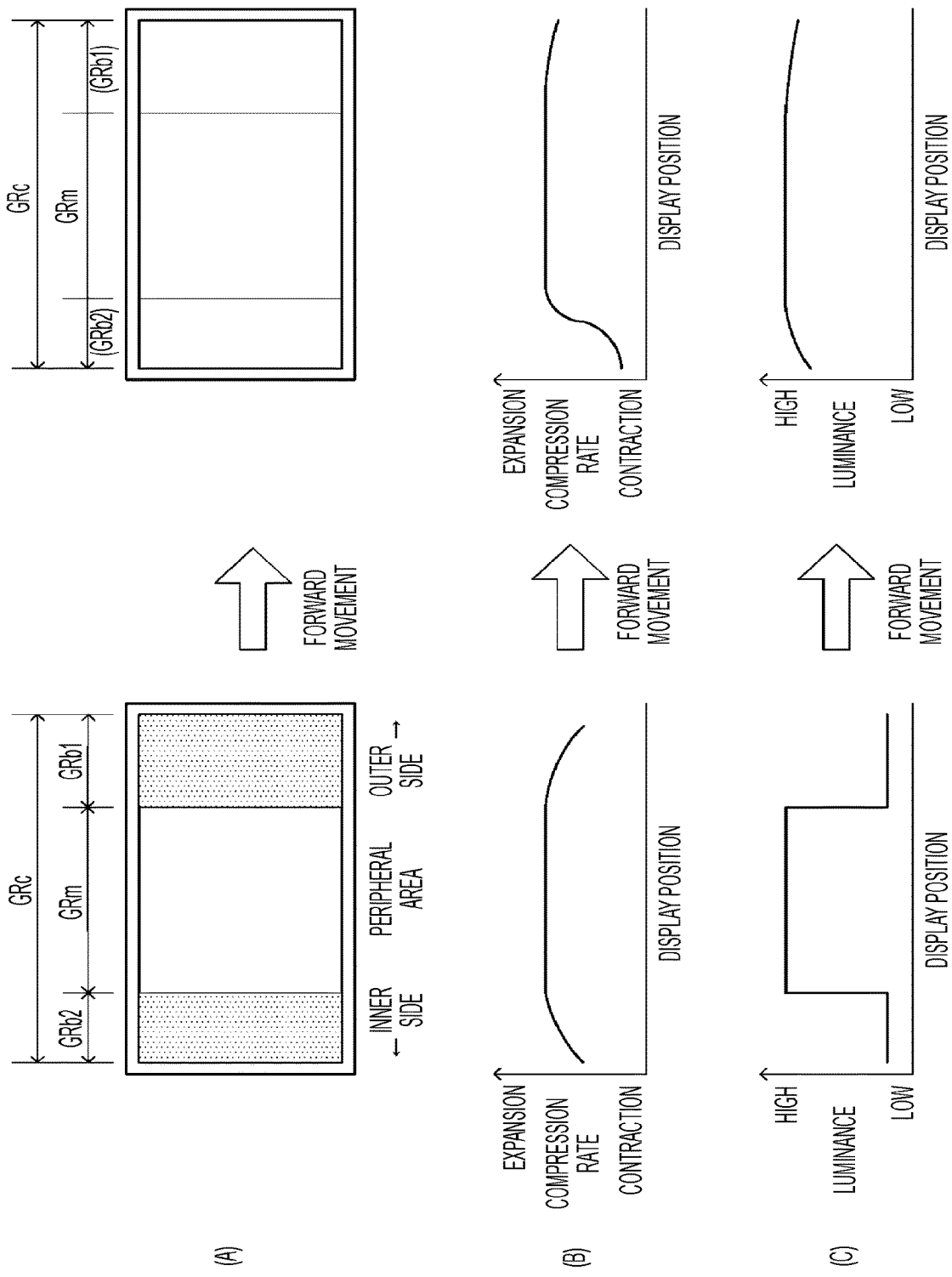
FIG. 14 is a diagram for explaining a second display control operation of the display control unit.

FIG. 14 is a diagram for explaining a second display control operation of the display control unit. In the second display control operation, when an image of the peripheral area is displayed, the display control unit compresses the images of the ranges other than the visual recognition range in the moving direction of the monitor image area GRm, instead of moving the monitor image area GRm. By compressing the images in this manner, the display control unit moves the visual recognition range ARm corresponding to the monitor image area GRm so that a desired visual recognition range in the peripheral area can be checked.

(A) of FIG. 14 shows the display on the display unit 50. (B) of FIG. 14 shows the relationship between the display position on the display unit 50 and compression rate. (C) of FIG. 14 shows the relationship between display position on the display unit 50 and luminance. The display control unit 20 performs display control on the non-monitor image areas GRb1 and GRb2 that are the image areas corresponding to the ranges other than the visual recognition range. Through the display control, the image compression rate becomes higher at portions closer to the edge portions. As the non-monitor image areas GRb1 and GRb2 are compressed and the rate of compression of the non-monitor image areas GRb1 and GRb2 is adjusted in this manner, the visual recognition range ARm corresponding to the monitor image area GRm becomes movable.

When determining that an instruction to move the visual recognition range in the peripheral area to the outer side as the head position of the driver DR moves has been issued, or when determining that the driver has moved his/her head forward, the display control unit 20 moves the visual recognition range corresponding to the monitor image area GRm to the outer side. Specifically, the display control unit 20 controls the image compression rate so that the peripheral area relative to the non-monitor image area GRb2 becomes larger. Also, the compression and the luminance of the non-monitor image area GRb1 corresponding to the outward direction are lowered, so that the range outside the visual recognition range can be checked from the image of the non-monitor image area GRb1. That is, the visual recognition range can be expanded. It should be noted that a decrease only in the luminance of the non-monitor image area GRb1 enables checking of the range outside the visual recognition range. Thus, the visual recognition range can be expanded.

Figure 15:
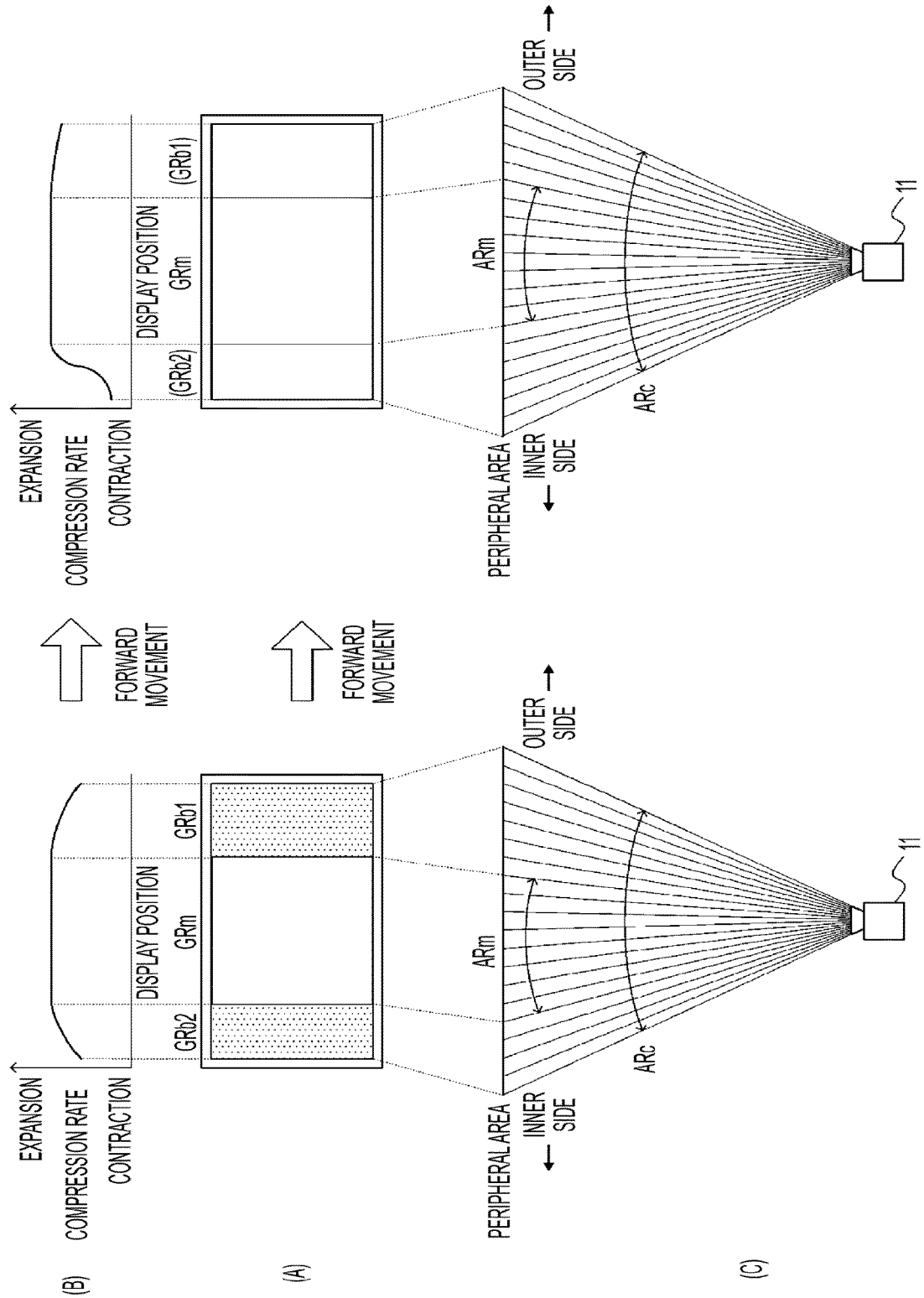
FIG. 15 shows the relationship among the display on the display unit, the compression rate, and the peripheral area.

FIG. 15 shows the relationship among the display on the display unit, the compression rate, and the peripheral area. It should be noted that (A) of FIG. 15 shows the display on the display unit 50. (B) of FIG. 15 shows the relationship between the display position on the display unit 50 and compression rate. (C) of FIG. 15 shows the imaging range of the peripheral area imaging unit 11. In the monitor image area GRm, an image of the visual recognition range ARm is displayed. I the non-monitor image area GRb1, a compressed image of the outer side of the visual recognition range ARm is displayed. In the non-monitor image area GRb2, a compressed image of the inner side of the visual recognition range ARm is displayed. When determining that an instruction to move the visual recognition range to the outer side has been issued in this case, the display control unit 20 controls the image compression rate so that the peripheral area relative to the non-monitor image area GRb2 becomes larger. Accordingly, the visual recognition range ARm corresponding to the monitor image area GRm moves to the outer side of the peripheral area.

Further, when determining that an instruction to move the visual recognition range to the inner side has been issued, or when determining that the driver has moved his/her head backward, on the other hand, the display control unit 20 controls the image compression rate so that the peripheral area relative to the non-monitor image area GRb2 becomes larger. Accordingly, the visual recognition range ARm corresponding to the monitor image area GRm moves to the inner side of the peripheral area.

Further, before an instruction to alter the visual recognition range has been issued, the display control unit 20 reduces the luminance of non-monitor image areas GRb1 and GRb2 to a lower luminance than that of the monitor image area GRm corresponding to the visual recognition range, so that the images of the non-monitor image areas GRb1 and GRb2 cannot be easily seen. For example, in a case where the display unit 50 is formed with a liquid crystal display element, light emission from the backlight is controlled so that the non-monitor image areas GRb1 and GRb2 are darkened. Further, in a case where the display unit 50 is formed with an organic EL display element, the signal level of the luminance signal is controlled so that the non-monitor image areas GRb1 and GRb2 are darkened. As the non-monitor image areas GRb1 and GRb2 are darkened in the image displayed on the display unit 50 in this manner, the driver DR can view only the image of the monitor image area GRm. Thus, the driver DR can check the situation in the visual recognition range ARm in the peripheral area by viewing the image displayed on the display unit 50 via the mirror unit 55. In a case where an instruction to alter the visual recognition range has been issued after that, the display control unit 20 adjusts the luminance level of the non-monitor image areas to a level closer to the luminance level of the monitor image area GRm.

Where such display control is performed, the visual recognition range ARm corresponding to the monitor image area GRm is moved in accordance with a visual recognition range alternation instruction issued by the driver. Thus, the driver can easily check a desired range in the peripheral area. Further, as the luminance level of the non-monitor image areas becomes similar to the luminance level of the monitor image area GRm, the non-monitor image areas are not distinguished from the monitor image area GRm. Thus, the visual recognition range can be automatically expanded. Further, the driver can alter the visual recognition range simply by issuing an alteration instruction. Accordingly, the driver can easily check a desired peripheral range without moving his/her head position forward or the like until the desired peripheral range is reflected by a rearview mirror as in a case where a conventional rearview mirror is used. Also, the display unit 50 and the mirror unit 55 are installed inside a vehicle. Accordingly, it is possible to check the peripheral area, without any adverse influence of a side window as in a case where a rearview mirror is used.

It should be noted that, when the driver issues a visual recognition range alteration instruction, the luminance level of the non-monitor image areas may be low. In this case, the monitor image area GRm is not expanded, and an image of the visual recognition range moved in accordance with the alteration instruction is displayed with a predetermined luminance. Also, the compression characteristics and the luminance characteristics of the non-monitor image areas are not limited to the characteristics shown in FIG. 14. For example, the compression rate may be rapidly changed, and the luminance level may be slowly changed. Also, if the driver can select compression characteristics and luminance characteristics, an image of the peripheral area can be displayed to the driver's liking. Further, the expansion and contraction of the visual recognition range, the magnification of the displayed image, and the like may be changed in accordance with a visual recognition range alteration instruction. For example, the driver DR moving closer to the mirror unit 55 or an operation to move closer to the mirror unit 55 is regarded as a visual recognition range alteration instruction, and an image of a wide visual recognition range or an image of the visual recognition range with a low magnification (such an image is a first image, for example) is displayed. Also, the driver DR moving away from the mirror unit 55 or an operation to move away from the mirror unit 55 is regarded as a visual recognition range alteration instruction, and an image of a narrower visual recognition range than that of the first image or an image with a high magnification than that of the first image is displayed.

3. Third Embodiment

A third embodiment concerns a case where the peripheral area the driver wishes to check changes with the driving situation of the vehicle. Specifically, the image area to be presented to the driver of a vehicle from an image obtained by imaging a peripheral area around the vehicle is set in accordance with driving information related to the driving situation of the vehicle, and the visual recognition range in the peripheral area the driver can visually recognize from the presented image is controlled in accordance with the driving situation. For example, the vehicle can be separated into a car portion to be driven by the driver (this portion will be hereinafter referred to as the "cabin") and a car portion joined to the cabin (this portion will be hereinafter referred to as the "trailer portion"), like a trailer, an articulated bus, or a camping traction vehicle. In a case where the orientation of the cabin and the orientation of the trailer portion change with the driving situation, the visual recognition range in the peripheral area the driver can visually recognize is controlled in accordance with the driving situation as will be described below.

[3-1. Configuration of a Third Embodiment]

Figure 16:
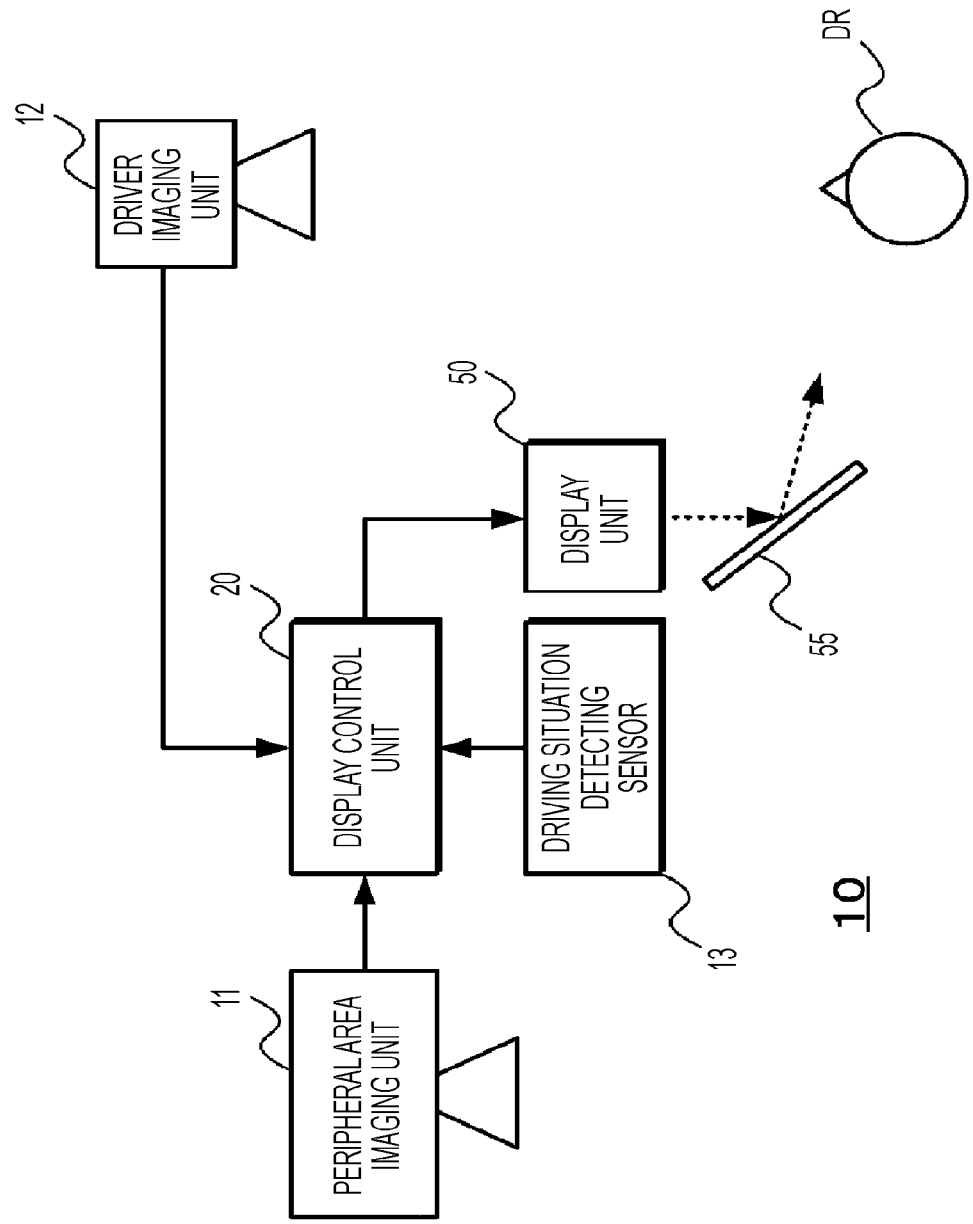
FIG. 16 is a diagram showing an example configuration of a third embodiment.

FIG. 16 shows an example configuration of a third embodiment. A display device 10 includes peripheral area imaging units 11a and 11b, a driver imaging unit 12, a display control unit 20, a display unit 50, and a mirror unit 55. It should be noted that the driver imaging unit 12, a driving situation detecting sensor 13, the display unit 50, the mirror unit 55, and the driver DR are in the positional relationship shown in FIG. 9.

The peripheral area imaging units 11a and 11b image a peripheral area around the vehicle, and output image signals to the display control unit 20. The peripheral area imaging units 11a and 11b are disposed in predetermined positions that differ from each other in the traveling direction of the vehicle. For example, the peripheral area imaging unit 11a is disposed in a predetermined position on the cabin side (or in the position of a conventional rearview mirror, for example), and the peripheral area imaging unit 11b is disposed in a predetermined position on the trailer portion side (or in such a position near the cabin side that the peripheral area close to the cabin side of the trailer portion is included in the imaging range, for example). It should be noted that the area to be imaged by the peripheral area imaging unit 11a is a first current peripheral area to be imaged, and the area to be imaged by the peripheral area imaging unit 11b is a second current peripheral area to be imaged.

The driver imaging unit 12 is disposed in front of the driver DR or in the direction of the mirror unit 55, for example, so that the head position of the driver DR, the orientation of the head, the line of sight, and the like can be determined. The driver imaging unit 12 images the driver DR, and outputs an image signal to the display control unit 20.

The driving situation detecting sensor 13 obtains driving information that is information related to the driving situation, such as information indicating a steering state, information indicating a connection state of the trailer portion, information such as a bend angle of the trailer portion with respect to the cabin, gear position information, vehicle speed information, direction indicator setting information, current position information (a positioning signal from a satellite positioning system, for example), and the like. The driving situation detecting sensor 13 outputs the obtained driving information as sensor information to the display control unit 20.

In accordance with the driving information related to the driving situation of the vehicle, the display control unit 20 sets the image area to be presented to the driver of the vehicle from an image obtained by imaging a peripheral area around the vehicle, and controls the visual recognition range in the peripheral area the driver can visually recognize from the presented image in accordance with the driving situation so that the visual recognition range moves toward the outer side of the vehicle. That is, in accordance with the image signals generated by the peripheral area imaging units 11a and 11b, the display control unit 20 causes the display unit 50 to display a peripheral area image. Also, in accordance with the sensor information from the driving situation detecting sensor 13, or in accordance with the sensor information from the driving situation detecting sensor 13, the head position of the driver, the orientation of the head, the line of sight, movement of the position and the orientation, and the like, the display control unit 20 sets the image area to be presented to the driver, and controls display of the peripheral area image to be displayed on the display unit 50.

The display unit 50 is disposed so that the driver can visually recognize the display surface of the display unit 50 in an indirect manner via the mirror unit 55. Also, the size of the display surface of the display unit 50 is larger than the size of the beam of light reaching the mirror surface of the mirror unit 55 as shown in FIG. 4, so that the driver DR can visually recognize the image displayed on the display unit 50 via the mirror unit 55 even when moving his/her head position to check a wide area on a rearview mirror while driving, for example. It should be noted that, in the image displayed on the display unit 50, the image area corresponding to the visual recognition range in the peripheral area to be checked by the driver via the mirror unit 55 is the monitor image area.

The mirror unit 55 is disposed so that the driver DR can visually recognize the display surface of the display unit 50 in an indirect manner. The mirror unit 55 is disposed in the position of a pillar, for example, so that the driver DR can visually recognize the image reflected by the mirror unit 55 when taking an action to look into a conventional rearview mirror in the vehicle, for example. Also, the positional relationship of the mirror unit 55 with the display unit 50 and the size of the mirror unit 55 are set so that the entire display area of the display unit 50 is reflected by the mirror unit 55 when the driver DR views a peripheral area image in an indirect manner via the mirror unit 55. Further, the display unit 50 and the mirror unit 55 are subjected to display control being performed by the display control unit 20 so that the visual recognition range the driver can visually recognize from the image on the display unit 50 reflected by the mirror unit 55 in the peripheral area is changed with movement of the position of visual recognition of the driver relative to the mirror unit 55. It should be noted that the size of the mirror unit 55 is preferably set in the same manner as in the first embodiment and the second embodiment so that a function effect similar to that of a conventional rearview mirror can be achieved.

The display device 10 enables the driver DR to visually recognize a peripheral area image in an indirect manner via the mirror unit 55, and increases the distance between the driver DR and the display surface of the display unit 50 to a longer distance than that in a case where the driver DR directly views the display surface of the display unit 50.

Also, in the display device 10, the driver DR visually recognizes a peripheral area image in an indirect manner via the mirror unit 55, and therefore, the display unit 50 is positioned so that the driver DR cannot see the display surface and the light illuminating the display surface. Alternatively, a shield may be provided so that the driver DR cannot see the display surface of the display unit 50 and the display light.

Figure 17:
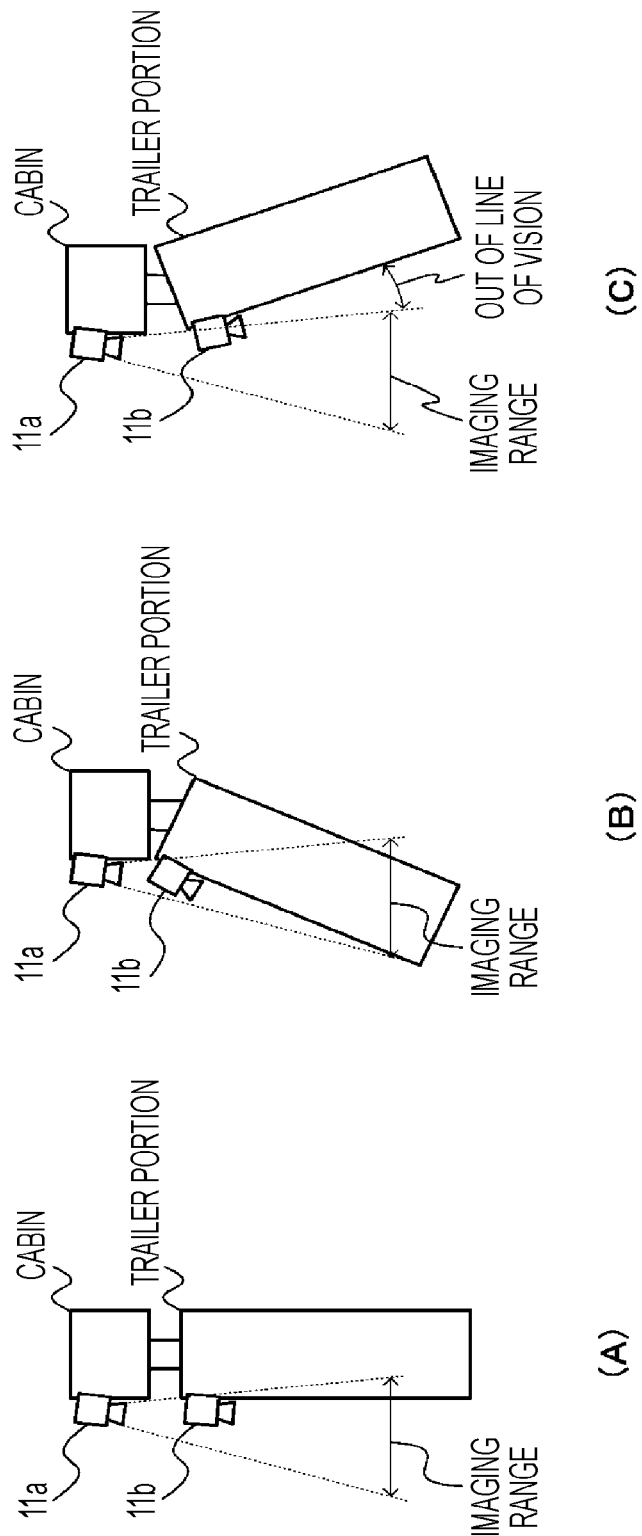
FIG. 17 is a diagram showing an example of arrangement of peripheral area imaging units.

FIG. 17 shows an example of arrangement of the peripheral area imaging units. It should be noted that the drawing shows an example case where the peripheral area imaging units are disposed on the left side surface of a trailer, for example, and does not show the peripheral area imaging units disposed on the right side surface.

As described above, the peripheral area imaging unit 11a is disposed on the cabin side, and the peripheral area imaging unit 11b is disposed on the trailer portion side. It should be noted that the area to be imaged by the peripheral area imaging unit 11a is a first current peripheral area to be imaged, and the area to be imaged by the peripheral area imaging unit 11b is a second current peripheral area to be imaged.

(A) of FIG. 17 shows a case where the cabin and the trailer portion are linearly arranged. (B) of FIG. 17 shows a situation where the position of the trailer portion relative to the cabin is tilted toward the position of the peripheral area imaging unit 11a. (C) of FIG. 17 shows a situation where the position of the trailer portion relative to the cabin is tilted in the opposite direction from the position of the peripheral area imaging unit 11a. When the situation of the trailer portion changes from that shown in (A) of FIG. 17 to that shown in (B) of FIG. 17, the image portion showing the trailer portion becomes larger in the image obtained by the peripheral area imaging unit 11a, and hinders the driver from checking the peripheral area. Further, when the situation of the trailer portion changes from that shown in (A) of FIG. 17 to that shown in (C) of FIG. 17, the trailer portion moves away from the imaging range of the peripheral area imaging unit 11a, and a portion near the peripheral area imaging unit 11a moves out of the driver's line of vision. On the other hand, the peripheral area imaging unit 11b is attached to the trailer portion. Accordingly, the image obtained by the peripheral area imaging unit 11b is an image showing the peripheral area, regardless of the positional relationship between the cabin and the trailer portion.

In view of this, the display control unit 20 performs display control, using an image obtained by the peripheral area imaging unit 11a and an image obtained by the peripheral area imaging unit 11b in accordance with the driving situation or the driver's intention. Thus, the peripheral area can be checked via the mirror unit 55

Figure 18:
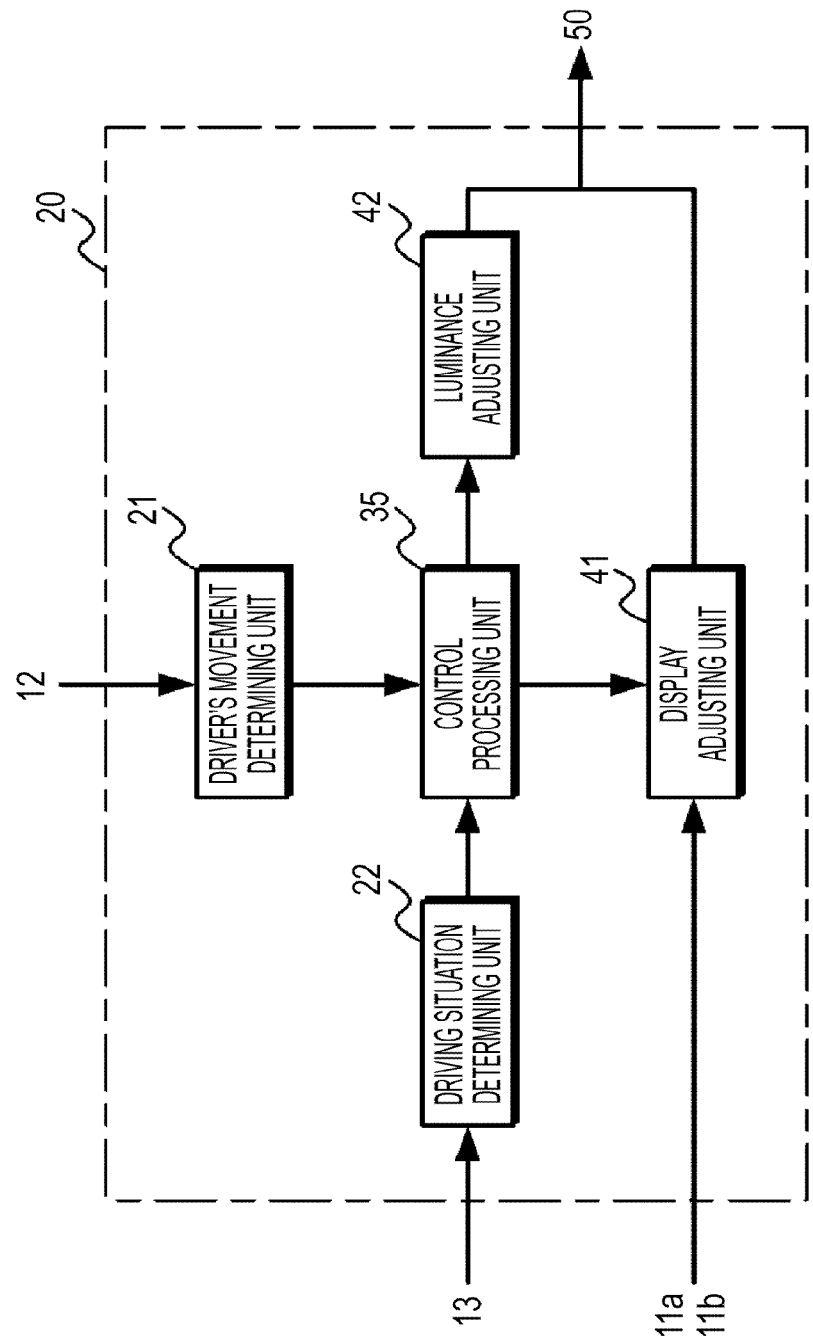
FIG. 18 is a diagram showing the configuration of a display control unit.

FIG. 18 is a diagram showing the configuration of the display control unit. The display control unit 20 includes a driver's movement determining unit 21, a driving situation determining unit 22, a control processing unit 35, a display adjusting unit 41, and a luminance adjusting unit 42.

In accordance with an image signal supplied from the driver imaging unit 12, the driver's movement determining unit 21 detects the head position of the driver, and determines the moving direction and the moving distance of the head position of the driver. In accordance with the image signal supplied from the driver imaging unit 12, for example, the driver's movement determining unit 21 recognizes the face of the driver, and determines the position of the recognized face and the orientation of the face. The driver's movement determining unit 21 further tracks the recognized face, and determines the moving direction and the moving distance of the head position. The driver's movement determining unit 21 then outputs determination results to the control processing unit 35.

In accordance with sensor information supplied from the driving situation detecting sensor 13, the driving situation determining unit 22 determines the driving situation. In accordance with a gear position and the like, the driving situation determining unit 22 determines whether the vehicle is moving forward or whether the vehicle is moving backward. In accordance with the vehicle speed, direction indicator setting information, a steering state, and the like, the driving situation determining unit 22 determines whether the vehicle is moving straight ahead, is turning right, or is turning left. Further, in accordance with information such as the connection state of the trailer portion and the bend angle of the trailer portion with respect to the cabin, the driving situation determining unit 22 also determines whether the vehicle is turning right or left at an obtuse angle or is turning right or left at an acute angle. In accordance with current position information and the like, the driving situation determining unit 22 determines whether the running vehicle is currently located at a traffic circle or the like. The driving situation determining unit 22 then outputs determination results to the control processing unit 35.

In accordance with the determination results output from the driving situation determining unit 22, or in accordance with the determination results output from the driver's movement determining unit 21 and the driving situation determining unit 22, the control processing unit 35 generates a control signal for performing different display control between the monitor image area and the non-monitor image areas in the display unit 50, and outputs the control signal to the display adjusting unit 41 and the luminance adjusting unit 42.

In accordance with the control signal from the control processing unit 35, the display adjusting unit 41 performs peripheral area image magnification adjustment on the image signals supplied from the peripheral area imaging units 11, and performs image compression and the like on the non-monitor image areas, for example. Further, in accordance with the control signal from the control processing unit 35, the display adjusting unit 41 may also switch or combine the peripheral area images obtained by the peripheral area imaging units, or adjust the display width of the peripheral area to be displayed, for example.

In accordance with the control signal from the control processing unit 35, the luminance adjusting unit 42 reduces the luminance of the non-monitor image areas in the display unit 50 to a lower luminance than that of the monitor image area. In a case where the display unit 50 is formed with a display element that requires illumination, such as a liquid crystal display element, the luminance adjusting unit 42 controls illumination, such as a backlight, to reduce the luminance of the non-monitor image areas to a lower luminance than that of the monitor image area. Further, in a case where the display unit 50 is formed with a display element that requires illumination or a light-emitting element such as an organic EL display element, on the other hand, a process may be performed to lower the signal level of the luminance signal corresponding to the non-monitor image areas.

[3-2. Operation of the Third Embodiment]

Figure 19:
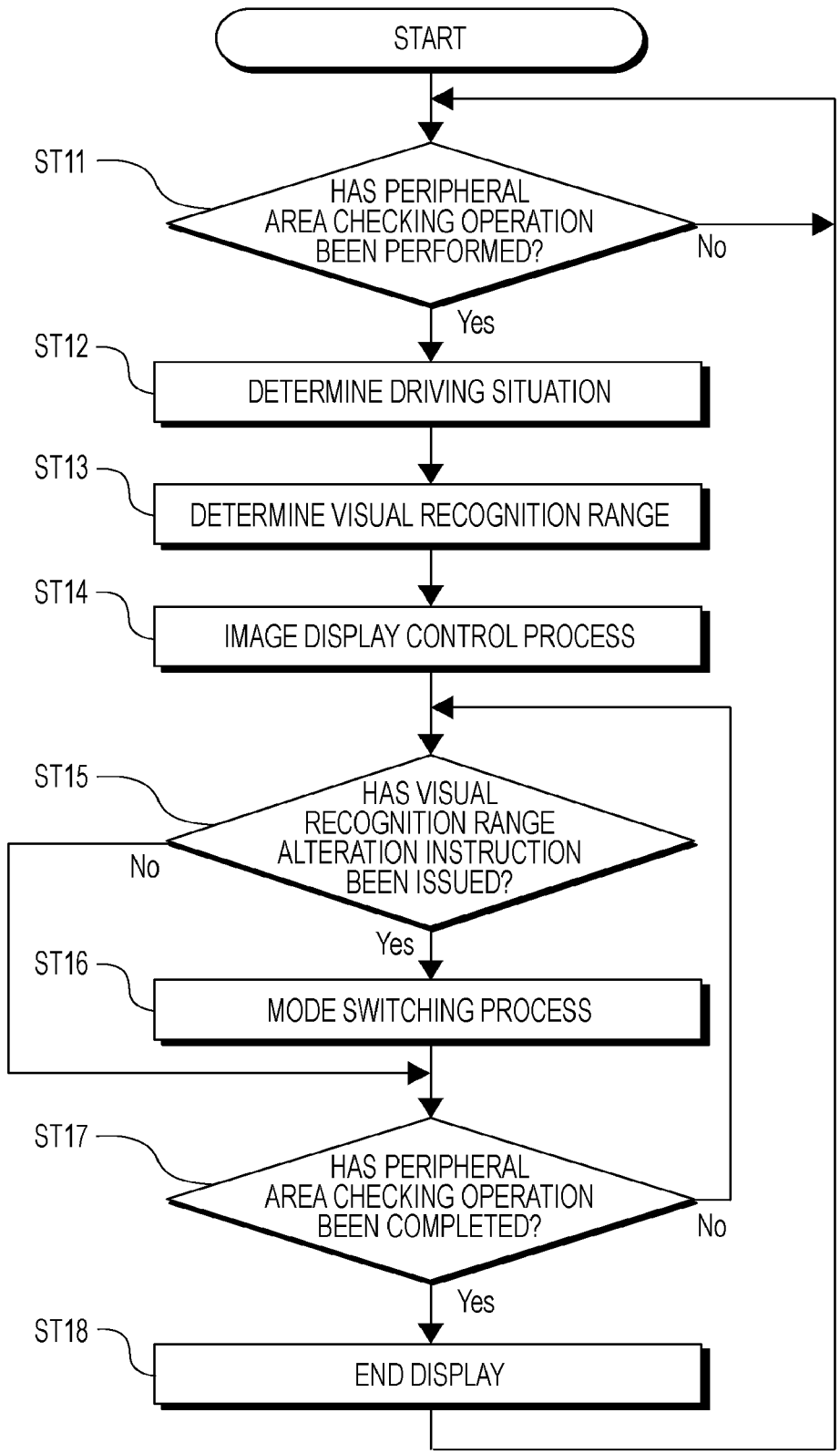
FIG. 19 is a flowchart showing an operation of the display control unit.

FIG. 19 is a flowchart showing an operation of the display control unit according to the third embodiment. In step ST11, the display control unit 20 determines whether a peripheral area checking operation has been performed. In accordance with an image signal supplied from the driver imaging unit 12, the display control unit 20 determines whether the orientation of the head of the driver and the line of sight are in the direction of the mirror unit 55, for example. In a case where the orientation of the head of the driver and the line of sight are in the direction of the mirror unit 55, or where the driver turns his/her head to the mirror unit 55, for example, the display control unit 20 determines that a peripheral area checking operation has been performed, and moves on to step ST12. Further, in a case where the orientation of the head of the driver and the line of sight are not in the direction of the mirror unit 55, on the other hand, the display control unit 20 determines that any peripheral area checking operation has not been performed, and returns to step ST11.

In step ST12, the display control unit 20 determines a driving situation. In accordance with sensor information supplied from the driving situation detecting sensor 13, the display control unit 20 determines a driving situation. The display control unit 20 determines whether the vehicle is moving forward or backward, whether the vehicle is moving straight ahead, is turning right, or is turning left, whether the vehicle is turning right or left at an obtuse angle or is turning right or left at an acute angle, whether the running vehicle is located at a traffic circle, and the like, and then moves on to step ST13.

In step ST13, the display control unit 20 determines a visual recognition range. In accordance with the driving situation determination results, the display control unit 20 determines the visual recognition range to be visually recognized via the mirror unit 55, and then moves on to step ST14. It should be noted that, in determining a visual recognition range, the display control unit 20 may determine a visual recognition range including the head position of the driver.

Figure 20:
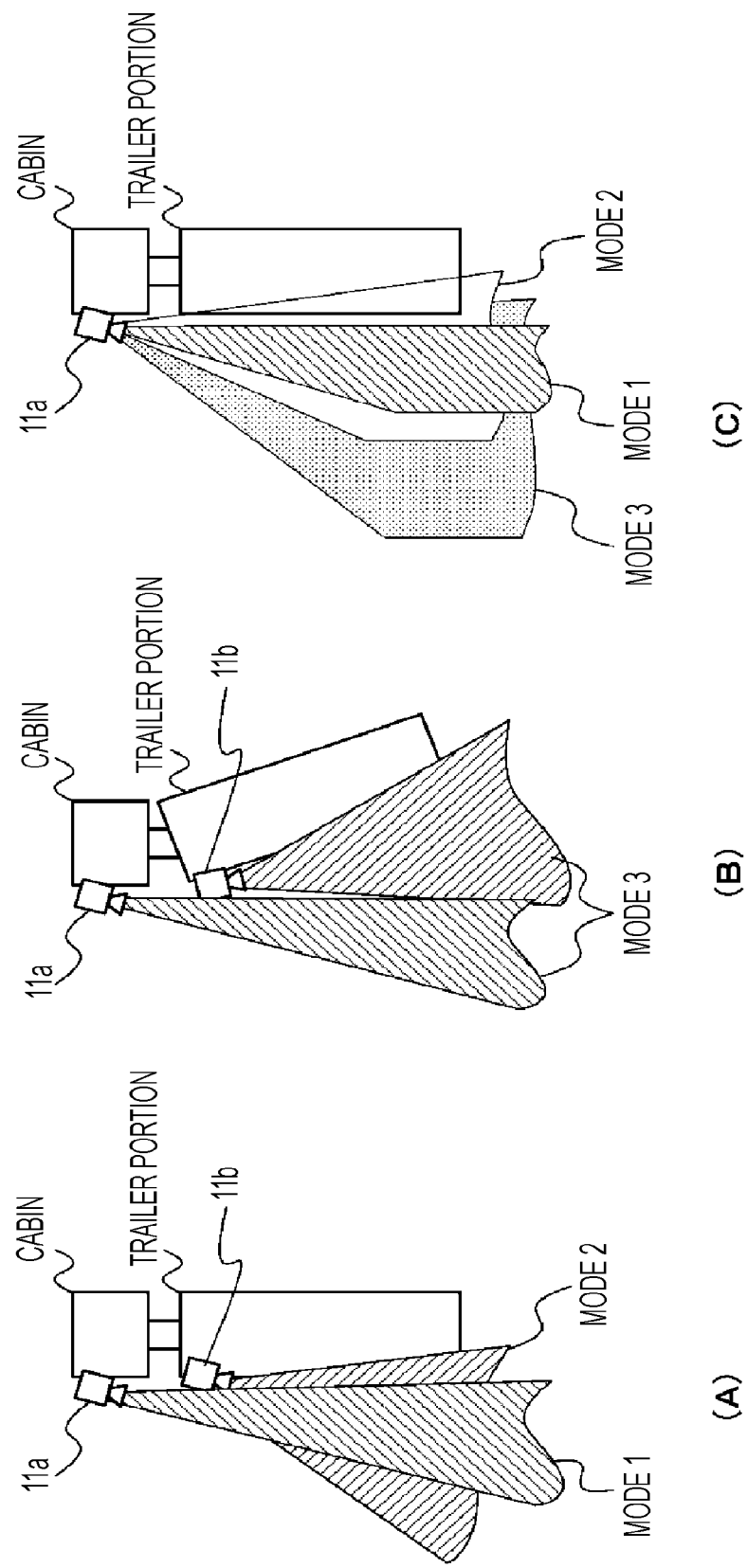
FIG. 20 is a diagram showing examples of visual recognition range modes.

FIG. 20 shows examples of visual recognition range modes. Mode 1 is a mirror viewing requiring range during normal running, for example. Mode 2 is such a range that the driver can visually recognize wider inner and outer ranges than the mirror viewing requiring range during normal running, for example. Mode 3 is such a range that the driver can view the outside of the vehicle without his/her line of sight being blocked from the driver's view while moving backward, for example. Here, the imaging range of the peripheral area imaging unit 11*a* is the mirror viewing requiring range during normal running, for example, and the imaging range of the peripheral area imaging unit 11*b* is larger than the imaging range of the peripheral area imaging unit 11*a*. Also, as shown in (A) of FIG. 20, the imaging range of the peripheral area imaging unit 11*a* is the visual recognition range in mode 1, and the imaging range of the peripheral area imaging unit 11*b* is the visual recognition range in mode 2. Further, as shown in (B) of FIG. 20, a range included in the imaging ranges of the peripheral area imaging unit 11*a* and the peripheral area imaging unit 11*b* is the visual recognition range in mode 3. Also, the imaging range of the peripheral area imaging unit 11*a* can be switched to the imaging range of the peripheral area imaging unit 11*b* as the visual recognition range in accordance with the driving situation or an instruction from the driver. For example, as shown in (C) of FIG. 20, the imaging range of the peripheral area imaging unit 11*a* can be switched among modes 1 through 3. Alternatively, from an imaging range including all the ranges of modes 1 through 3, the image area to be presented to the driver is set so as to fall within the ranges of modes 1 through 3.

FIG. 21 shows an example of the relationship between driving situation determination results and visual recognition range modes. In a case where the display control unit 20 determines that the vehicle is moving straight ahead in accordance with detected information, for example, the range of mode 1 is set as the visual recognition range as indicated by a circle. In a case where the display control unit 20 determines that the vehicle is located at a traffic circle in accordance with detected information, for example, the range of mode 1 is set as the visual recognition range as indicated by a circle. In a case where the display control unit 20 determines that the vehicle is turning right or left at an obtuse angle in accordance with detected information, for example, the range of mode 1 is set as the visual recognition range as indicated by a circle. In a case where the display control unit 20 determines that the vehicle is turning right or left at an acute angle in accordance with detected information, for example, the range of mode 2 is set as the visual recognition range as indicated by a circle, so that the range that can be checked is widened on the outer side. In a case where the display control unit 20 determines that the vehicle is moving backward in a straight line in accordance with detected information, for example, the range of mode 1 is set as the visual recognition range as indicated by a circle. In a case where the display control unit 20 determines that the vehicle is moving backward at an acute angle in accordance with detected information, for example, the range of mode 2 marked with a circle or the imaging range of the peripheral area imaging unit 11*b* is set as the visual recognition range so that any portion blocked from the driver's view as shown in (C) of FIG. 17 does not appear.

In step ST14, the display control unit 20 performs an image display control process. The display control unit 20 sets the area width of the monitor image area in accordance with the visual recognition range mode, and causes the display unit 50 to display an image of the visual recognition range as an image of the monitor image area. The display control unit 20 also controls the backlight and the luminance level, for example, so that images of the non-monitor image area cannot be seen. In a case where a predetermined area of the display unit 50 is set as the monitor image area, the display control unit 20 also performs a compression process or the like on the images of the peripheral area corresponding to the non-monitor image areas so that the image of the visual recognition range can be displayed in the monitor image area, and the visual recognition range corresponding to the monitor image area can be moved. The display control unit 20 performs the image display control process, and then moves on to step ST15.

In step ST15, the display control unit 20 determines whether a visual recognition range alteration instruction has been issued. In accordance with an image signal supplied from the driver imaging unit 12, the display control unit 20 determines the head position of the driver, for example, and determines whether an instructing operation to alter the visual recognition range in the peripheral area has been performed. In a case where the head position of the driver has moved while causing movement of the visual recognition range, the display control unit 20 determines that a visual recognition range alteration instruction has been issued, and moves on to step ST16. Further, in a case where the head position of the driver has not moved while causing movement of the visual recognition range, on the other hand, the display control unit 20 determines that any visual recognition range alteration instruction has not been issued, and moves on to step ST17.

In step ST16, the display control unit 20 performs a mode switching process. In a case where the visual recognition range alteration instruction is an instruction to widen the visual recognition range, the display control unit 20 switches to a mode with a wider visual recognition range. In a case where the operation is in a mode marked with a circle in FIG. 21, for example, the display control unit 20 switches to a mode marked with a square. In a case where the operation is in a mode marked with a square, the display control unit 20 switches to a mode marked with a star. Further, in a case where the visual recognition range alteration instruction is an instruction to narrow the visual recognition range, on the other hand, the display control unit 20 switches to a mode with a narrower visual recognition range. In a case where the operation is in a mode marked with a square in FIG. 21, for example, the display control unit 20 switches to a mode marked with a circle. In a case where the operation is in a mode marked with a star, the display control unit 20 switches to a mode marked with a square. After switching modes in accordance with the visual recognition range alteration instruction, the display control unit 20 moves on to step ST17.

In step ST17, the display control unit 20 determines whether the peripheral area checking operation has been completed. In accordance with an image signal supplied from the driver imaging unit 12, the display control unit 20 determines whether the orientation of the head of the driver and the line of sight are no longer in the direction of the mirror unit 55, for example. In a case where the orientation of the head of the driver and the line of sight continue to be in the direction of the mirror unit 55, the display control unit 20 determines that the peripheral area checking operation has not been completed, and returns to step ST15. Further, in a case where the orientation of the head of the driver and the line of sight are no longer in the direction of the mirror unit 55, on the other hand, the display control unit 20 determines that the peripheral area checking operation has been completed, and moves on to step ST18.

In step ST18, the display control unit 20 ends the display. The display control unit 20 ends the display of the image of the peripheral area on the display unit 50 to let the driver concentrate on driving, and then returns to step ST11.

As the above display control is performed, the image area to be presented to the driver of the vehicle from an image obtained by imaging a peripheral area around the vehicle is set in accordance with the driving information related to the driving situation of the vehicle, and the visual recognition range in the peripheral area the driver can visually recognize from the presented image is automatically altered in accordance with the driving situation so that the visual recognition range moves toward the outer side of the vehicle. Accordingly, a desired visual recognition range in the peripheral area can be checked more readily than in a case where a conventional rearview mirror is used. For example, in a case where the sensor information supplied from the driving situation detecting sensor 13 indicates that the vehicle is moving straight ahead, the mode is switched from mode 1 to mode 2, and the visual recognition range is expanded to the outer side of the vehicle. Also, in a case where the sensor information supplied from the driving situation detecting sensor 13 indicates that the vehicle is turning right or left at an acute angle or is moving backward at an acute angle as the orientation of the cabin differs from the orientation of the trailer portion, the mode is switched from mode 2 to mode 3, and the visual recognition range is expanded so as to include a portion outside the trailer portion. Thus, a desired visual recognition range can be checked. Also, the display unit 50 and the mirror unit 55 are installed inside a vehicle. Accordingly, it is possible to check the peripheral area, without any adverse influence of a side window as in a case where a rearview mirror is used.

Figure 22:
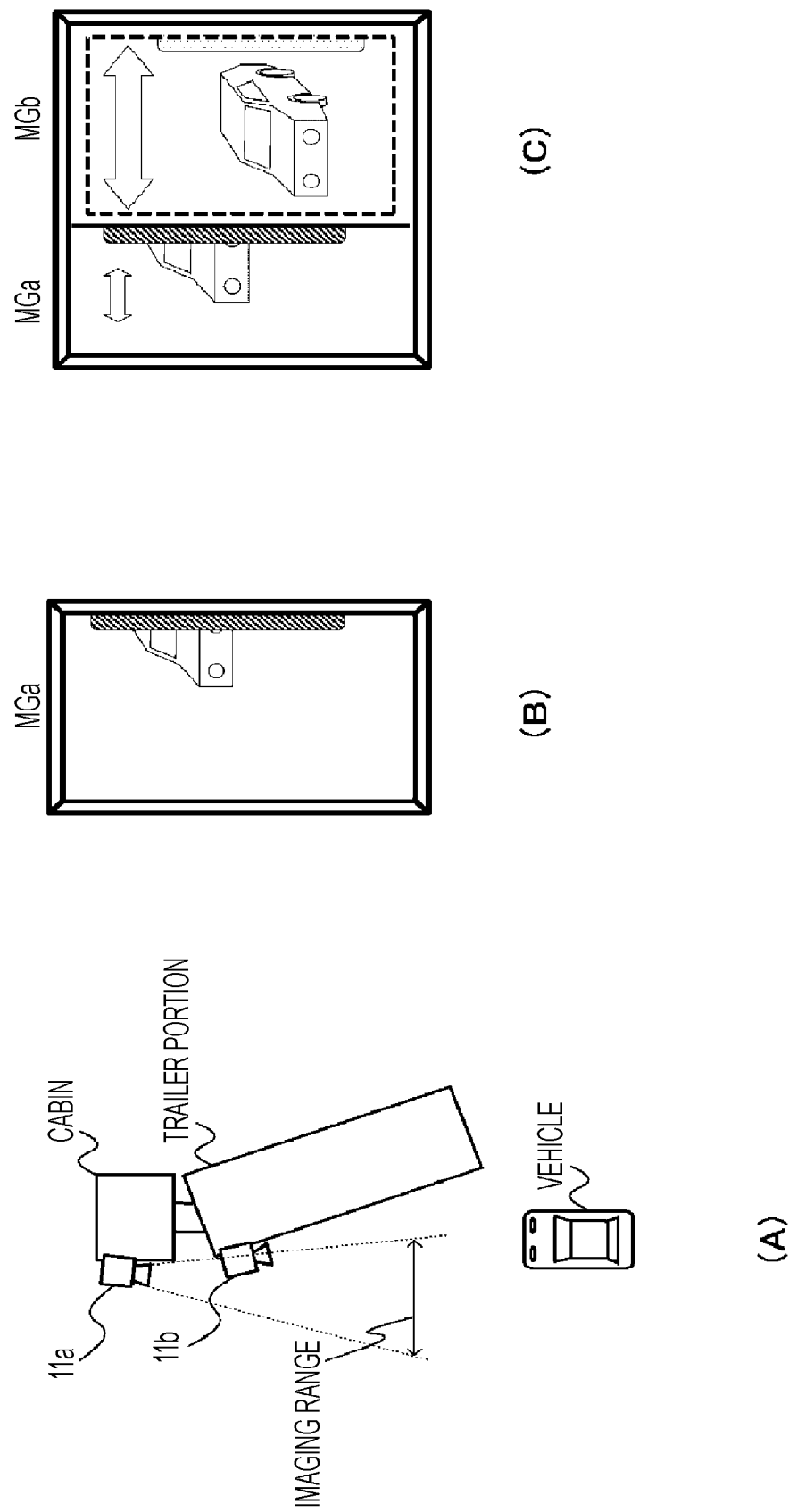
FIG. 22 is a diagram showing examples of images displayed on the display unit.

FIG. 22 shows examples of images displayed on the display unit 50 using peripheral images obtained by the peripheral area imaging unit 11*a* and the peripheral area imaging unit 11*b*. (A) of FIG. 22 shows an example case where the vehicle is located in a position blocked from the field of view of the peripheral area imaging unit 11*a*. (B) of FIG. 22 shows an example case where a peripheral image MGa obtained by the peripheral area imaging unit 11*a* is displayed. It is not possible to check the entire vehicle behind only with the displayed image captured by the peripheral area imaging unit 11*a*. In view of this, the display control unit 20 displays not only the peripheral image MGa obtained by the peripheral area imaging unit 11*a* but also a peripheral image MGb obtained by the peripheral area imaging unit 11*b*, as shown in (C) of FIG. 22, so that the entire vehicle behind can be checked.

As described above, in accordance with the driving information, the display control unit 20 sets the image area to be presented from one or more images taken from one or more positions, and, in accordance with the driving situation, controls the visual recognition range in the peripheral area the driver can visually recognize. Thus, a desired visual recognition range in the peripheral range can be readily checked. It should be noted that the display control unit 20 may be designed to be capable of switching display between (B) of FIG. 22 and (C) of FIG. 22, and changing the area widths (or insertion widths) of the peripheral image MGa and the peripheral image MGb as indicated by arrows in (C) of FIG. 22, in accordance with a driving situation or an intention of the driver. In this manner, the peripheral area can be displayed in an optimum manner for visual recognition.

Figure 23:
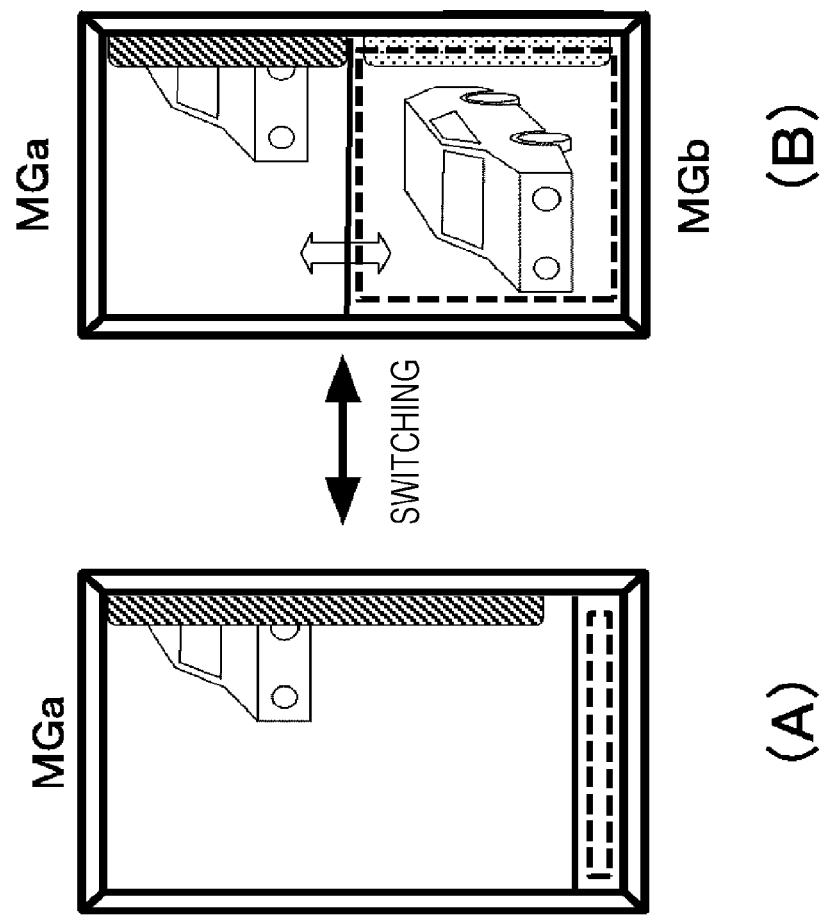
FIG. 23 is a diagram showing other examples of images displayed on the display unit.

FIG. 23 shows other examples of images displayed on the display unit 50 using peripheral images obtained by the peripheral area imaging unit 11*a* and the peripheral area imaging unit 11*b*. (A) of FIG. 23 shows an example case where the peripheral image MGa obtained by the peripheral area imaging unit 11*a* is displayed. (B) of FIG. 23 shows an example case where the peripheral image MGa obtained by the peripheral area imaging unit 11*a* and the peripheral image MGb obtained by the peripheral area imaging unit 11*b* are vertically arranged and displayed. The display control unit 20 performs switching between the display shown in (A) of FIG. 23 and the display shown in (B) of FIG. 23, in accordance with the driving situation or the intention of the driver. Also, as indicated by arrows in (B) of FIG. 23, the display control unit 20 may be designed to be capable of changing the area width (or insertion widths) of the peripheral image MGa and the peripheral image MGb.

Here, when images captured by imaging units are displayed adjacent to each other on the display unit, an image captured by an imaging unit installed in a front position in the traveling direction of the vehicle is placed in an upper portion of the display screen, and an image captured by an imaging unit installed in a rear position in the traveling direction is placed in a lower portion of the display screen, so that the driver can instantly and intuitively understand the positional relationship with respect to the front and the rear of the vehicle on the visual recognition screen in an advantageous manner. That is, in a case where at least two imaging devices are installed on the exterior of a vehicle in such a manner as to face backward in terms of the vehicle traveling direction, and a display unit having at least two screen display areas adjacent to each other is provided inside the vehicle or at the central portion of the dashboard, for example, the image taken by a first imaging device (the peripheral area imaging unit 11*a*, for example) installed on the front side in the vehicle traveling direction is placed in a higher portion than the image taken by an imaging device (the peripheral area imaging unit 11*a*, for example) installed closer to the rear side in the vehicle traveling direction than the first imaging device, in accordance with the display contents of the captured images to be displayed in the screen display areas (see (B) of FIG. 23, for example). In this manner, the driver can instantly and intuitively understand the positional relationship with respect to the front and the rear of the vehicle on the visual recognition screen in an advantageous manner.

Further, even if the screen has such a layout that images cannot be vertically arranged in a large area, the rear vanishing point of the image taken by the imaging portion installed on the front side in the traveling direction is placed in an upper portion of the display screen. That is, in a case where at least two imaging devices are installed on the exterior of a vehicle in such a manner as to face backward in terms of the vehicle traveling direction, and a display unit having at least two screen display areas adjacent to each other is provided inside the vehicle, the infinite vanishing point included in the image taken by the first imaging device installed on the front side in the vehicle traveling direction is placed in a higher portion than the infinite lost point included in the image taken by the imaging device installed closer to the rear side in the vehicle traveling direction than the first imaging device, in accordance with the display contents of the captured images to be displayed in the screen display areas. In this manner, effects similar to the above described effects are achieved. For the driver to quickly understand a difference in this case, at least 20% of the display screen preferably shifts in a vertical direction.

Figure 24:
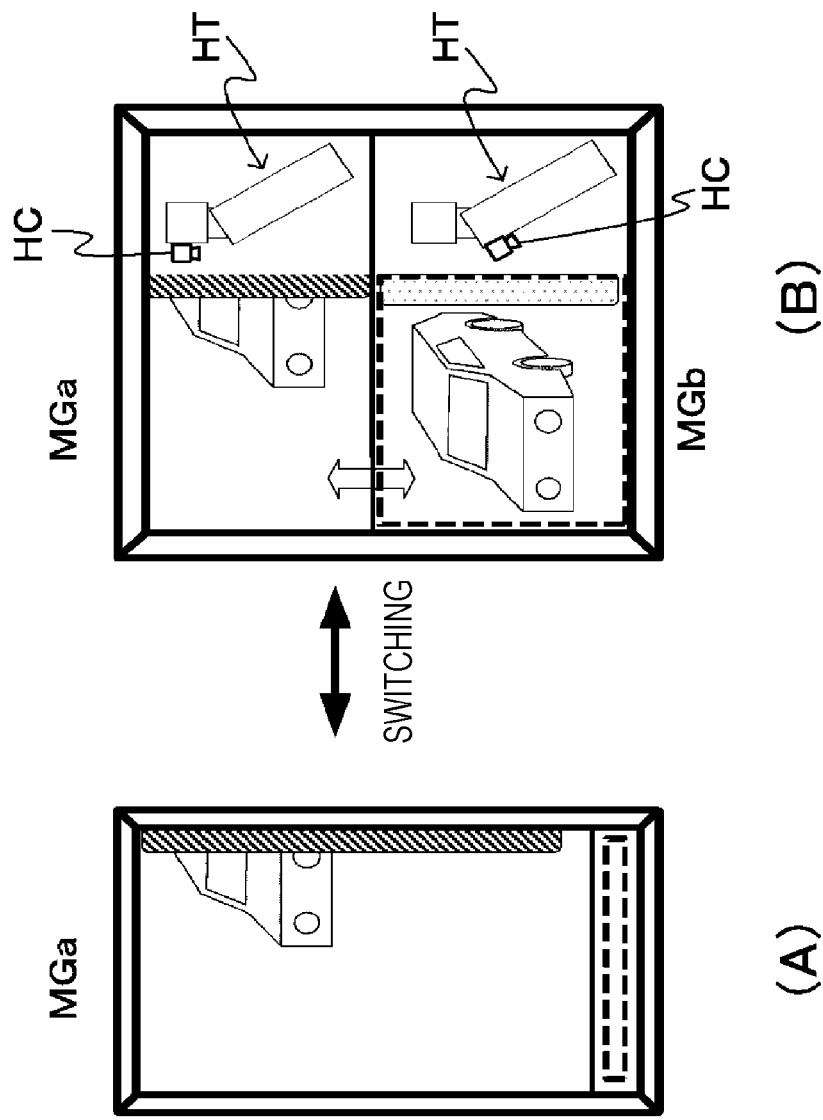
FIG. 24 is a diagram showing other examples of images displayed on the display unit.

FIG. 24 shows other examples of images displayed on the display unit 50 using peripheral images obtained by the peripheral area imaging unit 11*a* and the peripheral area imaging unit 11*b*. (A) of FIG. 24 shows an example case where the peripheral image MGa obtained by the peripheral area imaging unit 11*a* is displayed. (B) of FIG. 24 shows an example case where the peripheral image MGa obtained by the peripheral area imaging unit 11*a* and the peripheral image MGb obtained by the peripheral area imaging unit 11*b* are vertically arranged and are displayed in such a manner that the peripheral area imaging units that have obtained the respective peripheral images can be identified. For example, icons HT schematically showing the cabin and the trailer portion are also displayed. Further, in the icons HT, marks HC representing the peripheral area imaging units that have obtained the peripheral images displayed adjacent to each other are shown in the shapes of cameras, for example. As the display image captured by the peripheral area imaging unit 11*a* installed on the front side of the vehicle is shown in an upper portion while the display image captured by the peripheral area imaging unit 11*b* installed on the rear side of the vehicle is shown in a lower portion in the above manner, the correspondence relationship between the displayed peripheral images and the peripheral area imaging units can be easily understood, and appropriate driving operation can be performed in accordance with the displayed images. The display control unit 20 performs switching between the display shown in (A) of FIG. 24 and the display shown in (B) of FIG. 24, in accordance with the driving situation or the intention of the driver. Also, as indicated by arrows in (B) of FIG. 24, the display control unit 20 may be designed to be capable of changing the area width (or insertion widths) of the peripheral image MGa and the peripheral image MGb.

Also, in the case of normal running or the like, only the peripheral image obtained by the peripheral area imaging unit 11*a* is displayed, for example. Thus, it is possible to prevent parallel display of peripheral images from hindering the field of view in the front peripheral area.

Also, as for the switching between the peripheral area imaging units and the control on the peripheral images to be displayed, appropriate switching can be performed in accordance with the intention of the driver while the display contents are changed with the driving state of the vehicle. Thus, the driver can intuitively and naturally distinguish visual recognition areas from one another, without paying intense attention to the screen. In the case of a traction vehicle such as a trailer, a combined image is not displayed on one screen. Instead, it is ergonomically preferable to display an image having divisions so that the respective sections can be instantly recognized on the screen. In view of this, the display control unit 20 conducts ergonomically appropriate display.

Also, eliminating blind spots for a traction vehicle such as a trailer is critical when the vehicle is running with a small curvature, such as when the vehicle is changing to the outer lane at a traffic circle formed with two or more lanes, or when the vehicle is checking for obstacles behind while moving backward. Therefore, a screen transition reflecting an intention of the driver to operate the screen is displayed together with the driving state of the vehicle. Thus, a situation with blind spots can be more efficiently grasped. In such a situation, the field of view of any single camera is not changed. Instead, it is effectively switch display areas after switching to the camera of the peripheral area imaging unit 11*b* on the side of the trailer portion.

Further, as for a display expansion, a display range expansion function is effective not only for a method using the mirror unit 55.

It should be noted that, although mode switching has been described in the third embodiment, the mode switching may be combined with an operation according to the second embodiment.

Also, in the cases described in the above described embodiments, the head position and the line of sight are detected. However, the system may be designed to perform control with auxiliary push buttons, recognize spoken commands, or recognize movement of body parts other than the head, for example. Particularly, in a case where the operation returns to a normal state, where wrong recognition of the contents of a command is detected at a time of learning as described later, or where the posture of the driver changes in a complicated manner during a low-speed parking operation, control is effectively performed in conjunction with an interface for issuing a direct command through a button operation, for example.

4. Fourth Embodiment

In visually recognizing a peripheral area using a display device, it is necessary to maintain a certain screen magnification at a time of normal running, in compliance with a regulation that sets the lowest display magnification. That is, a display screen is set for a steady head position during a driving operation. When the head has moved to a different from the steady-state position, the driver needs to change the screen display in response to a display change instruction via a human-machine interface for indicating an unusual intention. For example, the driver needs to change the screen display in response to an instruction to change the magnification of the display contents at a lower magnification, an instruction to change the special field of view during an unusual driving operation such as a parking operation, or the like. In view of this, a fourth embodiment concerns the mechanism of a human-machine interface for changing display contents.

Figure 25:
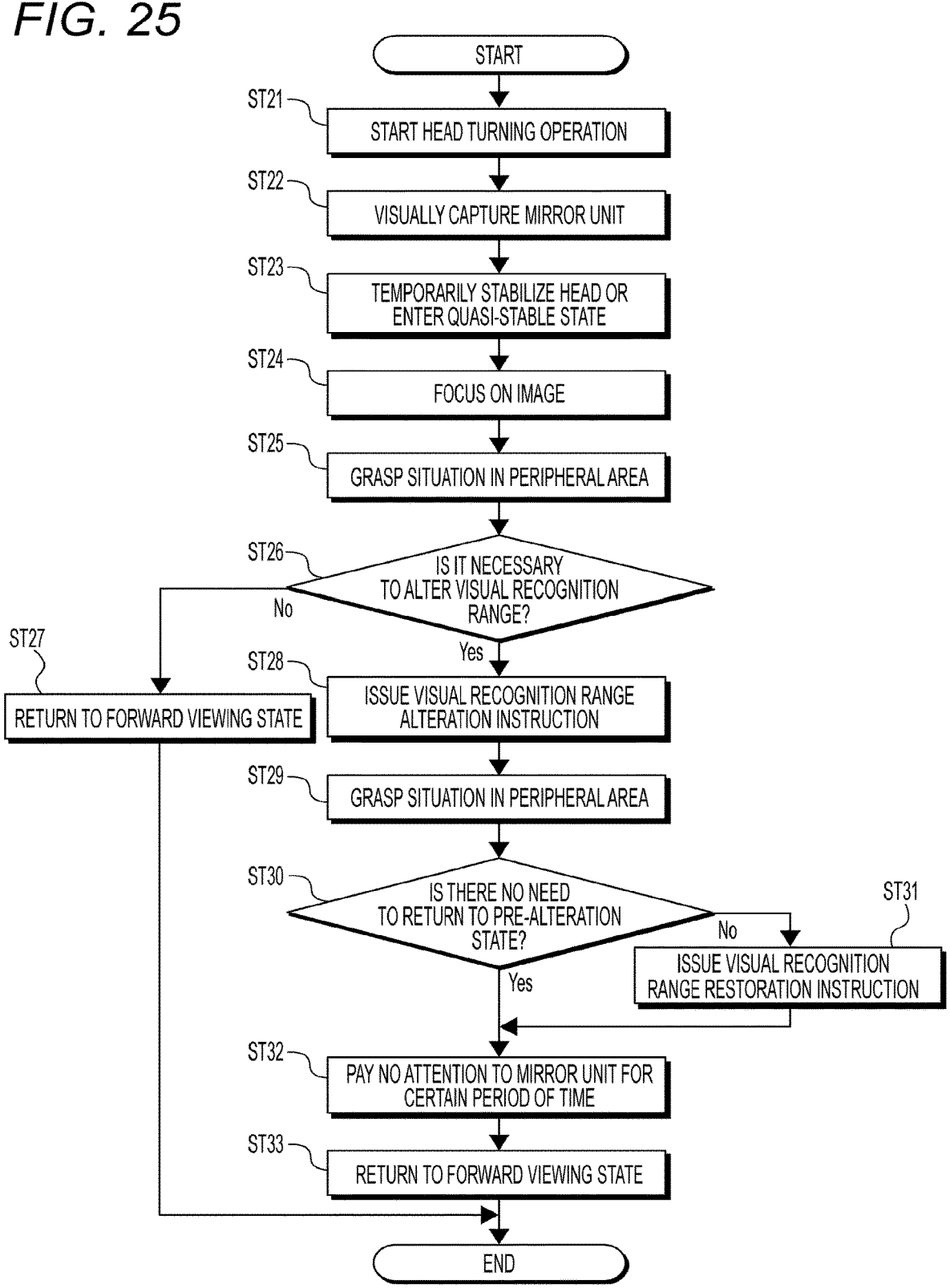
FIG. 25 is a flowchart showing an example operation to be performed by the driver to grasp the situation in the peripheral area.

FIG. 25 is a flowchart showing an example operation to be performed by the driver to grasp the situation in the peripheral area. In step ST21, the driver starts a head turning operation, and moves on to step ST22. In step ST22, the driver visually captures the mirror unit, and moves on to step ST23. In step ST23, the driver temporarily stabilizes his/her head or enters a quasi-stable state, and then moves on to step ST24. It should be noted that a quasi-stable state is a state where the head hardly moves and can be regarded as being in a stable state.

In step ST24, the driver focuses on an image via the mirror unit, and then moves on to step ST25. In step ST25, the driver grasps the situation in the peripheral area by checking the image of the visual recognition range, and then moves on to step ST26.

In step ST26, the driver determines whether the visual recognition range needs to be altered. If the driver successfully grasps the situation in a desired range in the peripheral area by visually recognizing the image of the monitor image area in step ST25, the driver determines that there is no need to alter the visual recognition range, and then moves on to step ST27. Further, if the driver fails to grasp the situation in a desired range in the peripheral area, on the other hand, the driver determines that the visual recognition range needs to be altered, and then moves on to step ST28.

In step ST27, the driver returns to a forward viewing state. As having grasped the situation in the desired peripheral area, the driver ends the head turning operation, and turns his/her head forward to look ahead. The process is then ended.

After moving from step ST26 on to step ST28, the driver issues a visual recognition range alteration instruction. The driver executes a prescribed movement, such as repeatedly moving his/her trunk, and then moves on to step ST29. Meanwhile, a display device detects the visual recognition range alteration instruction from the driver, and performs a process of altering the visual recognition range in which an image is displayed in the monitor image area. In the visual recognition range alteration, the peripheral area the driver can visually recognize is moved or expanded.

In step ST29, the driver grasps the situation in the peripheral area by checking the image alter the visual recognition range alteration, and then moves on to step ST30.

In step ST30, the driver determines whether there is a need to restore the visual recognition range to the same state as that prior to the alternation instruction. In a case where the driver wishes to check the visual recognition range prior to the alternation instruction, the driver determines that there is a need to restore the visual recognition range to the same state as that prior to the alteration instruction, and then moves on to step ST31. Further, if the driver determines that there is no need to restore the visual recognition range to the same state as that prior to the alteration instruction, on the other hand, the driver moves on to step ST32.

In step ST31, the driver issues a visual recognition range restoration instruction. The driver executes a prescribed movement, such as returning his/her head to its original position, and then moves on to step ST32. Meanwhile, the display device detects the visual recognition range restoration instruction from the driver, and performs a process of restoring the visual recognition range in which an image is displayed in the monitor image area to the same range as that prior to the alternation.

In step ST32, the driver pays no attention to the mirror unit for a certain period of time, and then moves on to step ST33.

In step ST33, the driver returns to a forward viewing state. The driver then ends the grasping of the situation in the peripheral area. That is, the driver ends the head turning operation, and turns his/her face forward to look ahead.

Using a human-machine interface compatible with such an operation of the driver, the display device alters the visual recognition range in the peripheral area in accordance with a display change instruction from the driver. It should be noted that such a display device using a human-machine interface is not limited to a display device having a configuration according to one of the first through third embodiments. For example, such a display device can also be used in a case where the driver directly views the display on the display unit 50 to grasp the situation in the peripheral area.

For ease of explanation, a series of operations to be performed till the return to forward viewing is simply shown in the flowchart shown in FIG. 25. In practice, however, more complicated operations are involved before the return to forward viewing, and, in many cases, direct viewing and display unit viewing are repeated before the return to forward viewing. However, this specification does not aim to explain all those cases, and therefore, examples other than the above described one will not be described below.

Next, to explain the configuration and operation of the fourth embodiment, a case where the driver indirectly views the image on the display unit via the mirror unit in the same manner as in the first through third embodiments is described.

[4-1. Configuration of a Fourth Embodiment]

Figure 26:
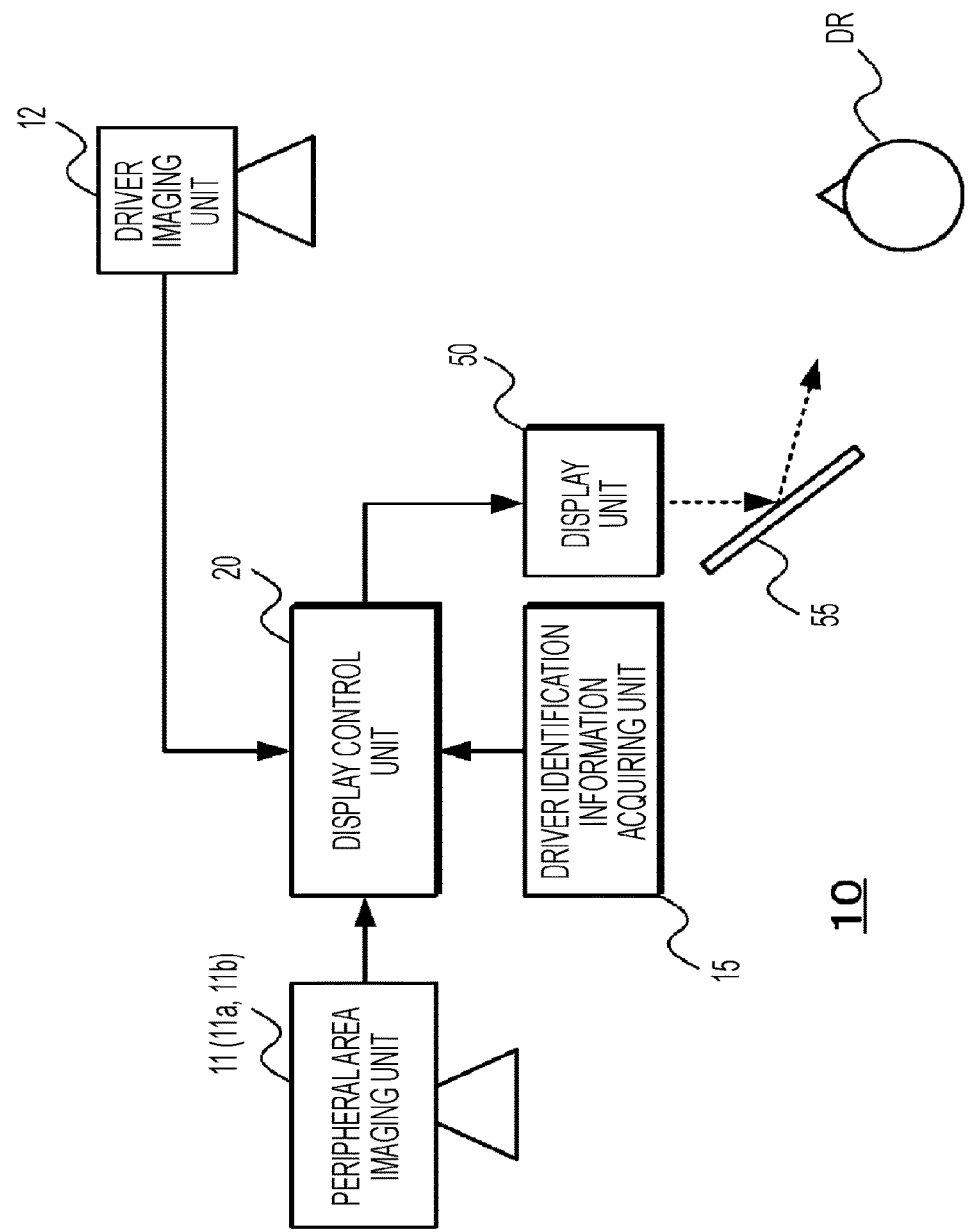
FIG. 26 is a diagram showing an example configuration of a fourth embodiment.

FIG. 26 is a diagram showing an example configuration of the fourth embodiment. A display device 10 includes a peripheral area imaging unit 11, a driver imaging unit 12, a driver identification information acquiring unit 15, a display control unit 20, a display unit 50, and a mirror unit 55. The driver, the display unit, the mirror unit, and the driver imaging unit are also in the positional relationship shown in FIG. 9.

The peripheral area imaging unit 11 images a peripheral area around the vehicle, and outputs an image signal to the display control unit 20. It should be noted that the area to be imaged by the peripheral area imaging unit 11 will be hereinafter referred to as the current peripheral area to be imaged.

The driver imaging unit 12 is disposed in front of the driver DR or in the direction of the mirror unit 55, for example, so that the head position of the driver DR, the orientation of the head, the line of sight, and the like can be determined. The driver imaging unit 12 images the driver DR, and outputs an image signal to the display control unit 20.

The driver identification information acquiring unit 15 acquires driver identification information that is identification information unique to the driver, and outputs the driver identification information to the display control unit 20. The driver identification information acquiring unit 15 may use driver's face recognition obtained by the driver imaging unit 12, may use identification information added to the vehicle start key owned by the driver, or may directly issue an instruction by operating a button or the like. The driver identification information acquiring unit 15 can operate in various manners.

The display control unit 20 causes the display unit 50 to display the peripheral area image taken by the peripheral area imaging unit 11. The display control unit 20 also determines a head turning toward the mirror unit 55, an operation to move toward a check area, and various instructing operations, in accordance with the head position of the driver, the orientation of the head, the line of sight, movement of the position and the orientation, information supplied from the driver identification information acquiring unit 15, and the like. In accordance with determination results, the display control unit 20 further performs display control on the peripheral area image to be displayed on the display unit 50. When the driver turns his/her head toward the mirror unit, for example, the display control unit 20 causes the display unit 50 to display a peripheral area image. Further, in a case where the display control unit 20 determines that the driver executes a predesignated movement after detecting a head turning operation, for example, the display control unit 20 expands the area of the visual recognition range.

The display unit 50 is disposed so that the driver can visually recognize the display surface of the display unit 50 in an indirect manner via the mirror unit 55. Also, the size of the display surface of the display unit 50 is larger than the size of the mirror surface of the mirror unit 55, so that the driver DR can visually recognize the image displayed on the display unit 50 via the mirror unit 55 even when moving his/her head position to check a wide area on a rearview mirror while driving. It should be noted that, in the image displayed on the display unit 50, the image area corresponding to the visual recognition range in the peripheral area to be checked by the driver via the mirror unit 55 is the monitor image area.

The mirror unit 55 is disposed so that the driver DR can visually recognize the display surface of the display unit 50 in an indirect manner. The mirror unit 55 is positioned so that the driver DR can visually recognize the image reflected by the mirror unit 55 when taking an action to look into a conventional rearview mirror in the vehicle, for example. Also, the positional relationship of the mirror unit 55 with the display unit 50 and the size of the mirror unit 55 are set so that the entire display area of the display unit 50 is reflected by the mirror unit 55 when the driver DR views a peripheral area image in an indirect manner via the mirror unit 55. Further, the display unit 50 and the mirror unit 55 are subjected to display control being performed by the display control unit 20 so that the visual recognition range the driver can visually recognize from the image on the display unit 50 reflected by the mirror unit 55 in the peripheral area is changed with movement of the position of visual recognition of the driver relative to the mirror unit 55. It should be noted that, to achieve a function effect similar to that of a conventional rearview mirror, the area on the mirror unit 55 that reflects the visual recognition range preferably has a size similar to the size of a conventional rearview mirror.

The display device 10 enables the driver DR to visually recognize a peripheral area image in an indirect manner via the mirror unit 55, and increases the distance between the driver DR and the display surface of the display unit 50 to a longer distance than that in a case where the driver DR directly views the display surface of the display unit 50.

Also, in the display device 10, the driver DR visually recognizes a peripheral area image in an indirect manner via the mirror unit 55, and therefore, the display unit 50 is positioned so that the driver DR cannot see the display surface and the light illuminating the display surface. Alternatively, a shield may be provided so that the driver DR cannot see the display surface of the display unit 50 and the illuminating light.

Figure 27:
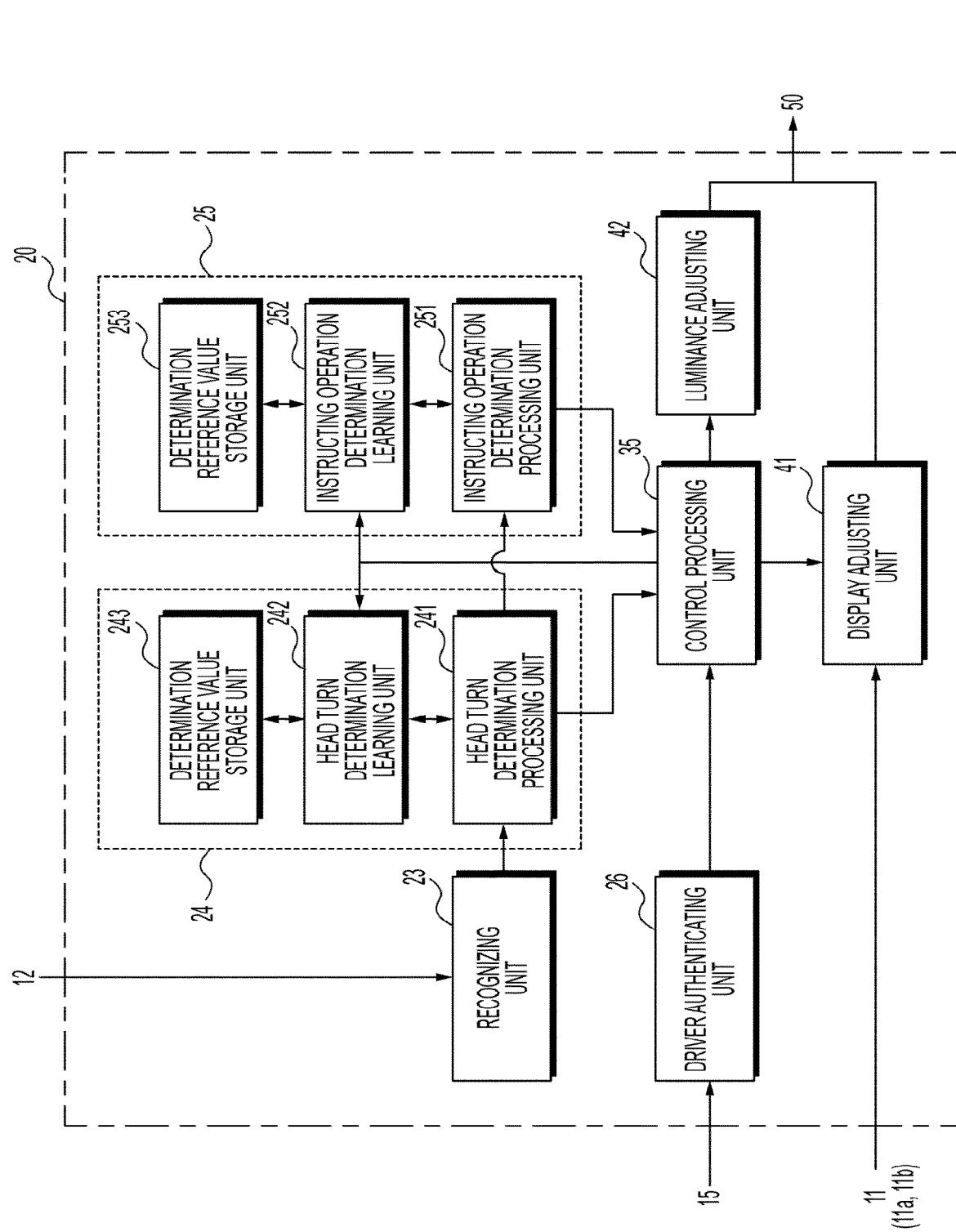
FIG. 27 is a diagram showing the configuration of a display control unit.

FIG. 27 is a diagram showing the configuration of the display control unit. The display control unit 20 includes a recognizing unit 23, a head turn determining unit 24, an instructing operation determining unit 25, a driver authenticating unit 26, a control processing unit 35, a display adjusting unit 41, and a luminance adjusting unit 42.

The recognizing unit 23 performs face recognition in accordance with an image signal supplied from the driver imaging unit 12. The recognizing unit 23 also recognizes the orientation of the recognized head and the line of sight of the recognized face, and outputs a recognition result to the head turn determining unit 24.

The head turn determining unit 24 includes a head turn determination processing unit 241, a head turn determination learning unit 242, and a determination reference value storage unit 243.

The head turn determination processing unit 241 determines whether the driver has turned his/her head toward the mirror unit 55 by comparing the recognition result from the recognizing unit 23 with a head turn determination reference value supplied from the head turn determination learning unit 242, and outputs a determination result to the instructing operation determining unit 25 and the control processing unit 35.

The head turn determination learning unit 242 reads the head turn determination reference value from the determination reference value storage unit 243, and outputs the head turn determination reference value to the head turn determination processing unit 241. The head turn determination learning unit 242 also reads driver information from the control processing unit 35, and reads a head turn determination reference value corresponding to a driving determination parameter setting optimized for high-speed forward running or a driving determination parameter setting optimized for low-speed driving, backward driving, and parking from the determination reference value storage unit 243. The head turn determination learning unit 242 then outputs the driver information and the head turn determination reference value to the head turn determination processing unit 241. The head turn determination learning unit 242 further updates head turn determination reference values in accordance with the result of recognition of the orientation of the head and the line of sight, so that the head turn determination processing unit 241 can perform accurate head turn determination for each driver. Further, since similar head moving operations have different purposes in a running speed range of the vehicle, the head turn determination processing unit 241 is enabled to perform determination depending on the running speed range for each driver. For example, the determination threshold time allowed before a turn of the line of sight is less than one second so that the driver can pay intense attention ahead during a high-speed driving operation or a high-speed joining operation, and can expand the visual recognition range to be checked by a quick glance at the monitor. In the case of parking, a large-size trailer performs each operation such as an expansion after grasping the situation behind in such a time that the drive can grasp the entire situation by temporarily paying attention to each situation. Therefore, at a lower speed than 15 Km/h, which is equivalent to the speed for parking, the determination threshold time is set at 0.5 seconds or longer. The head turn determination learning unit 242 outputs the updated head turn determination reference values to the determination reference value storage unit 243, to update the head turn determination reference values stored in the determination reference value storage unit 243. It should be noted that, in a case where any head turn determination reference value corresponding to the reported driver is not stored in the determination reference value storage unit 243, the head turn determination learning unit 242 outputs a preset head turn determination reference value to the head turn determination processing unit 241. Further, the head turn determination learning unit 242 then associates the updated head turn determination reference values with driver information, and stores the updated head turn determination reference values and the driver information into the determination reference value storage unit 243. Here, the process of recognizing the position of the head is visually or aurally fed back to the driver DR with a notifying unit, such as an overlay display on the display screen of the display unit 50, an LED, or the speaker of the vehicle. In this manner, an instructing operation can be confirmed accurately through the simplest possible operation. The feedback to the driver DR is not digital true-false determination based on 0 and 1, but is preferably performed by an analog notifying unit that indicates a status representing the determination of a movement of the driver.

The determination reference value storage unit 243 stores the head turn determination reference values to be used in determining head turns. Further, in a case where drivers are authenticated, the determination reference value storage unit 243 also stores head turn determination reference values for the respective drivers. The head turn determination reference values stored in the determination reference value storage unit 243 are updated in accordance with a learning result from the head turn determination learning unit 242.

The instructing operation determining unit 25 includes an instructing operation determination processing unit 251, an instructing operation determination learning unit 252, and a determination reference value storage unit 253.

The instructing operation determination processing unit 251 determines whether the driver has executed a predetermined movement, using the recognition result from the recognizing unit 23, the head turn determination result from the head turn determining unit 24, and a determination reference value supplied from the instructing operation determination learning unit 252. The instructing operation determination processing unit 251 then outputs a determination result to the control processing unit 35. In accordance with a detection result indicating a combination of two or more accelerating/decelerating operations on the head of the driver, for example, the instructing operation determination processing unit 251 determines the instruction indicated by the movement of the driver.

The instructing operation determination learning unit 252 reads the instructing operation determination reference value from the determination reference value storage unit 253, and outputs the instructing operation determination reference value to the instructing operation determination processing unit 251. Also, in a case where the driver is reported from the control processing unit 35, the instructing operation determination learning unit 252 reads the instructing operation determination reference value corresponding to the reported driver from the determination reference value storage unit 253, and outputs the instructing operation determination reference value to the instructing operation determination processing unit 251. The instructing operation determination learning unit 252 further updates instructing operation determination reference values in accordance with the result of recognition of the orientation of the head and the line of sight, so that the instructing operation determination processing unit 251 can perform accurate instructing operation determination. The instructing operation determination learning unit 252 outputs the updated instructing operation determination reference values to the determination reference value storage unit 253, to update the instructing operation determination reference values stored in the determination reference value storage unit 253. It should be noted that, in a case where any instructing operation determination reference value corresponding to the reported driver is not stored in the determination reference value storage unit 253, the instructing operation determination learning unit 252 outputs a preset instructing operation determination reference value to the instructing operation determination processing unit 251. Further, the instructing operation determination learning unit 252 then associates the updated instructing operation determination reference values with driver information, and stores the updated head turn determination reference values and the driver information into the determination reference value storage unit 253.

The determination reference value storage unit 253 stores the instructing operation determination reference values to be used in determining instructing operations. Further, in a case where drivers are authenticated, the determination reference value storage unit 253 also stores instructing operation determination reference values for the respective drivers. The instructing operation determination reference values stored in the determination reference value storage unit 253 are updated in accordance with a learning result from the instructing operation determination learning unit 252.

Here, the instructing operation determination learning unit 252 may have a function to designate an exclusion in a feedback form other than detection of a gesture by operating a button or issuing a voice instruction, when an operation by a gesture generates an unintended determination result that leads to a wrong operation.

In accordance with the driver's identification information acquired by the driver identification information acquiring unit 15, the driver authenticating unit 26 determines the current driver of the vehicle, and outputs a determination result to the control processing unit 35.

In accordance with the determination result from the driver authenticating unit 26, the control processing unit 35 determines the driver of the vehicle, and reports the determined driver to the head turn determination learning unit 242 and the instructing operation determination learning unit 252. In accordance with the determination results from the head turn determining unit 24 and the instructing operation determining unit 25, the control processing unit 35 also generates a control signal for performing different display control between the monitor image area and the non-monitor image areas in the display unit 50. The control processing unit 35 outputs the generated control signal to the display adjusting unit 41 and the luminance adjusting unit 42.

In accordance with the control signal from the control processing unit 35, the display adjusting unit 41 performs peripheral area image magnification adjustment on the image signal supplied from the peripheral area imaging unit 11, and switches or combines images of the peripheral area, for example.

In accordance with the control signal from the control processing unit 35, the luminance adjusting unit 42 reduces the luminance of the non-monitor image areas in the display unit 50 to a lower luminance than that of the monitor image area. In a case where the display unit 50 is formed with a display element that requires illumination, such as a liquid crystal display element, the luminance adjusting unit 42 controls illumination, such as a backlight, to reduce the luminance of the non-monitor image areas to a lower luminance than that of the monitor image area. Further, in a case where the display unit 50 is formed with a display element that requires illumination or a light-emitting element such as an organic EL display element, on the other hand, a process may be performed to lower the signal level of the luminance signal corresponding to the non-monitor image areas.

With the above described configuration, a display unit viewing starting state is detected at a higher speed in a procedure for detecting an expected operation of the driver.

The normal ergonomic operation steps to be carried out by the driver are predicted as follows. In a case where a living creature visually captures an external world, it is the eye movement that changes its orientation most rapidly, following changes in direction. If an object to be viewed is located in a range not included in the rolling range of the eye movement, the position of the neck or the body is changed to compensate for the uncovered range.

As a result, in a series of procedures for moving the line of sight in the direction of the mirror unit, which greatly differs from the direction of forward viewing, the driver roughly captures the direction in which an image of the mirror unit can be visually recognized, and starts rolling his/her eyes and turning his/her head. When visually capturing the mirror unit, the driver adjusts the eye movement to the line of sight that cancels the turning of the head while still moving his/her head. When focusing the line of sight on the mirror unit, the driver substantially stops turning his/her head, and stabilizes. The head turning state that is characteristic of the series of operations is analyzed in a time-series manner, and changes in the mirror unit viewing starting state are learned from the acceleration and the deceleration in the movement. As the learning is performed in such a manner, and the characteristics of the operation sequence of the individual driver are analyzed, the start of mirror unit viewing by the driver is determined before the driver's head becomes completely steady. Also, as the analysis is promptly switched to the continuing instructing operation analysis, a human-machine interface (HMI) for screen operations with fewer delays is achieved. Here, the process of recognizing the position of the head is visually or aurally fed back to the driver DR with a notifying unit, such as an overlay display on the display screen of the display unit 50, an LED, or the speaker of the vehicle. In this manner, an instructing operation can be confirmed accurately through the simplest possible operation. The feedback to the driver DR is not digital true-false determination based on 0 and 1, but is preferably performed by an analog notifying unit that indicates a status representing the determination of a movement of the driver. However, excess display of such feedback might interfere with the field of view. Therefore, if such display becomes unnecessary after the characteristics unique to the driver are learned, the display function should be suspended, and there is no need to constantly display the feedback.

Also, in a normal high-speed forward driving operation, body movement is small, and the current visual recognition range is narrow. In a low-speed parking operation, the head and the body are greatly moved so that the entire peripheral area can be captured. In view of this, the determination criteria in detecting each instruction preferably differ between a high-speed operation and a low-speed operation. Therefore, mode switching determination is performed in conjunction with vehicle driving state determination so that a higher operability is achieved.

[4-2. Operation of the Fourth Embodiment]

Figure 28:
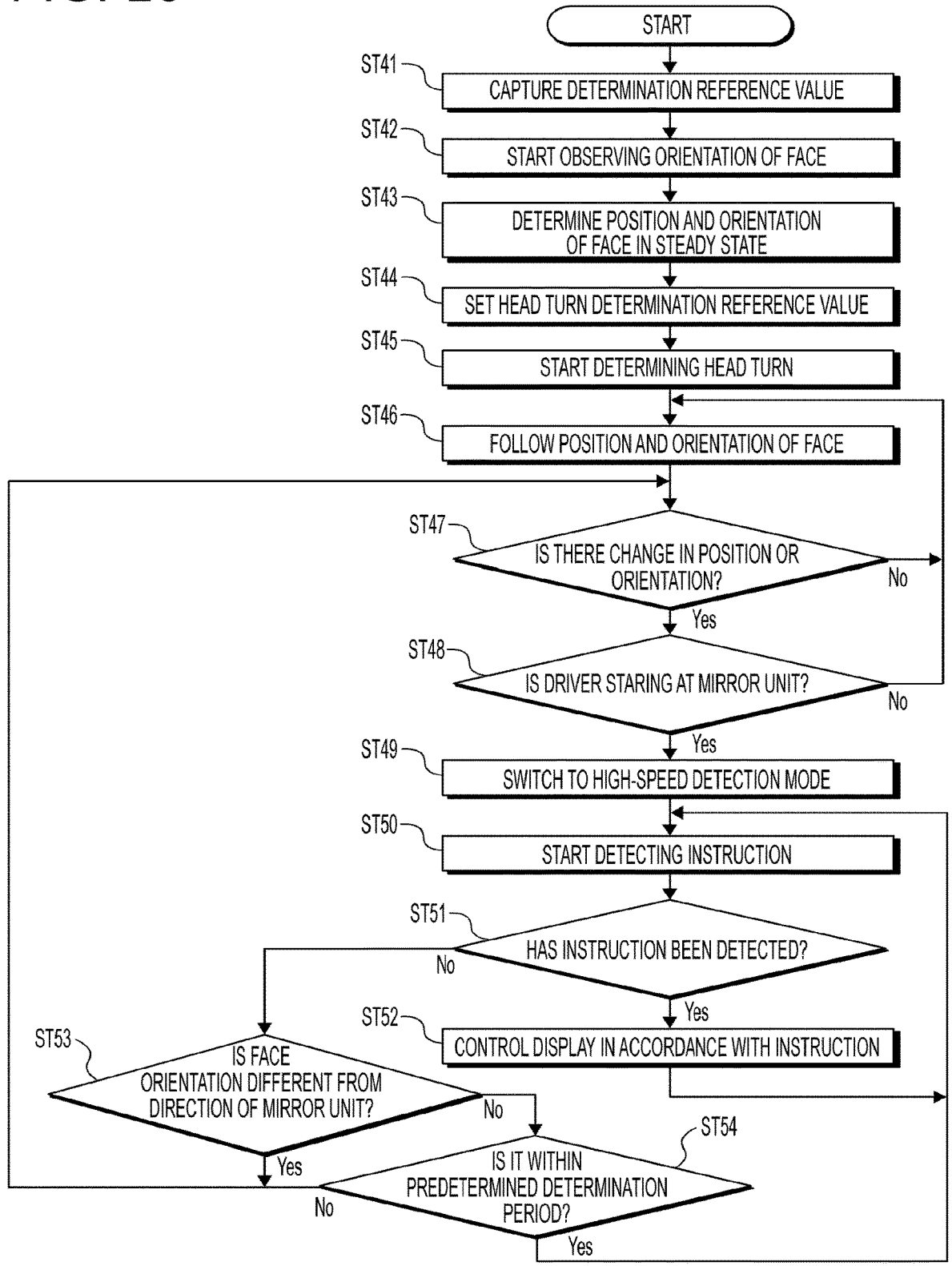
FIG. 28 is a flowchart showing an operation of the display control unit.

FIG. 28 is a flowchart showing an operation of the display control unit. In step ST41, the display control unit 20 obtains determination reference values. The display control unit 20 obtains the determination reference values to be used in determining a head turning operation, a visual recognition range alteration instruction, and a visual recognition range restoration instruction. Also, determination reference values may be set for respective drivers so that the determination reference values corresponding to the current driver can be obtained. Also, the determination reference values may be updated in accordance with operations of the driver so that the latest determination reference values can be obtained. After obtaining the determination reference values, the display control unit 20 moves on to step ST42.

In step ST42, the display control unit 20 starts observing the orientation of the face (the orientation of the head). The display control unit 20 starts a process of determining the face of the driver by performing face recognition using an image signal supplied from the driver imaging unit 12, and a process of detecting the orientation of the determined face (the orientation of the head). The display control unit 20 then moves on to step ST43.

In step ST43, the display control unit 20 determines the position and the orientation of the face in a steady state. In accordance with a result of the observation of the orientation of the face (the orientation of the head), the display control unit 20 determines the position and the orientation of the face in a steady state. If the position and the orientation of the face in a steady state have changed from those in the previous determination process, the display control unit 20 calculates a correction value in accordance with the change. Further, if there is no information corresponding to the driver, the difference from the initial value is set as the correction value. After calculating the correction value, the display control unit 20 moves on to step ST44.

In step ST44, the display control unit 20 obtains sets a head turn determination reference value. The display control unit 20 sets a head turn determination reference value using the determination reference values and the calculated correction value, and then moves on to step ST45.

In step ST45, the display control unit 20 starts head turn determination. Using the result of the head orientation observation and the head turn determination reference value, the display control unit 20 starts a process of determining a head turning operation of the driver. The display control unit 20 then moves on to step ST46.

In step ST46, the display control unit 20 tracks the position and the orientation of the face. The display control unit 20 tracks the position and the orientation of the face in accordance with the result of the observation of the position and the orientation of the face, and then moves on to step ST47.

In step ST47, the display control unit 20 determines whether there is a change in the position and the orientation of the face. If the display control unit 20 determines that there is no change in the position and the orientation of the face, the display control unit 20 returns to step ST46. If the display control unit 20 determines that there is a change, the display control unit 20 moves on to step ST48.

In step ST48, the display control unit 20 determines whether the driver is in a mirror unit staring state. Using the position and the orientation of the face, and the determination reference values, the display control unit 20 determines whether the driver is staring at the mirror unit. If the display control unit 20 determines that the driver is in a staring state, the display control unit 20 moves on to step ST49. If the display control unit 20 determines that the driver is not in a staring state, the display control unit 20 returns to step ST46. It should be noted that a staring state in this example indicates a point when the driver focuses his/her eyes on grasping a situation in a physiological operation, and is not necessarily a state where the driver is intensely staring at the image on the mirror unit.

In step ST49, the display control unit 20 enters a high-speed detection mode. To accurately detect a visual recognition range alteration instruction and a visual recognition range restoration instruction from the driver, the display control unit 20 observes the position and the orientation of the face at a high speed. By doing so, the display control unit 20 can detect minute movements of the driver. In the high-speed detection mode, the display control unit 20 regularly observes the position and the orientation of the face of the driver at intervals of 100 ms or shorter, for example. It should be noted that head turn detection is performed in a normal detection mode, and the position and the orientation of the face of the driver are regularly observed at longer time intervals than in the high-speed detection mode. The display control unit 20 enters the high-speed detection mode, and then moves on to step ST50.

In step ST50, the display control unit 20 starts instruction detection. The display control unit 20 starts detecting a visual recognition range alteration instruction and a visual recognition range restoration instruction, using a result of the observation of the position and the orientation of the face, and the determination reference values. The display control unit 20 then moves on to step ST51.

In step ST51, the display control unit 20 determines whether any instruction has been detected. If a movement of the driver indicating a visual recognition range alteration instruction or a visual recognition range restoration instruction has been detected through the instruction detection, the display control unit 20 moves on to step ST52. Further, if any instruction has not been detected, the display control unit 20 moves on to step ST53.

In step ST52, the display control unit 20 performs display control in accordance with the instruction. In a case where a visual recognition range alteration instruction has been detected, for example, the display control unit 20 alters the visual recognition range in which an image is displayed in the monitor image area, in accordance with a change in the position and the orientation of the face. Further, in a case where a visual recognition range restoration instruction has been detected, for example, the display control unit 20 restores the visual recognition range in which an image is displayed in the monitor image area to the same area as that prior to the alteration. The display control unit 20 performs such display control, and then returns to step ST50.

In step ST53, the display control unit 20 determines whether the orientation of the head differs from the direction of the mirror unit. Using the result of the observation of the orientation of the head and the determination reference values, the display control unit 20 determines whether the orientation of the head differs from the direction of image recognition. If the display control unit 20 determines that the orientation of the head differs from the direction of image visual recognition, the display control unit 20 switches from the high-speed detection mode to the normal detection mode, and then returns to step ST47. Further, if the display control unit 20 determines that the orientation of the head is equal to the direction of the mirror unit, the display control unit 20 moves on to step ST54.

In step ST54, the display control unit 20 determines whether a predetermined determination period has passed. If the predetermined determination period has not passed yet, the display control unit 20 returns to step ST50. If the predetermined determination period has passed, the display control unit 20 switches from the high-speed detection mode to the normal detection mode, and then returns to step ST47.

Figure 29:
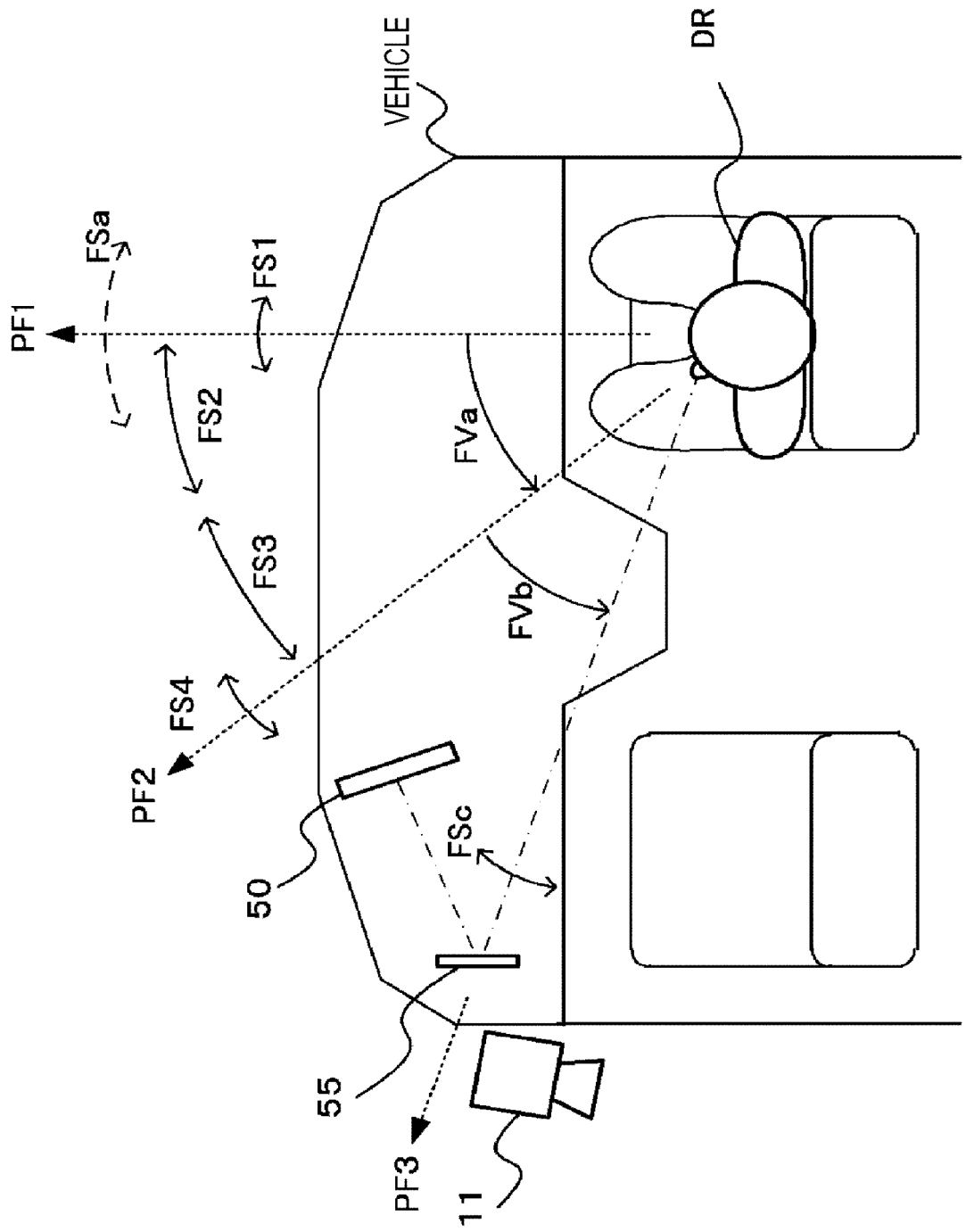
FIG. 29 is a diagram showing an example of a head turning operation and a visual recognition range alteration instructing operation.
Figure 30:
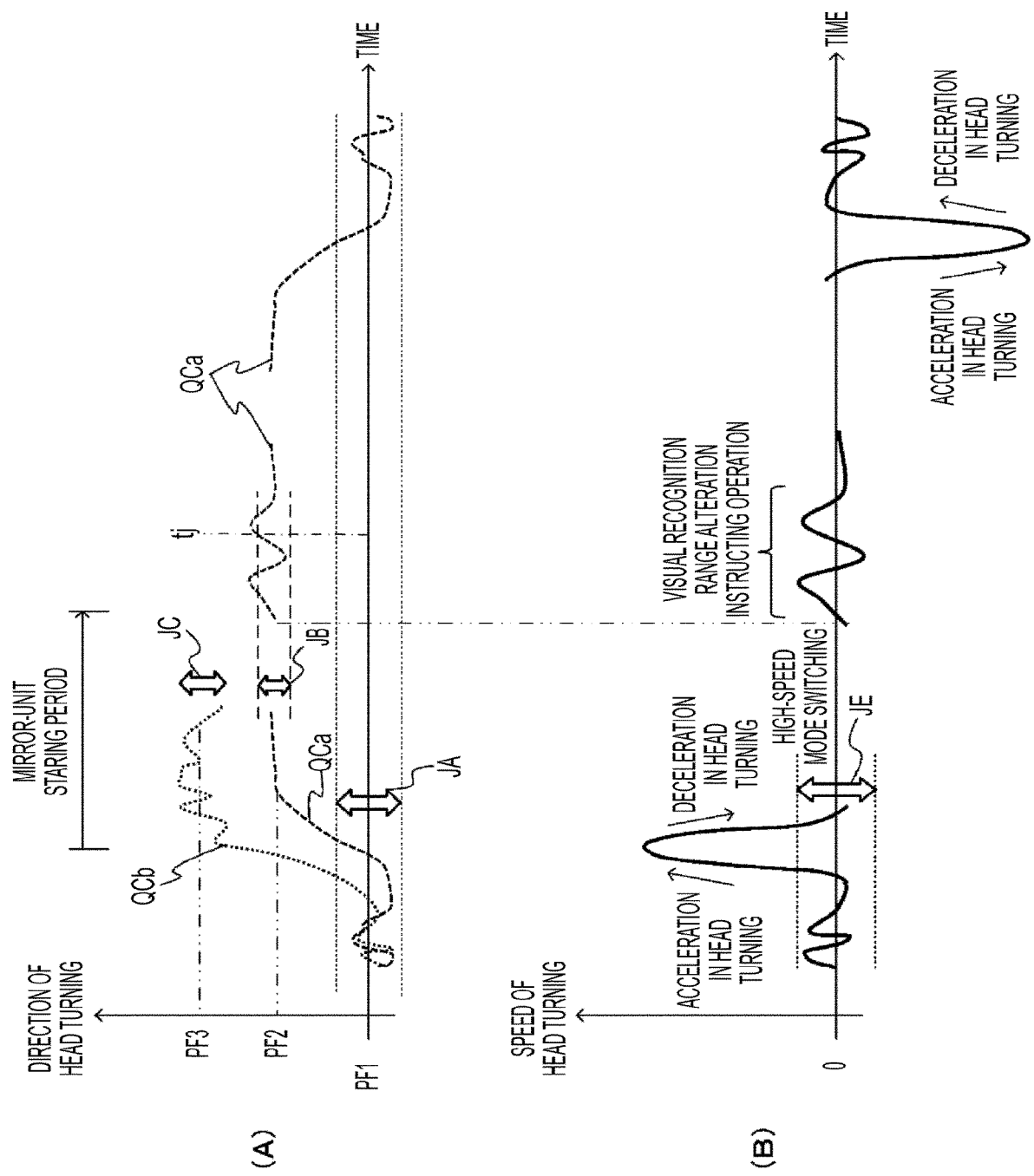
FIG. 30 is a diagram showing an example of a head turn determining operation and a visual recognition range alteration instruction determining operation.

FIG. 29 is a diagram showing an example of a head turning operation and a visual recognition range alteration instructing operation. Further, FIG. 30 is a diagram showing an example of a head turn determining operation and a visual recognition range alteration instruction determining operation. Specifically, (A) of FIG. 30 shows an example of the relationship between the head turning direction (angle) and time, and (B) of FIG. 30 shows an example of the relationship between the head turning speed and time.

In FIG. 29, a direction PF1 indicates a forward direction in which the head of the driver is facing forward in a normal state, and a direction PF2 is an example of the orientation of the head at a time when the driver is viewing the image on the mirror unit 55. A direction PF3 indicates the direction of the mirror unit 55.

A range FS1 indicates an example of the moving range of the orientation of the head of the driver in a normal state, and a range FSa indicates an example of the search range of eye movements of the driver. A range FS2 is the head turn accelerating zone at a time when the orientation of the head is moved from the direction PF1 to the direction PF2, and is the head turn decelerating zone at a time when the orientation of the head is moved from the direction PF2 to the direction PF1. A range FS3 is the head turn decelerating zone at a time when the orientation of the head is moved from the direction PF1 to the direction PF2, and is the head turn accelerating zone at a time when the orientation of the head is moved from the direction PF2 to the direction PF1. An angle FVa indicates an example of the head turning angle at a time when the driver is viewing the image on the mirror unit 55. An angle FVb indicates an example of the head turning angle to be achieved with an eye movement at a time when the driver is viewing the image on the mirror unit 55. A range FSc indicates an example of the search range to be achieved with an eye movement at a time when the driver is viewing the image on the mirror unit 55.

In (A) of FIG. 30, a range JA is the range of the head turning angle at which the driver can be regarded as facing forward. A range JB is the range of the head turning angle at which the driver can be regarded as staring at the mirror unit 55 when turning his/her head in the direction PF2. A range JC is the range of the head turning angle at which the driver can be regarded as staring at the mirror unit 55 in accordance with the eye movement. A curve QCa indicates the orientation of the head, and a curve QCb indicates the line of sight based on the orientation of the head and the eye movement. Further, in (B) of FIG. 30, a range JE is the determination range at a time when the driver turns his/her head forward.

The display control unit 20 detects that the head turning speed (equivalent to a change in the orientation of the head) returns to a value within the range JE after exceeding the range JE indicated by a determination reference value, and the head turning direction (angle) is within the range JB (the range set on the basis of the direction of the mirror unit) of the head turning direction indicated by a determination reference value. In this case, the display control unit 20 assumes that the driver is facing toward the mirror unit 55 and is staring, and determines that a head turning operation has been performed. It should be noted that, if an eye movement is detected, and the line of sight is estimated in accordance with the orientation of the head and the eye movement, the estimated line of sight is compared with the range JC so that a head turning operation can be determined with higher precision. In a case where the display control unit 20 determines that a head turning operation has been performed, the display control unit 20 enters the high-speed detection mode so that a visual recognition range alteration instruction can be detected with a high temporal resolution.

It should be noted that, between the rear-view monitoring systems on the side of the driver's seat and on the side of the passenger seat, the arrangement and the orientations of the display unit 50 and the mirror unit 55 are different, and instructing operation determination and head turning angle determination are also supposedly different. Therefore, it is preferable to set determination references independently of each other.

The display control unit 20 compares the head turning direction (angle) with the range JB for determining whether the head turning direction (angle) indicates a staring state, and detects that the head turning direction (angle) exceeds the range JB in a predetermined direction a predetermined number of times, such as twice. Here, in a case where a combination of two or more accelerating operations of the head of the driver has been detected at time tj as shown in (A) of FIG. 30, or where the display control unit 20 determines that the head turning direction (angle) has exceeded the range JB twice, the display control unit 20 assumes that the driver has issued an instruction while staring at the mirror unit, and determines that a visual recognition range alteration instruction has been issued. After that, the display control unit 20 performs display control to alter the visual recognition range in accordance with the visual recognition range alteration instruction.

Meanwhile, the display control unit 20 detects that the orientation of the head is within the range JA indicated by a determination reference value. In this case, the display control unit 20 determines that the driver has turned his/her head away from the mirror unit and is facing forward, and returns to the same state as that prior to the head turning operation determination.

Also, the visual recognition range alteration instruction may involve a different amount of action instructing operation each time in accordance with driving or the state of the driving. Normally, in a low-speed driving operation such as parking, the driver is used to greatly moving the head or the body. In a high-speed driving operation, on the other hand, head movements are small while movements of the line of sight involve mostly eye movements. Therefore, it is preferable to set a determination reference with a smaller head movement. Further, although two or more repetitive movements are shown as an example in FIG. 30, head movements of the driver may not involve any substantial restoration and may be a series of two-stage accelerating movements in one direction.

Figure 31:
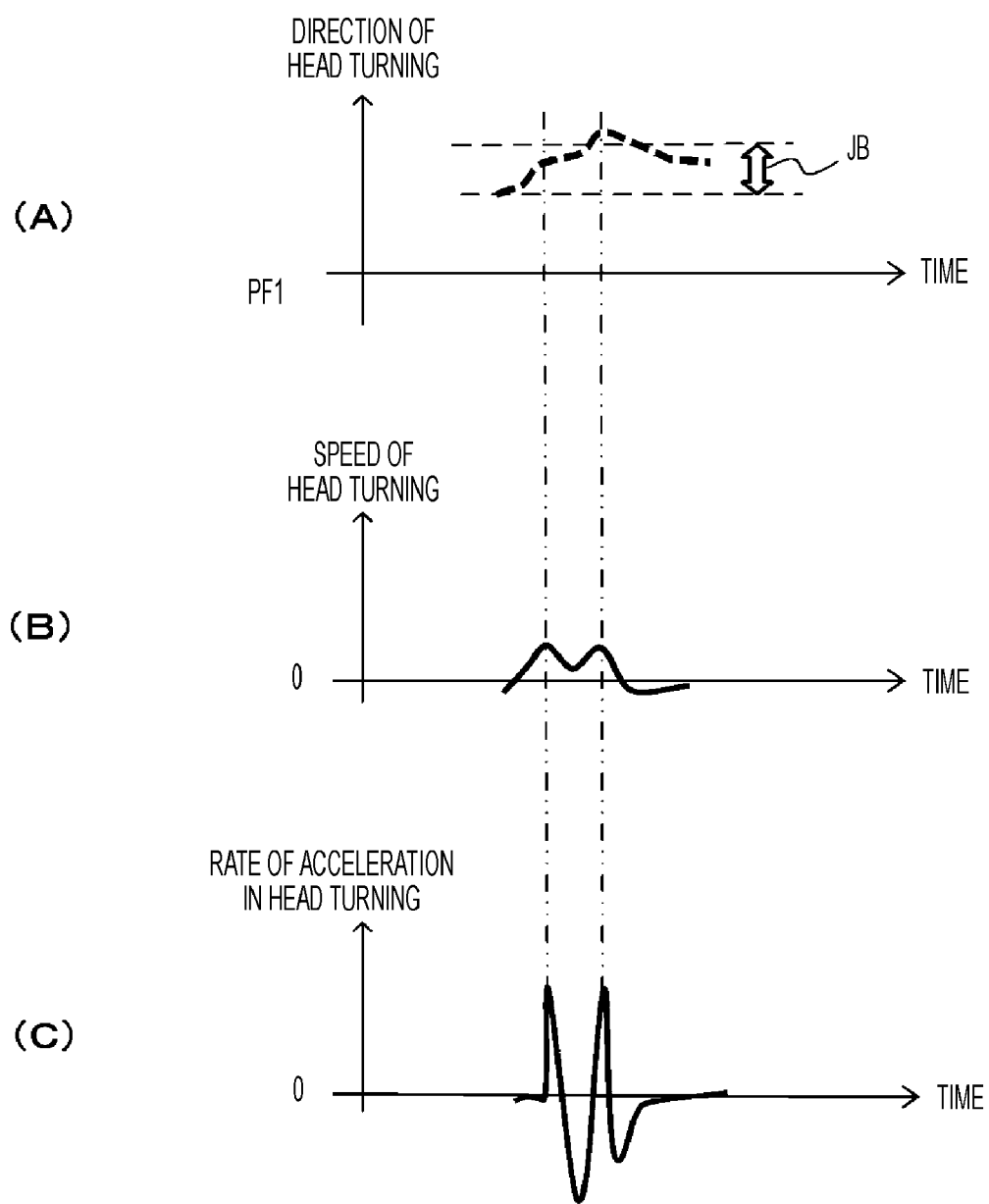
FIG. 31 is a diagram showing an example case where the acceleration in a head turning operation is used as the amount of action instructing operation.

FIG. 31 shows an example case where the acceleration in a head turning operation is used as the amount of action instructing operation. (A) of FIG. 31 shows the head turning direction (angle), (B) of FIG. 31 shows the head turning speed, and (C) of FIG. 31 shows the acceleration in head turning.

In a case where the driver turns his/her head more than once, the starting position in a repetitive head turning operation and the starting position in the next repetitive head turning operation are not necessarily the same. For example, the next head turning operation is performed before the head returns to its original position in the current repetitive head turning operation. In this case, the curve QCa indicating the orientation of the head changes as shown in (A) of FIG. 31. Therefore, a visual recognition range alteration instruction cannot be determined in accordance with the head turning direction (angle). However, if the repetitive head turning operation is repeated, the acceleration in head turning has a waveform with a cycle of vibration for each head turning operation, as shown in (C) of FIG. 31. Thus, the display control unit 20 can detect repetitive head turns with high precision, using the acceleration in head turning.

Further, the display control unit 20 has the operating characteristics history such as the head turning speeds and the head turning directions of the respective drivers learned, and updates the determination reference values for the respective drivers in accordance with characteristics unique to the respective drivers. As the determination reference values are updated in this manner, a self-learning function is achieved so that the accuracy in determining a head turning operation or a visual recognition range alteration instruction can be increased, and accurate instruction detection can be performed through fewer instructing operations. The learning function is also made to function to learn operating characteristics including amounts of action instructing operations, and optimize the characteristics of the drivers.

Through such a process, display control suitable for an operation in a case where the driver is to grasp the situation in the peripheral area can be performed with high precision.

Also, after the time during which the head turning operation is stable has passed, movement of the orientation of the head is detected. In this manner, a visual recognition range alteration instruction or a visual recognition range restoration instruction is determined to have been issued in a case where a head movement in a direction perpendicular to the orientation of the head is repeated twice or more, or where a head turning operation to turn the head about the neck is repeated twice or more. Thus, instruction determination can be performed with higher precision.

In an ergonomic process of a person turning his/her head in a different direction from the line of sight, an object is quickly captured with an eye movement, and the person starts focusing his/her eyes on the object. At the same time, the head is stabilized as the last viewing is started. This movement is taken into consideration in the present technology. That is, at a time when the driver views display contents and starts grasping the situation, the movement of the head position is stabilized and starts entering a steady state. By viewing the screen, the driver determines whether there is a need to further alter the viewing field range. Therefore, after this stabilizing procedure, an instructing operation is performed, and this fact is reflected in the present technology.

Also, as for display control, the display control unit 20 performs display control after detecting a movement of the orientation of the head of the driver toward the mirror unit. In a case where the orientation of the head differs from the direction of the mirror unit, for example, the backlight is turned off, or the signal level of the luminance signal is lowered, to prevent the driver from seeing the image or make it difficult for the driver to see the image. Further, in a case where the orientation of the head is equal to the direction of the mirror unit, for example, the backlight is turned on, and luminance is controlled or the signal level of the luminance signal is adjusted, to allow the driver to see the image of the visual recognition range. Accordingly, display of an unnecessarily bright image of the peripheral area is prevented while the driver is facing forward. Also, the image of the peripheral area can be displayed only when the driver is facing toward the mirror unit.

Also, after altering the visual recognition range, the display control unit 20 may automatically return the visual recognition range to its original position in a gradual manner. In this case, the driver does not need to perform an operation to return the visual recognition range to the original range. Further, to prevent the driver from becoming incapable of quickly checking a situation, the display control unit 20 performs display control so that any rapid change does not occur in the display magnification or in the display form.

For ease of explanation, examples of procedures for detecting an instruction by recognizing the orientation of the head and the line of sight are described in this specification. However, the actual objective does not lie in accurately determining the orientation of the head and the line of sight. As long as the correlations with the state where the driver visually recognizes the display unit 50 are obtained, the display control unit 20 does not necessarily have the function to accurately recognize the line of sight and accurately determine the position of the head. Therefore, the display control unit 20 does not necessarily have the configuration shown in FIG. 27, and may have some other configuration to display a vehicle state and a response to a driver's operation instructing movement.

5. Other Embodiments

Also, in another embodiment, if a compressed image is displayed on a display unit 50, the distance from the display image might greatly differ from the distance to the object in the peripheral area. To counter this, an alert may be displayed on or near the screen of the display unit in accordance with the compression rate of the image.

Figure 32:
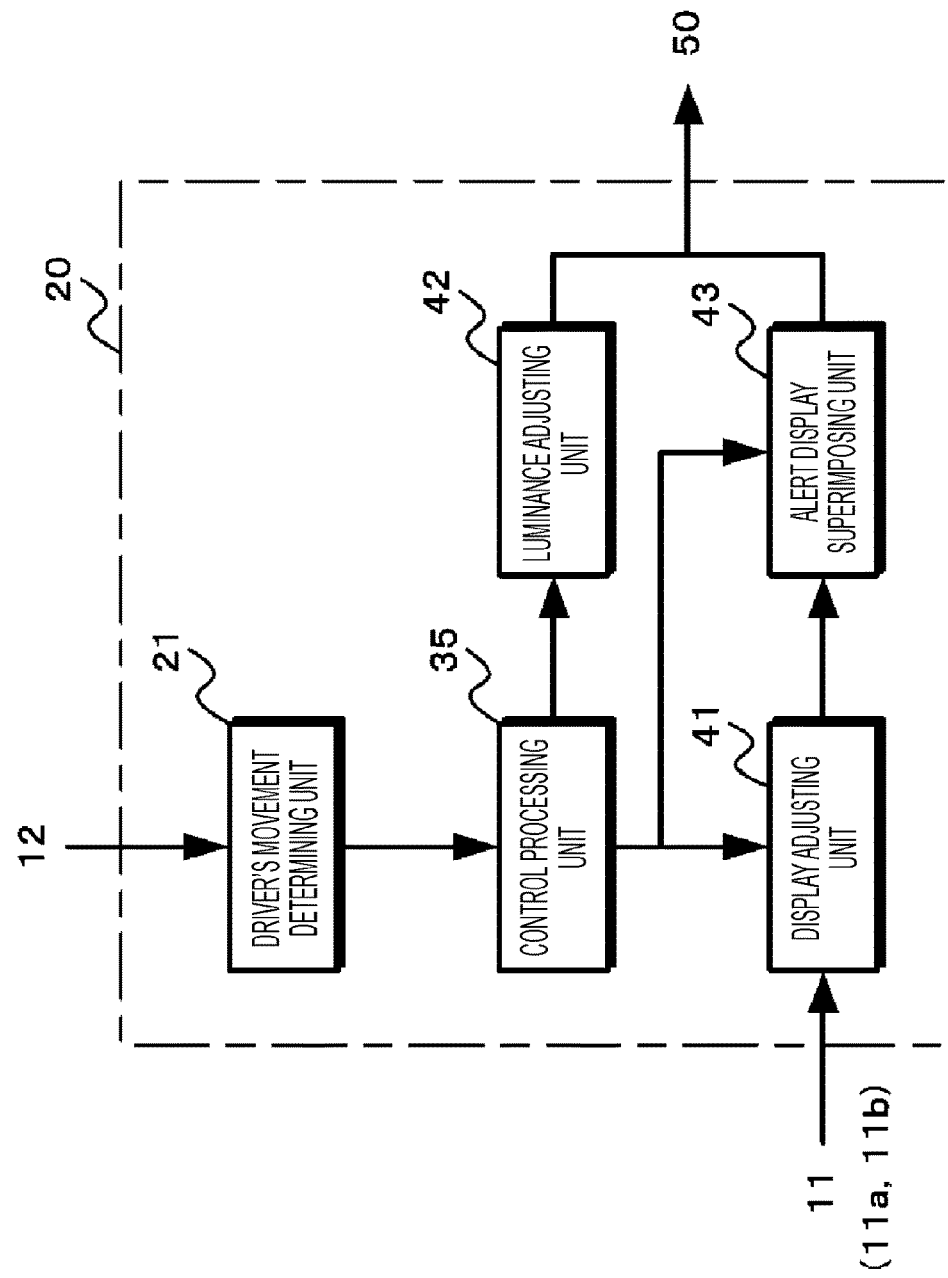
FIG. 32 shows an example configuration of a display control unit that performs alert display.

FIG. 32 shows an example configuration of a display control unit that performs alert display. The display control unit 20 includes a driver's movement determining unit 21, a control processing unit 35, a display adjusting unit 41, a luminance adjusting unit 42, and an alert display superimposing unit 43.

In accordance with the image signal supplied from the driver imaging unit 12, the driver's movement determining unit 21 detects the head position of the driver, and determines the moving direction and the moving distance of the head position of the driver. In accordance with the image signal supplied from the driver imaging unit 12, for example, the driver's movement determining unit 21 recognizes the face of the driver, and determines the position of the recognized face and the orientation of the face. The driver's movement determining unit 21 further tracks the recognized face, and determines the moving direction and the moving distance of the head position. The driver's movement determining unit 21 then outputs determination results to the control processing unit 35.

In accordance with the determination results output from the driver's movement determining unit 21, the control processing unit 35 generates a control signal for performing different display control between the monitor image area and the non-monitor image areas in the display unit 50, and outputs the control signal to the display adjusting unit 41, the luminance adjusting unit 42, and the alert display superimposing unit 43.

In accordance with the control signal from the control processing unit 35, the display adjusting unit 41 performs peripheral area image magnification adjustment on the image signal supplied from the peripheral area imaging unit 11, and switches or combines images of the peripheral area, for example.

In accordance with the control signal from the control processing unit 35, the luminance adjusting unit 42 reduces the luminance of the non-monitor image areas in the display unit 50 to a lower luminance than that of the monitor image area. In a case where the display unit 50 is formed with a display element that requires illumination, such as a liquid crystal display element, the luminance adjusting unit 42 controls illumination, such as a backlight, to reduce the luminance of the non-monitor image areas to a lower luminance than that of the monitor image area. Further, in a case where the display unit 50 is formed with a display element that requires illumination or a light-emitting element such as an organic EL display element, on the other hand, a process may be performed to lower the signal level of the luminance signal corresponding to the non-monitor image areas.

In accordance with the control signal from the control processing unit 35, the alert display superimposing unit 43 superimposes information indicating the compression rate of the image, for example, on an image subjected to a display changing process. For example, an image of the visual recognition range is displayed in accordance with a movement of the face to the right or left. The visual recognition range is enlarged by two or more repetitive movements of the face or the head, and is returned to the same display as the display prior to the expansion by movements in the reverse direction. Also, in a case where the magnification of a displayed image is changed, a dynamic alert for the display magnification change is displayed. To enable the driver to intuitively understand the contents of the alert, the frame size of the dynamic alert display is adjusted in accordance with the magnification changing operation. The frame is displayed as a frame shaded with dashed lines. As the magnification changes, the shaded frame appears as if flowing. The flow of the shaded frame display preferably includes movements toward the vehicle, because a person recognizes a moving object outside the center of the field of view by virtue of the human physiological mechanism, and sensitively detects an object moving toward the person, regarding such an object as a danger.

In a case where a compressed image is displayed through such display control, the driver can be prevented from losing the sense of distance or the like. As the image is compressed, the driver can be prevented from wrongly recognizing a close object as a distant object, for example.

The display control unit 20 may also perform display control in cooperation with a navigation system, and display an image with a wider viewing angle than a conventional field of rearward view at a junction of expressways or at a traffic circle.

Also, in determining a movement of the driver, the display control unit 20 may perform display control, using not only a movement of the orientation of the head or rotation of the head about the neck, but also a tilting movement of the head (head shaking) and/or a movement of the upper body to the front or rear side or to the right or left, for example. Further, the display control unit 20 may perform a display image zoom-in operation or a display image zoom-out operation, using a movement of the head toward the mirror unit or a change in the position of the head.

Figure 34:
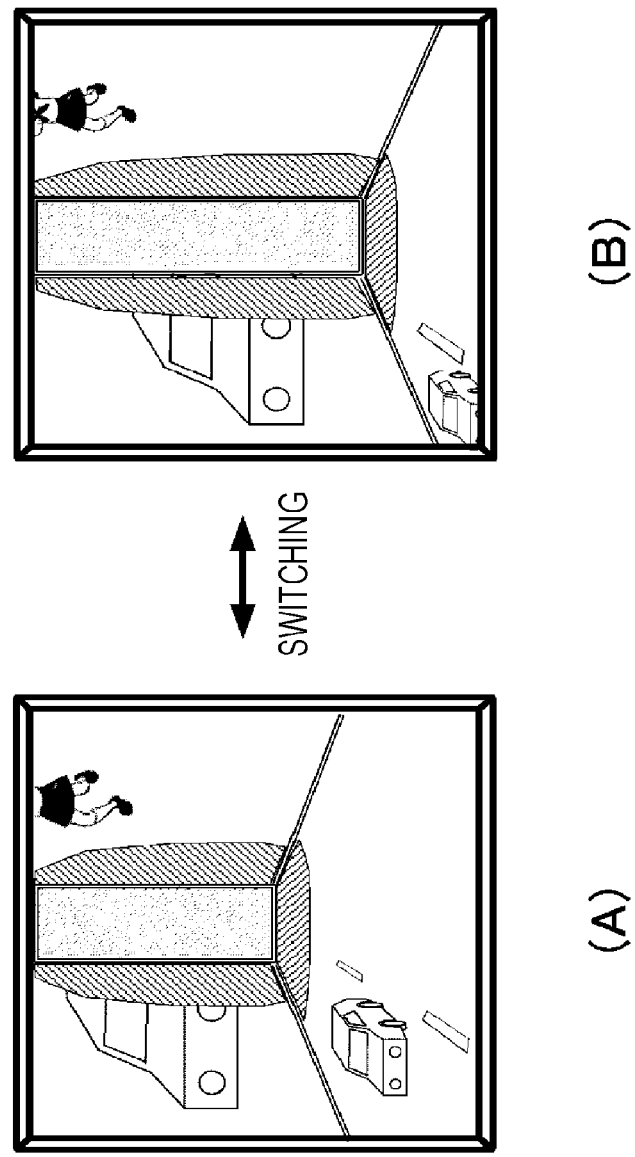
FIG. 34 is a diagram for explaining switching between peripheral area images in a case where the head is moved in a forward or backward direction.
Figure 35:
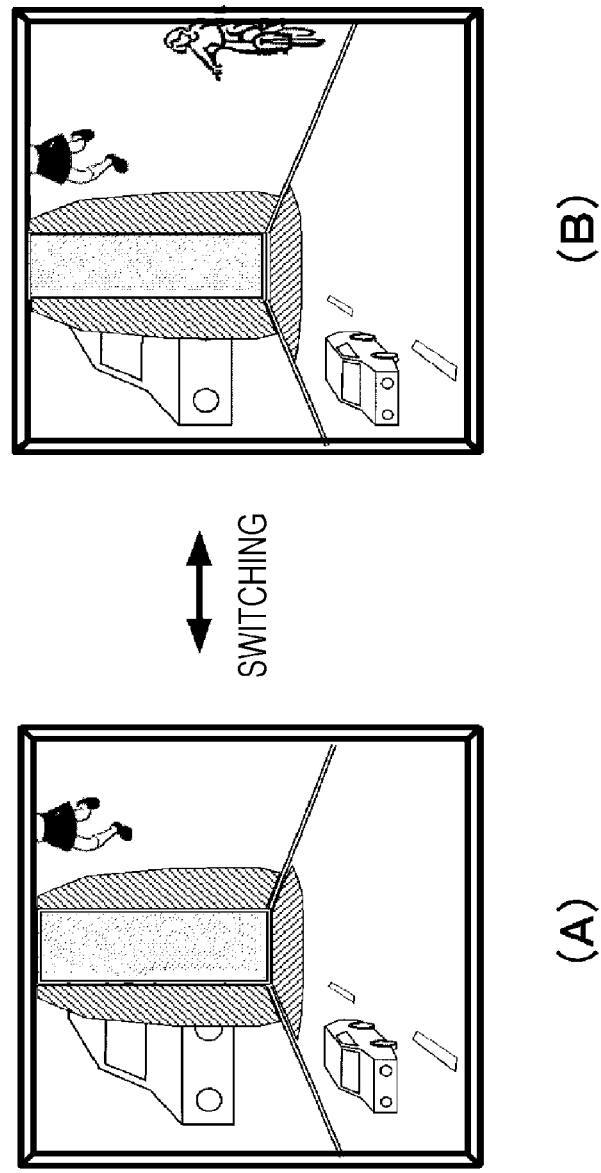
FIG. 35 is a diagram for explaining switching between peripheral area images in a case where the head is moved to the left.

FIGS. 33 through 35 show examples of display control based on other movements of the driver. FIG. 33 shows an example of arrangement of peripheral area imaging units and an example of peripheral images displayed on the display unit. As shown in (A) of FIG. 33, peripheral area imaging units 11*c* and 11*d* are installed on the side surfaces of a vehicle, and a peripheral area imaging unit 11*e* is installed on the back surface of the vehicle. As shown in (B) of FIG. 33, the display control unit 20 causes the display unit 50 to display three peripheral area images obtained by the peripheral area imaging units 11*c*, 11*d*, and 11*e*.

FIG. 34 is a diagram for explaining switching between peripheral area images in a case where the head is moved in a forward or backward direction. As shown in (A) of FIG. 34, before the head is moved, the display control unit causes the display unit 50 to display three peripheral area images obtained by the peripheral area imaging units 11*c*, 11*d*, and 11*e*. Also, in a case where the display control unit detects a forward movement of the head, for example, the display control unit switches the display area showing the peripheral area images obtained by the peripheral area imaging units 11*c* and 11*d* installed on the side surfaces of the vehicle to an image expanded in the traveling direction, as shown in (B) of FIG. 34. If the head is moved to its original position after that, the display control unit performs display control to return the image to the same image as that prior to the switching.

FIG. 35 is a diagram for explaining switching between peripheral area images in a case where the head is moved to the left. As shown in (A) of FIG. 35, before the head is moved, the display control unit causes the display unit 50 to display three peripheral area images obtained by the peripheral area imaging units 11*c*, 11*d*, and 11*e*. Also, in a case where the display control unit detects a movement of the head to the left, for example, the display control unit switches the displayed image to an image in which the display area showing the right-side peripheral area is expanded, as shown in (B) of FIG. 35. If the head is moved to its original position after that, the display control unit performs display control to return the image to the same image as that prior to the switching.

As display control is performed in accordance not with a movement of the orientation of the head but with a tilting movement or the like of the head as described above, peripheral area images can be displayed in various forms.

Further, in the above described embodiments, display control is performed in accordance with a result of determination of a movement of the driver, and the visual recognition range is altered. However, the orientation of the mirror unit may be changed in accordance with a result of determination of a movement of the driver so that an image of a desired area in the image displayed on the display unit is reflected by the mirror unit.

Also, the mirror unit may be formed with a semi-transmissive mirror, and a display device or a display element using a liquid crystal display element, an organic EL display element, or a light-emitting diode, for example, may be installed on the back surface of the mirror unit. In this case, the peripheral area image displayed on the display unit, and the image displayed on the display device on the back surface can be simultaneously viewed on the mirror unit. If the display device on the back surface displays various kinds of information, the driver can also obtain the information while checking the peripheral area. The information to be displayed on the display device on the back surface may be information (such as a determined instruction from the driver or a determined visual recognition range mode) related to the peripheral area image displayed on the display unit, information (such as navigation instruction information) related to the driving situation, or the like.

Further, the mirror unit may be formed with a semi-transmissive mirror having a semi-transmissive light control function, or may include a semi-transmissive mirror and a transmitted-light control device provided on the back surface of the semi-transmissive mirror. With such a configuration, the easiness to view the image displayed on the display device provided on the back surface of the mirror unit can be adjusted with the semi-transmissive light control function or the transmitted-light control device. Thus, various kinds of information can be displayed so that the driver can obtain the information while checking the peripheral area.

Also, in the example cases described in the above described embodiments, a function equivalent to that of a rearview mirror is achieved. However, the peripheral area is visually recognized not only with a rearview mirror but also with an in-vehicle mirror, and therefore, a function equivalent to that of an in-vehicle mirror may be achieved. Next, a case where a function equivalent to that of an in-vehicle mirror is achieved is described as another embodiment. It should be noted that the display unit, the mirror unit, and the like are not necessarily arranged in a manner similar to that in a case where a conventional mirror is used. Instead, the display unit, the mirror unit, and the like may be arranged near the meters installed at the center on the dashboard or near the console panel, for example.

Figure 36:
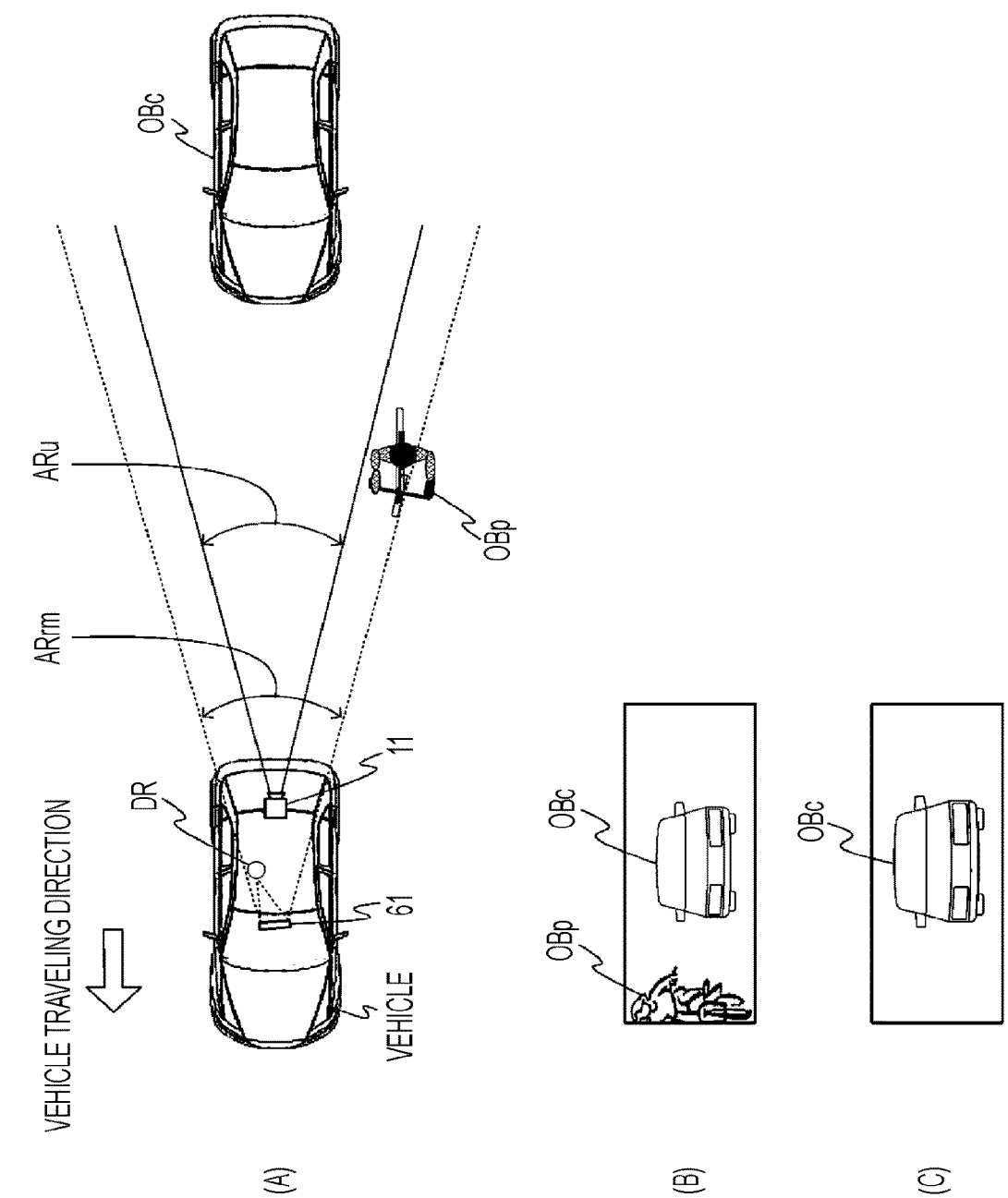
FIG. 36 is a diagram showing an example configuration in a case where a function equivalent to that of an in-vehicle mirror is achieved with a single peripheral area imaging unit.

First, a case where a function equivalent to that of an in-vehicle mirror is achieved with a single peripheral area imaging unit is described. FIG. 36 shows an example configuration in a case where a function equivalent to that of an in-vehicle mirror is achieved with a single peripheral area imaging unit. For example, as shown in (A) of FIG. 36, the view behind the vehicle is imaged with a single peripheral area imaging unit installed at a rear portion of the vehicle, so that the driver DR can check the peripheral area image obtained by the peripheral area imaging unit 11. It should be noted that the display unit that displays the peripheral area image is not shown in (A) of FIG. 36.

Also, in a case where the driver DR directly views the peripheral image obtained by the peripheral area imaging unit 11, a sense of distance similar to that with the peripheral area reflected by an in-vehicle mirror 61 is maintained. For example, the area ARu imaged by the peripheral area imaging unit 11 (this area has an angle of view in the horizontal direction of the peripheral image obtained by the peripheral area imaging unit 11) is substantially equal to the viewing field area ARrm in the horizontal direction of the peripheral area reflected by the in-vehicle mirror 61. In this manner, a function equivalent to that of an in-vehicle mirror can be achieved with a single peripheral area imaging unit.

In a case where there are a following vehicle OBc and a person OBp as shown in (A) of FIG. 36, the peripheral image reflected by the in-vehicle mirror 61 is an image of the viewing field area ARrm shown in (A) of FIG. 36, and therefore, is the image shown in (B) of FIG. 36, for example. Meanwhile, the peripheral area imaged by the peripheral area imaging unit 11 is the peripheral area ARu shown in (A) of FIG. 36, and therefore, is the image shown in (C) of FIG. 36. That is, in the peripheral area image obtained by the peripheral area imaging unit 11, the area blocked from the driver's view near the vehicle in the peripheral image reflected by the in-vehicle mirror 61 is large, and therefore, the person OBp cannot be noticed as shown in (C) of FIG. 36.

Figure 37:
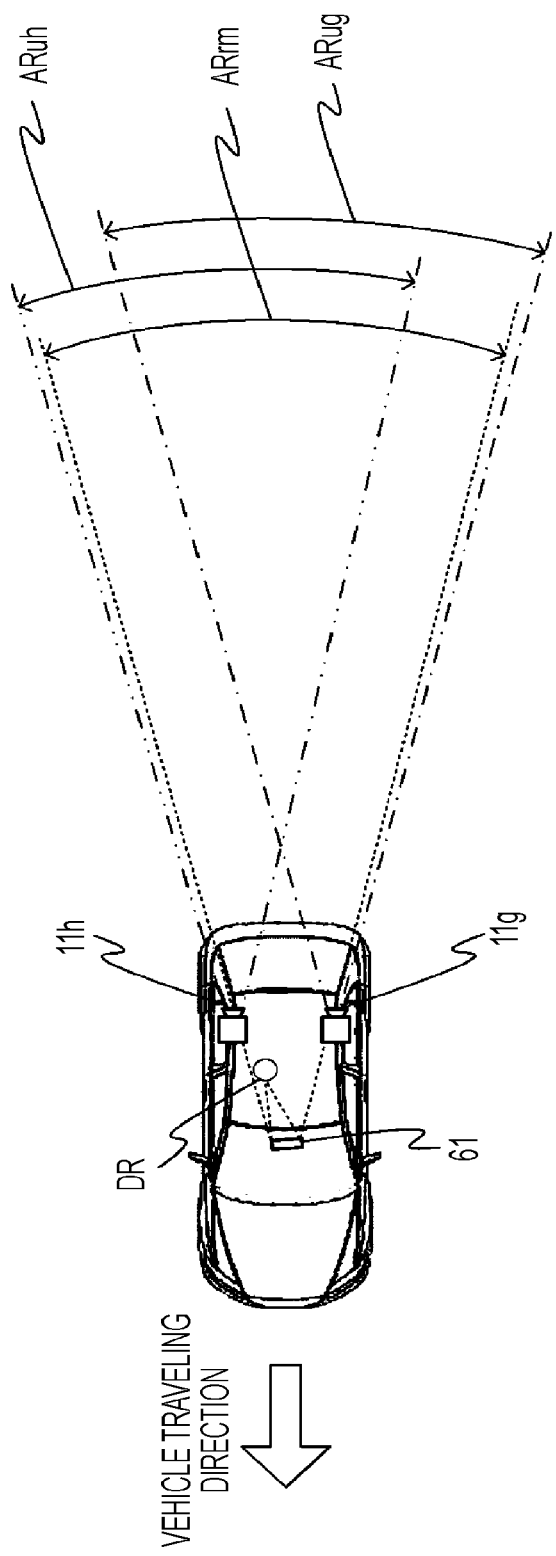
FIG. 37 is a diagram showing an example configuration in a case where a function equivalent to that of an in-vehicle mirror is achieved with peripheral area imaging units.

To counter this, a function equivalent to that of an in-vehicle mirror is achieved with peripheral area imaging units, as shown in FIG. 37. For example, a peripheral area imaging unit 11g is installed at the left side of the vehicle, and a peripheral area imaging unit 11h is installed at the right side of the vehicle. The rearward view is imaged by the respective peripheral area imaging units, and a function equivalent to that of an in-vehicle mirror is achieved. In this case, the area blocked from the driver's view is smaller than that in the case shown in FIG. 36. It should be noted that an area ARrm is the viewing field area in the horizontal direction of the peripheral image reflected by the in-vehicle mirror 61, an area ARug is the viewing field area in the horizontal direction of the peripheral image obtained by the left-side peripheral area imaging unit 11g, and an area ARuh is the viewing field area in the horizontal direction of the peripheral image obtained by the right-side peripheral area imaging unit 11h. In this manner, an increase in the area blocked from the driver's view near the vehicle as a result of combining of the peripheral area images obtained by the peripheral area imaging unit 11g and the peripheral area imaging unit 11h can be prevented in a case where a function equivalent to that of an in-vehicle mirror is achieved with the peripheral area imaging units.

Also, since there is a disparity between the peripheral area images obtained by the peripheral area imaging unit 11g and the peripheral area imaging unit 11h, it is difficult to eliminate the disparity and display a combined peripheral image. To counter this, when the peripheral area images are combined, the image combining process is ergonomically facilitated so that the disparity will not stand out.

Figure 38:
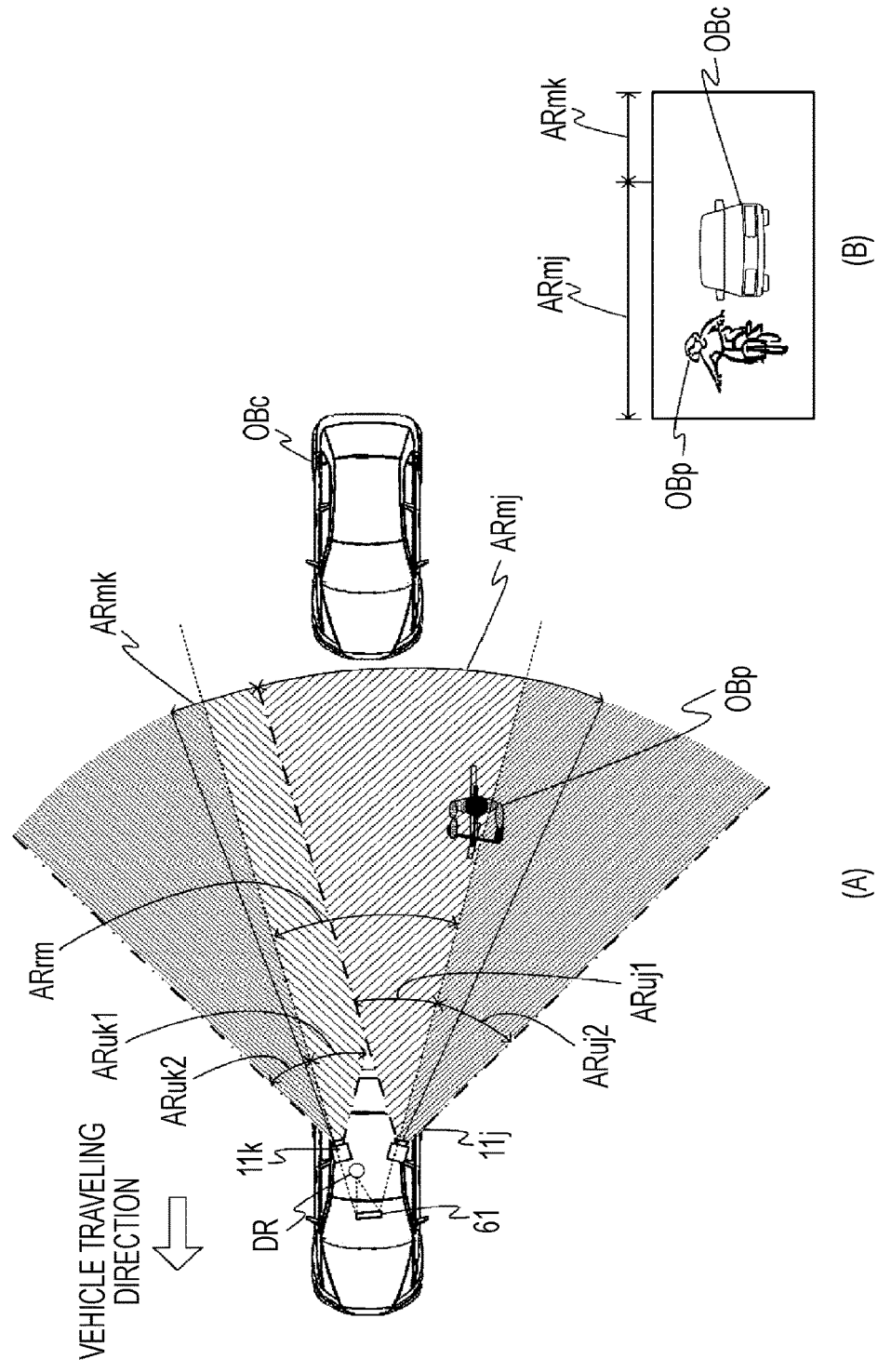
FIG. 38 is a diagram showing an example configuration in a case where the area blocked from the driver's view is smaller than that with an in-vehicle mirror.

FIG. 38 shows an example configuration in a case where the area blocked from the driver's view is smaller than that with an in-vehicle mirror. A peripheral area imaging unit 11j is installed at the left side of the vehicle, and a peripheral area imaging unit 11k is installed at the right side of the vehicle. The peripheral area imaging unit 11j is designed so that the viewing field area (the angle of view) in the horizontal direction of the peripheral image to be obtained includes an area ARuj1 included in the viewing field area ARrm in the horizontal direction of the peripheral image reflected by the in-vehicle mirror 61, and an area ARuj2 located on the outer left side of the viewing field area ARrm. The peripheral area imaging unit 11k is designed so that the viewing field area (the angle of view) in the horizontal direction of the peripheral image to be obtained includes an area ARuk1 included in the viewing field area ARrm in the horizontal direction of the peripheral image reflected by the in-vehicle mirror 61, and an area ARuk2 located on the outer right side of the viewing field area ARrm. Also, at any position behind the vehicle, the viewing field area ARrm is included in at least one of the areas ARuj1 and ARuk1.

In accordance with a control signal from the control processing unit 35, the display adjusting unit 41 of the above described display control unit 20 cuts out images from the peripheral images obtained by the peripheral area imaging units 11j and 11k, and combines the images. The control processing unit 35 controls the cutting out of the images so that the peripheral area appears as if it were continuous in the combined images. In response to an instruction from the driver, the control processing unit 35 further moves the image cutting positions and the image combining position in accordance with a result of determination performed by the driver's movement determining unit 21.

For example, the control processing unit 35 combines the image of an area ARmj in the peripheral image obtained by the peripheral area imaging unit 11*j* and the image of an area ARmk in the peripheral image obtained by the peripheral area imaging unit 11*k*, so that the peripheral area including the area ARrm can be checked as shown in (B) of FIG. 38. Although a process of eliminating a disparity and displaying a combined image is not performed, it is possible to generate the image to be used in checking the peripheral area simply by combining the image of the area ARmj and the image of the area ARmk. Thus, the image for checking the peripheral area can be readily generated.

Also, in the image combining, a so-called blend process is performed in a predetermined range based on the image combining position, and the mixture ratio between the peripheral image obtained by the peripheral area imaging unit 11*j* and the peripheral image obtained by the peripheral area imaging unit 11*k* is continuously changed. As such a process is performed, the joined portion can be made inconspicuous.

Further, in a case where the position of the driver DR moves to the right or left as a result of changes in the image cutting positions in accordance with a result of determination performed by the driver's movement determining unit 21, the control processing unit 35 moves the image cutting areas in a manner similar to that in moving the peripheral area reflected by the in-vehicle mirror 61. In this manner, a function equivalent to that of a rearview mirror can be achieved, even when the driver moves.

Meanwhile, when the peripheral image obtained by the peripheral area imaging unit 11*j* and the peripheral image obtained by the peripheral area imaging unit 11*k* are combined, a right viewpoint image and a left viewpoint image are combined. Therefore, if there is a following vehicle or a person at the combining position, the image of the vehicle or the person might evoke a feeling of strangeness. Particularly, if a vehicle or a person or the like is in the vicinity, the disparity is large, and therefore, the strangeness of the image stands out at the joined portion. To counter this, the control processing unit 35 changes the combining position in accordance with a result of determination performed by the driver's movement determining unit 21, in response to an instruction from the driver.

Figure 39:
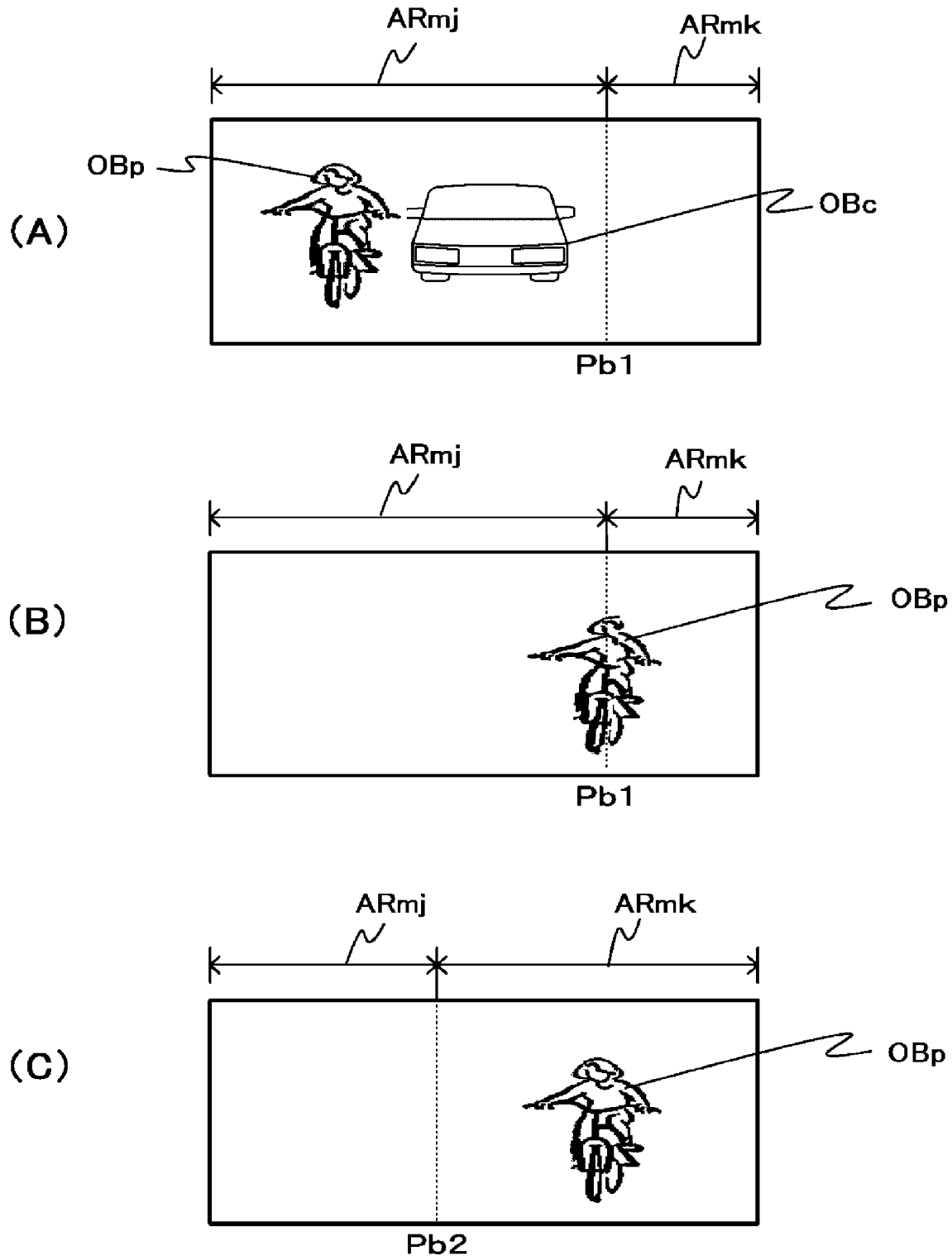
FIG. 39 is a diagram for explaining switching between image combining positions.

FIG. 39 is a diagram for explaining switching between image combining positions. As shown in (A) of FIG. 39, in a case where the position of combining of the peripheral image obtained by the peripheral area imaging unit 11*j* and the peripheral image obtained by the peripheral area imaging unit 11*k* is a position Pb1, the position Pb1 is not included in either of the image areas of a following vehicle OBc and a person OBp, and accordingly, the following vehicle OBc and the person OBp can be readily checked in the displayed peripheral image. However, if the combining position is fixed at the position Pb1, and the image area of the person OBp includes the position Pb1 as shown in (B) of FIG. 39, an image formed by combining a left viewpoint image and a right viewpoint image of the person OBp is displayed, and it might become difficult to correctly recognize the person OBp. To counter this, the control processing unit 35 changes the combining position in accordance with an instruction from the driver. For example, in a case where a driver's instruction to move the combining position to the left is detected, the combining position is moved to the left as shown in (C) of FIG. 39. As the combining position is moved in this manner, the person OBp is displayed only in the peripheral image obtained by the peripheral area imaging unit 11*k*, and accordingly, the person OBp can be easily and correctly recognized.

Further, if the combining position is displayed (with a marker, for example), the driver can easily grasp the positional relationship between the combining position and a following vehicle or a person. Thus, the control processing unit 35 can easily determine whether there is a need to move the combining position, and which direction the combining position is preferably to be moved. It should be noted that the initial position of combining may be automatically set in a preset position or in a position set by a user, or may be set in the position that was already set at the end of the previous driving operation.

Meanwhile, an instruction from the driver is detected from an operation instructing movement of the driver with the above described human-machine interface compatible with operations of the driver. In this manner, the driver can easily move the combining position in a desired direction simply by moving his/her head or line of sight.

It should be noted that the series of processes described in this specification can be performed by hardware, software, or a combination of hardware and software. In a case where processes are performed by software, a program in which the sequences for performing the above described processes are recorded is installed in a memory incorporated into specialized hardware in a computer, and is executed. Alternatively, the processes can be performed by installing the program into a general-purpose computer that can perform various kinds of processes.

For example, the program can be recorded beforehand in a recording medium, such as a hard disk, a solid state drive (SSD), a read only memory (ROM) installed in a signal processing semiconductor, or an independent ROM. Alternatively, the program can be temporarily or permanently stored (recorded) in a removable recording medium, such as a flexible disk, a compact disc read only memory (CD-ROM), a magnetooptical (MO) disk, a digital versatile disc (DVD), a Blu-ray disc (BD) (a registered trade name), a magnetic disk, or a semiconductor memory card. Such a removable recording medium can be provided as so-called packaged software.

Also, the program may be installed into a computer from a removable recording medium, or may be transferred to a computer from a download site via a network such as a local area network (LAN) or the Internet in a wireless or wired manner through a self-diagnostic function or an on-board diagnostic terminal (OBD) terminal. A computer receives the program transferred in such a manner, and can be installed into and updated in a recording medium such as an internal hard disk.

It should also be noted that the present technology should not be interpreted to be limited to the above described embodiments of a technology. The embodiments of this technology disclose the present technology through examples, and it should be obvious that those skilled in the art can modify or replace those embodiments with other embodiments without departing from the scope of the technology. That is, the claims should be taken into account in understanding the subject matter of the present technology.

It should be noted that signal processing devices according to the present technology may also be embodied in the configurations described below.

(1) A signal processing device including
a display control unit that sets the image area to be presented to the driver of a vehicle from an image obtained by imaging a peripheral area around the vehicle in accordance with driving information related to a driving situation of the vehicle, and controls a visual recognition range in the peripheral area in accordance with the driving situation, the driver being able to visually recognize the visual recognition range from the presented image.

(2) The signal processing device of (1), wherein the display control unit controls and causes the visual recognition range to move to an outer side of the vehicle, in accordance with driving information related to a traveling direction of the vehicle.

(3) The signal processing device of (1) or (2), wherein the image obtained by imaging the peripheral area around the vehicle is an image captured from a predetermined position of the vehicle or images captured from predetermined positions that differ from each other in the traveling direction, and
the display control unit sets the image area to be presented from the one or more captured images in accordance with the driving information, and, in accordance with the driving situation, controls the visual recognition range in the peripheral area to be visually recognized.

(4) The signal processing device of (3), wherein the vehicle is formed by connecting a trailer portion to a cabin, and
the image captured from the predetermined position of the vehicle is an image formed by imaging the peripheral area around the vehicle from a predetermined position of the cabin, and the images captured from the predetermined positions that differ from each other in the traveling direction of the vehicle are images formed by imaging the peripheral area around the vehicle from respective predetermined positions of the cabin and the trailer portion.

(5) The signal processing device of (4), wherein, when a driving situation is such that the orientation of the cabin differs from the orientation of the trailer portion in accordance with the driving information, the display control unit sets the image area to be presented, with the outer side of the trailer portion being included in the visual recognition range.

(6) The signal processing device of any of (1) through (5), wherein the driving information includes at least one piece of information among vehicle speed information about the vehicle, information indicating a steering state, gear position information, a direction indicator setting state, the bend angle of a trailer portion relative to a cabin in a case where the vehicle is formed by connecting the cabin to the trailer portion, information indicating a connection state of the trailer portion, and current position information.

INDUSTRIAL APPLICABILITY

With a signal processing device, a signal processing method, and a monitoring system of this technology, the image area to be presented to the driver of a vehicle from an image obtained by imaging a peripheral area around the vehicle is set in accordance with driving information related to a driving situation of the vehicle, and the visual recognition range in the peripheral area the driver can visually recognize from the presented image is controlled in accordance with the driving situation. Thus, the visual recognition range in the peripheral area the driver can visually recognize is controlled in accordance with a driving situation, and the peripheral area around the vehicle can be readily viewed. This technology is suitable for vehicles such as a trailer.

REFERENCE SIGNS LIST

10 Display device
11, 11a, 11b, 11 Peripheral area imaging unit
12 Driver imaging unit
13 Driving situation detecting sensor
15 Driver identification information acquiring unit
20 Display control unit
21 Driver's movement determining unit
22 Driving situation determining unit
23 Recognizing unit
24 Head turn determining unit
25 Instructing operation determining unit
26 Driver authenticating unit
35 Control processing unit
41 Display adjusting unit
42 Luminance adjusting unit
43 Alert display superimposing unit
50 Display unit
55 Mirror unit
61 In-vehicle mirror
91 Rearview mirror
241 Head turn determination processing unit
242 Head turn determination learning unit
243 Determination reference value storage unit
251 Instructing operation determination processing unit
252 Instructing operation determination learning unit
253 Determination reference value storage unit

The invention claimed is:

1. A signal processing device comprising:
circuitry configured to
set an image area to be presented to a driver of a vehicle from an image obtained by imaging a peripheral area around the vehicle in accordance with driving information related to a driving situation of the vehicle;
make a determination of whether the driver has turned their head by comparing a recognition result with a reference value; and
adjust a visual recognition range in the peripheral area when the determination indicates that the driver has turned their head,
wherein the image area presented to the driver is shown on a display and reflected in a mirror for viewing by the driver, and the mirror is positioned further from the driver than the display.

2. The signal processing device according to claim 1, wherein the circuitry is further configured to control the visual recognition range to move to an outer side of the vehicle, in accordance with driving information related to a traveling direction of the vehicle.

3. The signal processing device according to claim 1, wherein
the image obtained by imaging the peripheral area around the vehicle is an image captured from a predetermined position of the vehicle or images captured from a plurality of predetermined positions that differ from each other in a traveling direction, and
the circuitry is further configured to set the image area to be presented from the one or more captured images in accordance with the driving information.

4. The signal processing device according to claim 3, wherein
the vehicle is formed by connecting a trailer portion to a cabin, and
the image captured from the predetermined position of the vehicle is an image formed by imaging the peripheral area around the vehicle from a predetermined position of the cabin, and the images captured from the predetermined positions that differ from each other in the traveling direction of the vehicle are images formed by imaging the peripheral area around the vehicle from respective predetermined positions of the cabin and the trailer portion.

5. The signal processing device according to claim 4, wherein, when a driving situation is such that an orientation of the cabin differs from an orientation of the trailer portion in accordance with the driving information, the circuitry is further configured to set the image area to be presented, with an outer side of the trailer portion being included in the visual recognition range.

6. The signal processing device according to claim 1, wherein the driving information includes at least one piece of information among vehicle speed information about the vehicle, information indicating a steering state, gear position information, a direction indicator setting state, a bend angle of a trailer portion relative to a cabin in a case where the vehicle is formed by connecting the cabin to the trailer portion, information indicating a connection state of the trailer portion, and current position information.

7. A signal processing method comprising:
setting an image area to be presented to a driver of a vehicle from an image obtained by circuitry of an signal processing device imaging a peripheral area around the vehicle in accordance with driving information related to a driving situation of the vehicle; and
making a determination of whether the driver has turned their head by comparing a recognition result with a reference value; and
adjusting a visual recognition range in the peripheral area when the determination indicates that the driver has turned their head, wherein the image area presented to the driver is shown on a display and reflected in a mirror for viewing by the driver, and the mirror is positioned further from the driver than the display.

8. A monitoring system comprising:
a display;
a mirror;
circuitry configured to
image a peripheral area around a vehicle;
acquire driving information about a driving situation of the vehicle;
set an image area to be presented to a driver of the vehicle from the image of the peripheral area around the vehicle in accordance with the driving information;
make a determination of whether the driver has turned their head by comparing a recognition result with a reference value; and
adjust a visual recognition range in the peripheral area when the determination indicates that the driver has turned their head,
wherein the image area presented to the driver is shown on the display and reflected in the mirror for viewing by the driver, and the mirror is positioned further from the driver than the display.

9. The signal processing device according to claim 2, wherein the traveling direction of the vehicle includes turning right or left at an acute angle or moving backward at another acute angle.

10. The signal processing device according to claim 1, wherein the circuitry is further configured to adjust the visual recognition range based on a head position of the driver.

11. The signal processing device according to claim 1, wherein the circuitry is further configured to set a width of the image area based on the visual recognition range in the peripheral area.

12. The signal processing device according to claim 1, wherein the circuitry is further configured to expand the visual recognition range after detecting a head turning motion of the driver.

13. The signal processing device according to claim 1, wherein the visual recognition range is adjusted by magnifying the peripheral area in the image.

14. The signal processing device according to claim 1, wherein the visual recognition range is adjusted by magnifying the peripheral area in the image.

15. The signal processing device according to claim 1, wherein the display and the mirror are positioned such that a visual recognition distance from the driver is 1.1 m or longer.

16. The signal processing device according to claim 1, wherein the circuitry is further configured to enter a high-speed detection mode after detecting a head turning motion of the driver.

17. The signal processing device according to claim 1, wherein the circuitry is further configured to detect an eye movement of the driver and to estimate a line of site of the driver based on an orientation of the driver's head and the eye movement.

18. The signal processing device according to claim 1, wherein the circuitry is further configured to adjust the visual recognition range in the peripheral area in response to detecting an acceleration of the turning of the driver's head.

* * * * *